United States Patent
Sigal et al.

(10) Patent No.: US 10,531,670 B2
(45) Date of Patent: Jan. 14, 2020

(54) BRINELESS, LOW-ACID PACKAGED OLIVES

(71) Applicant: MUSCO OLIVE PRODUCTS, INC., Tracy, CA (US)

(72) Inventors: Abdulkadir Yussuf Sigal, Manteca, CA (US); Larry Brion McCutcheon, Escalon, CA (US); Jesus Lopez Garcia, Stockton, CA (US); Maria Valeria Theall, Tracy, CA (US)

(73) Assignee: MUSCO OLIVE PRODUCTS, INC., Tracy, CA (US)

(*) Notice: Subject to any disclaimer, the term of this patent is extended or adjusted under 35 U.S.C. 154(b) by 659 days.

(21) Appl. No.: 14/480,346

(22) Filed: Sep. 8, 2014

(65) Prior Publication Data

US 2015/0072051 A1    Mar. 12, 2015

Related U.S. Application Data

(60) Provisional application No. 61/875,479, filed on Sep. 9, 2013.

(51) Int. Cl.
*A23B 7/005* (2006.01)
*A23N 4/08* (2006.01)
(Continued)

(52) U.S. Cl.
CPC ............ *A23B 7/0056* (2013.01); *A23L 19/05* (2016.08); *A23L 19/20* (2016.08); *A23N 4/085* (2013.01); *A23P 20/25* (2016.08); *Y02A 40/946* (2018.01)

(58) Field of Classification Search
CPC ............ A23V 2002/00; A23V 2250/21; A23V 2200/10; A23V 2250/2131;
(Continued)

(56) References Cited

U.S. PATENT DOCUMENTS 1,208,909 A * 12/1916 Burt ....................... A23L 19/09
                                                          426/270
1,625,494 A    4/1927 Olivarius
(Continued)

FOREIGN PATENT DOCUMENTS

DE    10354455 A1    6/2004
ES    2304090        12/1942
(Continued)

OTHER PUBLICATIONS

Eden-Trade.com https://web.archive.org/web/20140503042404/http://www.eden-trade.com/products/olives (Year: 2014).*
(Continued)

*Primary Examiner* — Erik Kashnikow
*Assistant Examiner* — Lela S. Williams
(74) *Attorney, Agent, or Firm* — Dergosits & Noah LLP

(57) ABSTRACT

The invention relates to olive processing, and includes methods for producing low-acid olives, as well as the olives produced thereby. In one aspect, the invention provides compositions directed towards packaged olive preparations having novel and beneficial characteristics, for example, olive preparations that are free of packing liquids such as brine solutions. In other aspects, the packaged olive preparations of the invention can have other beneficial properties, such as extended shelf life, have flavor infusions, and/or can be stuffed with various flavored stuffings.

5 Claims, 17 Drawing Sheets

(51) Int. Cl.
  *A23L 19/00* (2016.01)
  *A23P 20/25* (2016.01)
  *A23L 19/20* (2016.01)
(58) Field of Classification Search
  CPC . A23V 2200/048; A23L 1/2123; A23L 1/212; A23L 19/05; A23L 19/03; A23L 19/20; A23L 3/00; A23L 3/10; A23B 7/0056; A23P 20/25; A23N 4/08; A23N 4/085; B65B 55/02
  See application file for complete search history.

(56) References Cited

U.S. PATENT DOCUMENTS

| | | | |
|---|---|---|---|
| 2,436,463 | A | 2/1948 | Dellen et al. |
| 3,002,839 | A | 10/1961 | Levinson |
| 3,480,448 | A | 11/1969 | Etchells et al. |
| 3,831,389 | A | 8/1974 | Lipona |
| 4,006,256 | A | 2/1977 | Kyros |
| 4,090,439 | A | 5/1978 | Chall et al. |
| 4,141,287 | A | 2/1979 | Becker et al. |
| 4,168,325 | A | 9/1979 | Gonzalez et al. |
| 4,290,350 | A | 9/1981 | Del ser Gonzalez |
| 4,296,140 | A | 10/1981 | Jaquith et al. |
| 4,463,023 | A | 7/1984 | McCorkle et al. |
| 4,642,968 | A * | 2/1987 | McHenry ............... B65D 81/18 426/401 |
| 4,663,174 | A | 5/1987 | Ollero et al. |
| 4,664,926 | A * | 5/1987 | Scrimshire ............. A23L 19/03 426/270 |
| 4,741,911 | A | 5/1988 | McIntyre et al. |
| 4,781,557 | A | 11/1988 | Rubio et al. |
| 5,094,871 | A | 3/1992 | Heath |
| 5,100,681 | A | 3/1992 | Rodreguez |
| 5,151,286 | A | 9/1992 | Adams et al. |
| 5,171,586 | A | 12/1992 | Heath |
| 5,192,565 | A | 3/1993 | Buhler et al. |
| 5,635,290 | A | 6/1997 | Stopper et al. |
| 5,759,653 | A | 6/1998 | Collette et al. |
| 5,789,012 | A | 8/1998 | Slimak |
| 5,837,304 | A | 11/1998 | Jepson et al. |
| 6,703,059 | B2 | 3/2004 | Sigal et al. |
| 2003/0198717 | A1 | 10/2003 | Sigal et al. |
| 2004/0156960 | A1 | 8/2004 | Villota et al. |
| 2005/0191391 | A1 | 9/2005 | Postma et al. |
| 2008/0061065 | A1* | 3/2008 | Aronson ................. B65D 1/36 220/556 |
| 2010/0136168 | A1 | 6/2010 | McHaney et al. |
| 2011/0256277 | A1 | 10/2011 | Bows et al. |
| 2014/0295050 | A1 | 10/2014 | Sigal et al. |

FOREIGN PATENT DOCUMENTS

| | | | |
|---|---|---|---|
| ES | | 2021972 | 11/1991 |
| ES | | 2208113 B1 | 6/2006 |
| WO | WO 2006101965 | * | 9/2006 |
| WO | | 2011128553 A1 | 10/2011 |
| WO | | 2012020269 A1 | 2/2012 |
| WO | WO2013/163621 | | 10/2013 |

OTHER PUBLICATIONS

Notification Concerning Transmittal International Preliminary Search Report on Patentability for PCT/US2014/054581 dated Mar. 2, 2016; 11 pages.
Communication and Supplementary European Search Report for European Patent Application No. EP13782605, dated Nov. 16, 2015; 8 pages.
"Notification of Transmittal of the International Search Report and the Written Opinion of the International Searching Authority, or the Declaration", dated Jan. 2, 2015, in regards to International Application No. PCT/US2014/054581, International filing date Sep. 8, 2014.
Office Communication with Non-Final Office Action, United States Patent and Trademark Office <www.uspto.gov>, U.S. Appl. No. 13/885,151 (now published as US2014/0295050), Communication mailing date Jan. 14, 2015.
Dobson, •Stuffed olives may hold key to beating heartburn misery,• Oct. 24, 2011, Daily Mail Online <http://www.dailymail.co.uk/> or <dailymail.com>.
"Oloves Tasty Mediterranean Flavor, 48 × 1.1oz, Pitted Green Olives with Basil and Garlic," packaged green olives; sold by amazon.com, Inc., retrieved from <www.amazon.com>, first accessed on Mar. 13, 2012, item model No. OLOTM48; Amazon Standard Identification No. (ASIN) B0058DAOH2; earliest date of availability unknown.
"Oloves Original Natural Black Olives, 1.6 ounces Pouch (Pack of 6)" sold by amazon.com, Inc., retrieved from <www.amazon.com>, accessed on Jul. 12, 2013, item model No. OLOTM48; Amazon Standard Identification No. (ASIN) B001XVW4YU; UPC No. 640134350000; earliest date of availability unknown.
"Oloves—The Dieline" Blog, featuring "Oloves the Original: Pitted Natural Cuquillo Olives from Spain; the liquid-free healthy snack," dated Oct. 28, 2008, retrieved from: < http://www.thedieline.com/blog/2008/10/28/oloves.html >, accessed on Jul. 12, 2013.
"Oloves—Tasty Mediterranean" retrieved from www.fitnosh.com, accessed on Mar. 26, 2013. One page.
"Oloves Tasty Mediterranean" and "Oloves Light-Hearted Vinagrette," featured on < www.fitnosh.com >, dated Jul. 3, 2011, retrieved from < http://web.archive.org/ > Internet Archive waybackmachine, accessed on Jul. 20, 2013.
"Jokey: Mini tapas in innovative packaging—oxygen remains outside!," retrieved from: http://www.jokey.com/us/aktuell/news/news-details/artikel/mini-tapas-in-innovativer-verpackung-sauerstoff-bleibt-draussen/. Accessed Dec. 27, 2011. One page.
Sabatini, "Recent Patents Concerning Organoleptic and Healthy Properties of Table Olives," Recent Patents on Chemical Engineering, vol. 2, p. 37-42 (2009).
"Processing California Olives" by Luh, Ferguson, Kader and Barrett in Olive Production Manual, Sibbett and Ferguson (eds.), University of California Division of Agriculture and Natural Resources, Publication 3353, Ch. 22, pp. 145-155 (2004).
"Purac Food ingredients—Food solutions overview," with product data sheets for PURAMEX® FE and PURAMEX® FE/HQ, retrieved from: http://www.purac.com/EN/Food/ingredients/Fruits_and_vegetables/Preservation/Shelf_life_extension/Color_stability.aspx, accessed on Oct. 23, 2011. Four pages.
"Processing Olives: Production and Harvesting," retrieved from: http://www.proper-spanish-tapas.com/processing-olives.html, accessed on Oct. 23, 2011.
"Ferrous Lactate / Iron Lactate" information sheet, retrieved from: http://www.ingredientswizard.com/ingredients/240-ferro-lactate-iron-lactate, accessed on Oct. 23, 2011. Two pages.
"Roland Olives Stuffed with Anchovies, 3-Ounce Dry Weight Can (Pack of 12)" sold by amazon.com, Inc., item model No. 71402; Amazon Standard Identification No. (ASIN) B000UXY2EM; retrieved from: http://www.amazon.com/Roland-Olives-Stuffed-Anchovies-3-Ounce/dp/B000UXY2EM, accessed on Oct. 23, 2011, earliest date of availability unknown. Two pages.
"Olive Packaging Investigated," dated Apr. 8, 2004, retrieved from: http://www.foodproductiondaily.com/Pacakging/Olive-packaging-investigated, accessed Dev. 27, 2011. Two pages.
"Trade Standard Applying to Table Olives" from the International Olive Oil Council, Publication COI/OT/NC No. 1, Resolution No. RES-2/91-IV/04 (Dec. 2004).
Yada and Harris, "Olives: Safe Methods for Home Pickling," University of California Division of Agriculture and Natural Resources, Publication No. 8267 (2007), 26 pages.
"Notification of Transmittal of the International Search Report and the Written Opinion of the International Searching Authority, or the Declaration", dated Sep. 17, 2013, for PCT/US2013/038529, International filing date Apr. 26, 2013.
Title 21 USC § 113; United States Food and Drug Administration (US FDA), entitled "Thermally Processed, Low-Acid Foods Packaged in Hermetically Sealed Containers," on 28 pages.

(56) References Cited

OTHER PUBLICATIONS

Title 21 USC § 114; United States Food and Drug Administration (US FDA), entitled "Acidified Foods," on 7 pages.
Title 17 of California Code of Regulations (CCR) §§ 12400-12984; California Department of Public Health (CDPH), entitled "Cannery Inspection Regulations," on 27 pages.
Extended European Search Report, including the Supplementary European Search Report and the European Search Opinion, in relation to EP Application No. 14842268.6, Communication dated Apr. 11, 2017, on 11 pages total.
English translation of Unexamined German Patent DE10354445. A1, German Patent and Trademark Office, titled "Method and Production of Black Olives That Are Blackened by Alkaline Oxidation, Bottled or Canned and Sterilized Without Salt Brine, " to Amador Iglesias, published Jun. 24, 2004, on 6 pages. English translation obtained and provided by Applicant.
Notifications des Rapports de Recherché Preliminaire Avec Opinion sur la Brevetablilte, Royaume du Maroc, Office Marocain de la Propriete Industrielle et Commerciale, Objet Demandes de brevet d'invention No. 38902, Intitule de l'invention "Olives Conditionnees faiblement acides et sans saumure," May 4, 2017.
English translation of Notification of Preliminary Search with Opinion on Patentability, Kingdom of Morocco, Moroccan Dffice of Industrial and Commercial Property, in relation to Morocco Patent Application No. 38902, titled "Olives Containing Low-Acid and No Brine," dated May 4, 2017, on 6 pages. English translation obtained and provided by Applicant.
Communication dated Jul. 12, 2018 from the European Patent Office containing an Examination Report in regard to EPO Patent Application No. 13782605.3, which is a National Entry in the EPO from PCT International Application Serial No. PCT/US2013/038529; on 7 pages.
Communication dated Aug. 17, 2018 from the European Patent Office containing an Examination Report in regard to EPO Patent Application No. 14842268.6, which is a National Entry in the EPO from PCT International Application Serial No. PCT/US2014/054581; on 8 pages.
Black Thrumba Olives product description. From Vita Verde Schwarze. Dated 2011. Obtained from Mintel Group Ltd. products database <www.gnpd.com>; on 10 pages.
"Green Olives & Basil" product description. From Borges-Tramier. Dated 2012. Obtained from Mintel Group Ltd. products database <www.gnpd.com>; on 4 pages.
Pradas et al., "The use of high hydrostatic pressure (HHP) treatments for table olives preservation," Innovative Food Sciences and Emerging Technologies 13;64-68 (2012).
"The Guide to pH Measurement in Food & Drink," Version 1.0, author Kyle Hildebrant from Our Daily Brine blog (2016), obtained from <ourdailybrine.com/ph-guide/>, on 29 pages.
"How can I measure the pH of food?" from CamLab's Blog and Information Database—The Laboratory People, by Sophie Bryant (Aug. 28, 2015), obtained from <http://camblab.info/wp/index.php/how-can-i-measure-the-ph-of-food/>; on 8 pages.
"Measuring pH in Acidified Foods," Hanna Instruments informational publication and product descriptions, obtained from <hannainst.com>, publication date unknown, on 24 pages.
Communication dated Feb. 6, 2018 from the European Patent Office containing an Examination Report in regard to EPO Patent Application No. 14842268.6, which is a National Entry in the EPO from PCT International Application Serial No. PCT/US2014/054581; on 5 pages.
Correspondence with Final Office Action from the United States Patent and Trademark Office <www.uspto.gov>, in regard to U.S Appl. No. 13/885,151 (now published US2014/0295050), Communication mailing date Oct. 18, 2017.
Correspondence in French, dated Jan. 18, 2018, Office Marocain de la Propriete Industrielle et Commerciale (OMPIC), Decision Portant Rejet Partiel d'une Demande de Brevet D'Invention, Rapport de Recherche Definitif Avec Opinion Sur La Brevetabilite, No. de la demande: 38902. On 7 pages.
English Translation of Correspondence (original in French), dated Jan. 18, 2018, Moroccan Office of Industrial and Commercial Property (OMPIC), Decision of Partial Rejection of a Patent Application with Final Search Report with an Opinion on the Patentability, in regard to OMPIC Patent Application No. 38902, which is a National Entry of PCT International Application Serial No. PCT/US2014/054581; on 9 pages.
Patent Publication, Brevet D'Invention, Office Marocain de la Propriete Industrielle et Commerciale (OMPIC), Publication No. MA 38903 B1, publication dated Nov. 30, 2017, entitled "Olives Conditionnees Faiblement Acides Et Sans Saumure," with accompanying Search Report and Opinion.

\* cited by examiner

Retort Process A: 245°F Minimum Cook Temperature with Water Spray

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61 | 1.0 | 7.0 | 4.0 | 4.0 | 2.0 | 12.0 |
| Temperature Set Point (°F) | 190.0 | 210.0 | 238.0 | 249.0 | 249.0 | 247.0 | 247.0 | 245.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p.s.i) | 3.0 | 6.0 | 20.0 | 31.0 | 35.0 | 35.0 | 35.0 | 34.0 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7A

Retort Process B: 250°F Minimum Cook Temperature with Water Spray

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61 | 1.0 | 7.0 | 4.0 | 4.0 | 2.0 | 12.0 |
| Temperature Set Point (°F) | 190.0 | 210.0 | 238.0 | 251.0 | 251.0 | 251.0 | 251.0 | 245.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p.s.i) | 3.0 | 6.0 | 20.0 | 31.0 | 35.0 | 35.0 | 35.0 | 34.0 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7B

Retort Process C: 255°F Minimum Cook Temperature with Water Spray

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61 | 1.0 | 7.0 | 4.0 | 4.0 | 2.0 | 12.0 |
| Temperature Set Point (°F) | 190.0 | 210.0 | 238.0 | 257.0 | 257.0 | 251.0 | 251.0 | 245.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p.s.i) | 3.0 | 6.0 | 20.0 | 31.0 | 35.0 | 35.0 | 35.0 | 34.0 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7C

Retort Process D:

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61 | 1.0 | 7.0 | 4.0 | 4.0 | 2.0 | 12.0 |
| Temperature Set Point (°F) | 190.0 | 210.0 | 235.0 | 249.0 | 249.0 | 247.0 | 247.0 | 245.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p.s.i) | 5.9 | 8.4 | 20.7 | 29.0 | 30.8 | 30.8 | 30.8 | 29.5 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7D

Retort Process E:

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61.0 | 1.0 | 7.0 | 4.0 | 4.0 | 2.0 | 12.0 |
| Temperature Set Point (°F) | 190.0 | 210.0 | 235.0 | 249.0 | 249.0 | 247.0 | 247.0 | 240.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p.s.i) | 5.5 | 11.6 | 20.5 | 28.6 | 29.6 | 29.6 | 29.6 | 29.1 | 11.0 | 7.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7E

Retort Process F:

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 61.0 | 1.0 | 7.0 | 4.0 | 4.0 | 2.0 | 12.0 |
| Temperature Set Point (°F) | 190.0 | 210.0 | 235.0 | 249.0 | 249.0 | 247.0 | 247.0 | 240.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Pressure Set Point (p. s. i) | 6.7 | 12.8 | 21.7 | 27.5 | 28.5 | 28.5 | 28.5 | 28.5 | 11.5 | 7.5 | 3.5 | 2.5 | 2.5 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7F

Olive Cultivars

| | | |
|---|---|---|
| Abou-Satl | Carrasqueño de la Sierra | Galega VulgarGemlik |
| Adramitini | Casaliva | Gerboui |
| Adriamitini | Cassanese | Giarraffa |
| Aggezi Shami | Castellana | Gordal |
| Aglandau | Castelvetrano | Gordal de Granada |
| Alfafara | Cayon | Gordal Sevillana |
| Aloreña | Çekiste | Grappolo |
| Amfissa | Çelebi | Grappoio |
| Amigdalolia | Cellina di Nardò | Grignan |
| Arauco | Cerignolese | Grossa di Spagna |
| Arbequina | Chalkidiki | Grossane |
| Arbosana | Changlot Real | Hamed |
| Ascolana Tenera | Chemlal de Kabylie | Haouzia |
| Ascolano | Chemlali | Hojiblanca |
| Ayvalik | Chemlali de Sfax | Hondroelia Halkidikis |
| Azapa | Chétoui | Itrana |
| Azeradj | Cipresino | Izmir Sofralik |
| Baladi | Cobrançosa | Kadesh |
| Bari Zaitoon -1 | Columello | Kaissy |
| Bari Zaitoon -2 | Coratina | Kalamata |
| Barilotto | Cordovil de Castelo | Kalamon |
| Barnea | Branco | Kalinjot |
| Barouni | Cordovil de Serpa | Konservolia |
| Bella di Cerignola | Cornicabra | Korani |
| Bianchera | Cucco | Koroneiki |
| Biancolilla | Doebli | Ladoelia |
| Bical | Dolce Agogia | Lastovka |
| Blanqueta | Dolce di Morocco | Lazzero |
| Blanquette de Guelma | Domat | Leccino |
| Bosana | Dritta | Leccino Gemlik |
| Bouteillan | Empeltre | Lechín de Granada |
| Cailletier | Erkence | Lechín de Sevilla |
| Callosina | Farga | Lemono |
| Canino | Favoral | Levantinka |
| Carboncella | Frangivento | Lianolia |
| Carolea | Frantoio | Liguria |
| Carrasquenha | Gaeta | Limli |

FIG. 11 (Part 1 of 2)

Olive Cultivars

| | | |
|---|---|---|
| Loaime | Moraiolo | Piqual |
| Lucca | Morisca | Pisciottana |
| Lucio | Morona | Pizzé Carroga |
| Lucques | Morrut | Ponentine |
| Loaime | Nabali | Prone |
| Lucca | Nabali Baladi | Prugne |
| Lucio | Nafplion | Psilolia |
| Lucques | Nebbia | Rapasayo |
| Lugano | Nevadillo | Rasi'i |
| Lunga | Niçoise | Redondal |
| Luques | Nocellara del Belice | Rosciola |
| Maalot | Nocellara Etnea | Royal de Cazorla |
| Maçanilha Algarvia | Nuciddara | Rubra |
| Majatica di Ferrandina | Oblica | Salonenque |
| Malissi | Ogliarola | Santa Caterina |
| Manzanilla | Ogliarola Barese | Sant'Agostino |
| Manzanilla Cacereña | Olina Tunna | Sevillano |
| Manzanilla de Sevilla | Oliva a ciuccio | Sevillenca |
| Manzanilla Prieta | Oliva a prugna | Sigoise |
| Manzanillo (Manzanilla) | Oliva dell'Asino | Sorani |
| Mastoides | Oliva di Cerignola (or simply Cerignola) | Souri |
| Mastoidis | | Soury |
| Maurino | Oliva di Castel Vetrano e Nuciddara | Spagnola |
| Mazzara (Mazara) | | Taggiasca |
| Megaritiki | Oliva di Spagna | Tanche |
| Megaron | Oliva Manna | Toffahi |
| Melanger Verdale | Ottobratica | Tondo de Cagliari |
| Memecik | Oueslati | Uslu |
| Memeli | Palomar | Valanolia |
| Menara | Patrinia | Verdial de Badajoz |
| Merhavia | Pendolino | Verdial de Huevar |
| Meski | Picholine | Verdial de Vélez-Málaga |
| Meslala | Picholine Languedoc | Verdiell |
| Mirtoia | Picholine marocaine | Villalonga |
| Mission | Picual | Zaity |
| Mollar de Cieza | Picudo | Zutica |

FIG. 11 (Part 2 of 2)

BRINELESS, LOW-ACID PACKAGED OLIVES

CROSS-REFERENCE TO RELATED APPLICATIONS

This application claims benefit of U.S. Provisional Application Ser. No. 61/875,479, filed in the United States Patent and Trademark Office on Sep. 9, 2013, which is herein incorporated by reference in its entirety.

FIELD OF THE INVENTION

The invention relates generally to the field of food products. More specifically, the invention provides processed and packaged ready-to-eat olives, and also relates to the methods for producing the processed and packaged olives. The invention also relates to low-acid food products.

BACKGROUND OF THE INVENTION

Edible olives are available in a wide array of styles and packing. Some of this diversity comes from the inherent properties of the many known olive cultivars, but treatment and processing of the olives generates an even broader range of organoleptic properties, affecting color, texture, odor, taste and appearance. Other qualities, such as packaging convenience, shelf life and nutritional value also impact the appeal of any given olive preparation.

The olive tree, *Olea europaea*, produces the olive fruit, a drupe of approximately 1.0-2.5 centimeters. The drupe has a firm flesh (also termed the meat of the olive), covered by a thin skin, with a hardened pit in the center. Multiple subspecies are recognized, and centuries of cultivation have resulted in hundreds of cultivars. As used in the art, the terms "variety" or "varietal" are often used interchangeably with the term "cultivar" to describe the plethora of known olive lineages. More accurately, the term "varietal" refers to naturally occurring, true-breeding plant lineages, and the term "cultivar" refers to a plant lineage that has arisen by some type of human intervention, such as by selective breeding or other artificial plant manipulations. As used herein, the term "cultivar" is used to describe any and all known olive cultivars, varieties, varietals, strains, hybrids, species or subspecies. Some examples of commercially significant cultivars are provided in FIG. 11. Some of the cultivar labels in FIG. 11 are synonymous, or are highly related geographic variants of the same varietal or cultivar.

The natural color of an olive varies widely among the different cultivars. Some olive cultivars are green when immature, and darken to a burgundy or black while ripening on the tree (termed "natural black" olives). However, a black olive color does always correlate with degree of natural ripeness. Some cultivars remain green during all stages of growth and never acquire a dark color. Some cultivars are allowed to ripen and obtain a dark color on the tree, while other cultivars are intentionally picked in an unripe state. Additionally, the color of the olive in the consumer market does not correlate with natural ripeness; in the US market, black olives account for the majority of sales, and these olives are black as a result of olive processing, not natural ripeness. Olives that acquire a black color from post-harvest oxidative processing are commonly termed "black ripe" olives.

When freshly picked from the tree, olives often have an intrinsic bitter flavor due to the presence of the polyphenolic compound oleuropein. To remove or alleviate this bitterness, olives are typically "cured" using one or a combination of methods. These include the traditional de-bittering methods of lye curing, water curing, brine curing, or fermentation. In addition to these traditional methods, other methods are also known.

Water-curing of olives involves submersion of the olives in fresh water for an extended period of time, which can be several weeks, several months, or longer. Water-curing is not as effective as the other traditional methods in removing the bitter taste, and water cured olives typically remain slightly bitter. Brine-curing involves the soaking of olives in a highly concentrated salt solution, typically but not exclusively sodium chloride. Brining of olives, similar to brining other types of fruits or vegetables, can be used to bring about certain desired properties in a food, and also has the effect of acting as a preservative. However, brine curing is sometimes only partially effective at debittering the olive flesh, and can be accompanied by some undesired effects, such as changing the flavor and phytonutrient composition of the olive and excessive softening of the olive flesh. Further, brine curing methods can take many months, and can also be incompatible with the use of some types of flavorings, seasonings and other types of foods that might be co-packaged with the olives. Another limitation of a brine-based debittering method is that the process generates large volumes of liquid brine waste, which can be toxic if left untreated, adding to the cost and complexity of production. The term "olive pickling" is sometimes used synonymously with olive brining. As with most olive production methods, the finished olives are packaged in a brine solution for final shipping and consumption.

Olive fermentation, by itself, is also considered a curing process. Fermentation is the biological process whereby the endogenous sugars found in a fruit are metabolized by microorganisms to produce acidic products. Fermentation of olives produces lactic acid or acetic acid, and this fermentation changes the organoleptic properties of the olive, which, in some types of processing, adds a distinctive and desired flavor to the olive. Olive fermentation is thought to have a secondary effect of freeing oleuropein molecules from the olive flesh and allowing them to diffuse into the surrounding liquid. Olive fermentation can be used by itself, or in conjunction with other curing methods, such as brine curing or lye curing. Olive fermentation generally leaves the olive flesh at an acidic pH, typically below approximately pH 4.2.

Lye-curing is the predominant method for olive curing. This treatment involves the submersion of the olives in a strong alkali solution, comprising either sodium hydroxide (NaOH) or potassium hydroxide (KOH). The strong alkali hydrolyzes and chemically neutralizes the oleuropein content, thereby removing the bitter taste. Lye-curing usually occurs in a series of sequential steps, or "cuts," where a first lye bath will cure the skin and outermost portion of the olive, followed by draining and exposure to a second and subsequent lye soakings that allow alkali penetration successively deeper into the olive flesh, which may eventually reach the olive pit.

The lye-curing can have an added effect of darkening the olive, where during the last stage of lye-curing and or washing, oxygen gas, or simply air, is bubbled up through the lye solution, resulting in an oxidation of the alkaline olive flesh, thereby producing a deep black color. Fine tuning of the lye-treatment and blackening steps allows experienced olive producers to create olives that have desired properties with regard to the depth of alkali penetration, color tones and mottling that appears in the flesh and skins of the treated fruit. In the United States, canned California black-ripe olives are typically lye-cured and oxygen-darkened.

A wide variety of edible olive styles are produced using various combinations of curing methods and other treatment steps and by using various olive cultivars/varietals. There are also regional variations in all of these methods. However, there are approximately four standard processing technologies responsible for the majority of the olive market in the United States. These are California-style black-ripe olives, green-ripe olives (also termed California-style green), Spanish-style green olives (i.e., fermented olives) and Greek style natural black olives.

California style black olives, also known as "black-ripe" olives, are harvested from the tree green before fully ripening. This olive style entails using a lye treatment to debitter the olive, a wash step, exposing the olive to air and optionally other agents such as ferrous gluconate to turn and fix the olive flesh black, then brining the olive. See FIG. 1. Following the olive treatment, California black-ripe olives are typically canned in a neutral (pH 6.5-7.5) brine and then heat treated. California black-ripe olives can be sold either pitted or unpitted.

Non-fermented green olives, also termed "green-ripe," California-style," "American style" or "Picholine style" olives, are also harvested green before they are fully ripe. They are subjected to lye curing similar to the black-ripe olives, washed, then kept submerged (typically a neutral brine) and/or in sealed containers to minimize oxidative blackening from exposure to the oxygen in ambient air, and then packaged in a neutral brine followed by heat treating. See FIG. 2. The skin and flesh of the green-ripe olives retain their green color. In the United States, this production style creates green olives that are typically sold pitted and unstuffed.

Spanish-style (also known as Sevillian-style) green olives follow a different production method. They are harvested green, and then are partially treated with lye to debitter or partially debitter the olive. This lye treatment is often an intentional under-treatment, where the lye is not allowed to completely penetrate the full depth of the olive flesh. After the lye cut, the olives are placed in sealed vessels and allowed to undergo a natural fermentation process. This fermentation can be initiated by the native microbial flora on the olive surface, or in the case of large scale processing facilities, can be more tightly controlled by the addition of cultured laboratory strains of particular bacteria and/or yeast. The fermentation converts the sugars contained in the olive into acidic respiratory byproducts, turning the olive flesh acidic, typically in the range of pH 2.8 to pH 4.2. The fermentation reactions may or may not include the addition of extra sugars to the culture mix. The fermentation process also gives the olive flesh unique organoleptic properties that are distinct from other production methods. These olives may intentionally retain a distinctive slightly bitter taste. Spanish style green olives are typically packaged in an acidic brine and are the olive style that is commonly stuffed with red pimento in the United States.

Greek style natural black ripe olives, also termed simply "natural black" olives, are distinct from California style black-ripe olives. The expression "natural black" is a heterogeneous category that encompasses a number of olive processing methods, but all of the olives generally share the feature of having been tree-ripened and harvested in a natural black state. These olives can be subjected to a wide range of treatments, including brining/pickling in salt brines or vinegar brines, fermentation, and salt packing.

The industry provides guidance and sets standards by providing definitions and classifying different olive styles and olive production methods. See "TRADE STANDARD APPLYING TO TABLE OLIVES" from the International Olive Oil Council, Publication COI/OT/NC No. 1, Resolution No. RES-2/91-IV/04 (December 2004). See also "PROPOSED DRAFT CODEX STANDARD FOR TABLE OLIVES" Codex Alimentarius Commission, prepared by the Joint Food and Agricultural Organization (FAO) of the United Nations and the World Health Organization (WHO), Doc. No. CX/PVF 12/26/3 (July 2012). For further descriptions of olive processing methods, see "Processing California Olives" by Luh, Ferguson, Kader and Barrett in *Olive Production Manual*, Sibbett and Ferguson (eds.), University of California Division of Agriculture and Natural Resources, Publication 3353 (2004); pgs. 145-155.

In some cases, the processing methods used to cure the olives take on a strong geographic identity. For example, in the Castelvetrano region in western Sicily, local processing of the olive crop uses predominantly the "Castelvetrano method" for curing/debittering. Using this method, the fruit is treated in lye (caustic soda) for a period of up to 12 hours, and then continually washed in fresh water to remove the lye and produces an olive having neutral pH flesh. After removal of the lye, the olive is typically canned in a neutral pH liquid brine. This process produces a natural, intense green color, a firm, crisp flesh and sweet flavor. Alternatively, when these olives are packaged in an acidic brine, they retain their characteristic intense green color and crisp flesh, but the taste is tart from the acidic brine packaging. Various olive cultivars can be used to produce "Castelvetrano style" cured olives. For example, the Sicilian Nocellara del Belice cultivar and the Greek Halkidiki cultivar (also written Chalkidiki, Chalcidice or Chalkidike) are used to produce "Castelvetrano-style" table olives using the Castelvetrano curing method.

A single olive cultivar can be processed using multiple curing styles to produce multiple distinctive products. For example, the "Nocellara del Belice" cultivar can be processed using Castelvetrano-style curing (i.e., caustic soda bath), Sevigliana-curing (half-caustic soda treatment, half natural brine), "Naturale" curing (plain water and salt brine), and "Passuluna" curing style producing a riper, black, salted and partially dehydrated Nocellara olive.

In some contexts, the descriptive terms associated with a particular style of table olive does not reveal the olive varietal or cultivar used, for example, as various olive cultivars can be used to produce a particular style of olive, e.g., "Castelvetrano style" cured olives. This is made more complex by various synonyms that can be used to describe a particular cultivar, for example, where the cultivars Nocellara del Belice, Nebbia, Mazzara (Mazara), Olina Tunna and Oliva di Castel Vetrano e Nuciddara (or simply Nuciddara), may all in fact refer to the same olive cultivar. Variant spellings of these names can also complicate precise identification of any particular olive.

The manner in which processed olives are served has limitless variety. Olives can be eaten alone without any accompaniment, or served with other foods, or incorporated into recipes. Olives can be served whole unpitted or pitted. Alternatively, olive flesh can be cut into segments in any number of ways, or mashed to produce a paste or puree. Methods, devices, machinery and technology for mechanical olive processing, including pitting, slicing, halving, quartering, chopping, mashing, or forming pastes or purees are known in the industry.

The final step in many olive production methods is the packaging of the olives in a neutral or acidic packaging brine solution using cans or jars. Although packaging brine solutions have the beneficial effect of acting as a preservative for preventing spoilage and extending shelf life, in other respects, the brining solutions are problematic. Leaving the olives packaged in a brine solution makes them messy to eat, and the brine easily spills from a can or jar. When packaged in the liquid brine, they are not "snack friendly," meaning that when one wants to snack on olives, one must first open a can or jar of olives, retrieve the olives from the packaging brine (or drain all of the brine from the can or jar), then serve the olives from a second container such as a plate, bowl or cup. Presently, the cans or jars typically used for olive packaging provide more than one serving of olives, meaning that if only one person is opening and intending to eat the olives, some portion from the can or jar will go to waste. If one tries to retrieve just a single serving of a few olives from the large can or jar, the presence of the brine solution often creates a mess or drips. This multistep serving process from cans or jars is inconvenient. Furthermore, the presence of the liquid brine prevents the inclusion of some other food products that might be co-packaged with the olives that could enhance the appeal of the olives, for example but not limited to, other fruits, vegetables, cheese, flavorings and seasonings.

Cured olives, either black or green, can contain various fillings, infused flavorings or other co-packaged food materials, as known in the art. Spanish style green olives are most commonly used to prepare stuffed olives, due in part to the fact that green olives generally have a firmer flesh than black ripe olives, and as a result, are more resilient to the physical stresses caused by machinery used in large-scale automated stuffing/filling. Furthermore, green olives are preferred for making stuffed olives because the acidic packaging brine used for Spanish-style green olives does not significantly degrade the color of the green olives, where in contrast, an acidic brine environment will fade the preferred deep black color of black-ripe olives to a less attractive brown. Spanish-style green olives are most commonly stuffed with red pimento, although garlic, celery and onion fillings are also common. In addition to being used as stuffings, materials such as garlic and onion can be co-packaged as accompaniments with the Spanish-style olives.

In the commercial setting, green olive stuffing can use actual vegetable pieces trimmed to a suitable shape and size for use in the stuffing process. However, this process is labor and cost intensive and not readily adaptable to large scale automation. Alternatively, the stuffing can comprise malleable segments of artificially formed food material. This material can be artificially colored and flavored, and is extruded or molded in some manner to form pliable (i.e., semi-rigid) sheets, ribbons or strips, which can be cut into suitable segments for insertion into the pitted olive. Flavored ribbons that mimic pimento are commonly used for olive stuffing. For example, see issued U.S. Pat. Nos. 4,006,256, 4,141,287 and 4,168,325, each of which is herein incorporated by reference in its entirety. Olive stuffing using trimmed ribbons or sheets has various drawbacks. First, these methods are often too physically harsh to use on the delicate flesh of a pitted olive. Second, the flavor choices for commercially-available ribbon fillings are limited.

Alternatively, paste-type fillings have been proposed for stuffing pitted olives. See U.S. Pat. No. 4,663,174, which is herein incorporated by reference in its entirety. Paste filling techniques such as described in U.S. Pat. No. 4,663,174 face various technical challenges. First, the consistency (e.g., hardness or softness) of the paste filling must be optimized because paste-type fillings will have a tendency to slip out of the pitted olive and can leak and smear, causing unsightly smearing on the surface of the olive and on the end stage packaging. Second, paste type fillings must be optimized for taste sensation, for example, to avoid a mushy or slimy sensation while being eaten. Third, the paste filling formulations such as those used in U.S. Pat. No. 4,663,174 are optimized for olive packaging in a liquid brine. If these paste-stuffed olives were packaged without brine, these existing formulations would be suboptimal because loss of moisture in a brineless environment would cause shrinkage of the stuffing and likely create a loss of adhesion and a tendency for the stuffing to dislodge and fall out of the pitted olive.

The choices for stuffings and infused flavorings in the commercial setting are limited. Olive fillings that use more diverse flavors and complex favor combinations would add to the appeal of stuffed olives. Furthermore, stuffings designed to complement the flavors of particular types of olives, such as black-ripe olives, and that can be adapted to take into account the softer flesh of some olive types such as black-ripe olives, would also make stuffed olive products more appealing. The marketplace would benefit from a wider variety of stuffing flavors, and more complex stuffings that utilize combinations of flavor ingredients.

The marketplace would benefit from olive packaging technology that results in olives that have improved consumer appeal with regard to portability, conveniently sized packaging (for example, snack-sized) that minimizes waste, lightweight, unbreakable or transparent packaging, ease of transport, packaging that is easily opened and/or resealable, packaged in a manner that eliminates the inconvenience of liquid brine packaging (for example, mess-free eating), long shelf life and have a wider assortment of stuffings and flavoring.

There is a need for olives, for example, low-acid olives, that could be put in convenient and appealing packaging that is free of liquid brine. Further, such olives could be more appealing if they contain infused flavorings and/or are pitted and stuffed with flavored stuffings. This product will also appeal to people who benefit from a low-acid diet, for example, to control gastric reflux disease. Low acid-olive products are also beneficial because acidic food products are often associated with unappealing strongly acidic or tart tastes. Further, methods for packaging low-acid would be most desirable if those methods preserve the organoleptic properties, desirable appearance and adequate shelf life of the olive products.

The present invention, in its many embodiments, overcome these challenges and provide many benefits to the marketplace. In addition, still further benefits flow from the invention described herein, as will be apparent upon reading the present disclosure.

SUMMARY OF THE INVENTION

The invention described herein provides products, and processes for making those products, that solve industry problems associated with packaging olives in liquid brine and problems and limitations associated with producing stuffed and flavored olives. The invention also provides olive preparations that can be packaged in a variety of useful container options, adding convenience and other benefits over products that are known in the art.

The invention provides packaged low-acid olive preparations, where the olives are contained in a sealed container and fee of liquid brine. These olives are a low-acid food product, and thus have a pH greater than pH 4.6, and in this case, the pH is less than about pH 8.5. After the olives are sealed in the containers, they are subjected to a heat treatment, such as a retort process, which can be a retort sterilization. The olives can be whole olives, pitted or unpitted olives, or olive segments.

The packaged olives can have an oxygen concentration inside of the sealed container preferably not more than about 0.5%, and more preferably not more than about 0.1%. The sealed containers used to package the olives are preferably effective oxygen barriers, and the sealed containers preferably have shelf stability for at least 12 months, or in other embodiments, for at least 14, 16, 18 or 20 months. In some aspects, the sealed contains holding the olives comprise polypropylene, and preferably, a polypropylene and ethylene vinyl alcohol (EVOH) blend or composite structure in order to promote a strong oxygen barrier. In some aspects, the least efficient component making up the container (e.g., that is either the cup or the lid) in an oxygen ingress barrier with an oxygen transmission rate of not more than about 0.028 cc/m$^2$/24 hours at 23° C. and 55% relative humidity.

The olives that are packaged in the containers can comprise an oil coating to improve the appearance of the olives. The olives can be any style of olives, including black-ripe olives or California style green-ripe olives. Optionally, the olives can be packaged with one or more additional non-olive food item. The olives can be stuffed, e.g., with an injectable flavored or unflavored stuffing that comprises at least one gelling agent such as sodium alginate, which hardens upon exposure to calcium. In other aspects, the olives can be flavored with infused with flavorings, stuffed (for example, with an alginate based paste type stuffing), or both flavor infused and stuffed.

The olives used to produce the packaged, low-acid, brine-free olives of the invention can be prepared from any suitable varietal or cultivar. Furthermore, the low-acid olives can be prepared using protocols derived from any suitable production method, for example, based on traditional methods for producing black-ripe olives or California style green-ripe olives. In some embodiments, the olives can be co-packaged with other complementary food products, such as other types of fruits or vegetables.

In still other aspects, the invention provides methods for producing substantially liquid-free, low acid olive preparations, where the olives have a flesh with pH greater than pH 4.6 and less than about pH 8.5, and where the preparations use a container that is substantially impervious to oxygen when sealed. Generally, these methods comprise the steps of (a) treating the uncured olives with an alkali to debitter the olive, (b) reducing the alkalinity of the olive, for example, by using $CO_2$ bubbling, for example, to within a range of about pH 8.6 to pH 8.9, (c) distributing the low-acid olives into the containers (d) sealing said container, preferably in a reduced oxygen environment, such as produced by drawing a vacuum and flushing with nitrogen, and (e) heat treating the sealed container, e.g., by retort processing, which can be a sterilizing retort. In some aspects, these methods produce black-ripe olives and the methods further comprise blackening the olives by treating with an oxidizing agent such as ferrous gluconate.

In still other aspects, the invention provides methods for producing low acid (pH greater than pH 4.6 and less than about pH 8.5) stuffed olives, generally where the method comprises (a) injecting the pit cavity of a pitted olive with a flavored stuffing paste, where the paste comprises (i) sodium-alginate gelling agent in a concentration range of 1% to 5%; and (ii) a paste thickener selected from quinoa powder (i.e., flour), teff powder, amaranth powder, and jicama puree and any combinations thereof; (b) exposing the injected olive to a solution comprising calcium in a concentration of about 3% to 10%; and (c) exposing the injected olive to a brine solution comprising calcium in a concentration of about 0.25% to 0.75%.

In still other aspects, the invention provides apparatus and integrated systems for producing stuffed olives of the invention, and indeed, any type of stuffed olives. These systems comprise generally the following components:

a) a paste mixer assembly, wherein an olive stuffing paste comprising a gelling agent such as sodium alginate is prepared in the paste mixer assembly;

b) a paste feeder assembly, wherein the olive stuffing paste prepared in the paste mixer assembly is delivered to the paste feeder assembly;

c) an olive pitter and stuffer assembly, wherein the pitter and stuffer assembly receives unpitted olives, receives olive stuffing paste from the paste feeder assembly through a paste transfer conduit, removes the pits from the unpitted olives, thereby creating a cavity in each of the olives, injects the olive stuffing paste into the pit cavities in the olives, thereby creating stuffed olives, and washes the stuffed olives, d) a submerging calcium bath conveyor positioned in a tank containing a calcium chloride solution, where the conveyor comprises a conveyor belt with fins, where the revolving belt captures floating olives in the flights between the fins and forces them into the calcium chloride solution, and maintains the olives below the surface of the calcium chloride for a defined period of time. The calcium bath conveyor in the calcium tank receives the stuffed olives from the olive pitter and stuffer assembly and forces the olives through the calcium bath, and e) a brining tank, wherein the stuffed olives are deposited in the brining tank following their exposure to the calcium chloride solution in the calcium bath treatment tank, where the stuffed olives are immersed in a brining solution in the brining tank for a period of time, after which the brining solution is drained from the brining tank, thereby generating brineless, low-acid stuffed olives.

BRIEF DESCRIPTION OF THE DRAWINGS

FIG. 6A provides an illustration showing a view of a single individual serving cup. FIG. 6B provides a longitudinal cross section of the individual serving cup of FIG. 6A. FIG. 6C provides an illustration view of a "multi-pack" comprising four individual serving cups packaged as a single unit for commercial sale.

FIGS. 7A through 7F provide tables showing detailed program steps for retort processing programs. FIG. 7A provides the procedural steps of a sterilizing retort process that uses a 245° F. minimum cook temperature with water spray. FIG. 7B provides the procedural steps of a sterilizing retort process that uses a 250° F. minimum cook temperature with water spray. FIG. 7C provides the procedural steps of a sterilizing retort process that uses a 255° F. minimum cook temperature with water spray. FIG. 7D provides the procedural steps of a sterilizing retort process that uses a 245° F. minimum cook temperature with water spray. FIGS. 7E and 7F provide the procedural steps of two additional sterilizing retort processes.

FIG. 11, in Parts 1 and 2, provides a non-limiting list of examples of olive cultivars and varietals finding use with the invention.

DETAILED DESCRIPTION OF THE INVENTION

Figure 1:
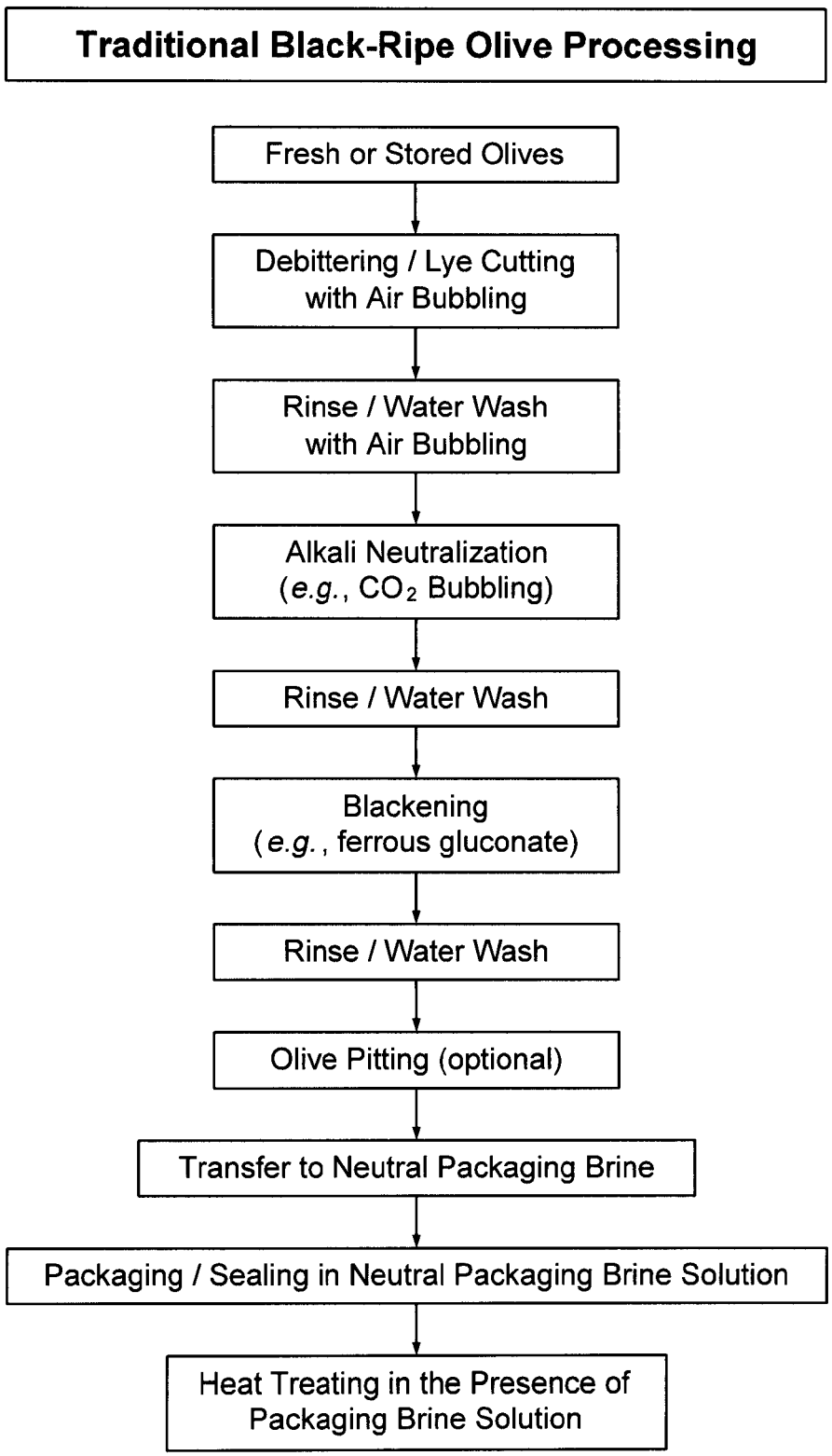
FIG. 1 provides a flow-chart schematic depicting a traditional method for producing California style black-ripe olives.

The present invention provides compositions and methods for the production of low-acid olive preparations. These olive preparations, and the methods for making the same, have a number of advantages over the state of the art, which will be apparent from the discussion herein.

The low-acid olive preparations of the invention, which can include black-ripe olives as well as green-ripe (California style green) olives are packaged without a liquid packaging brine, thereby providing numerous advantages over the present industry paradigm. Preparations of olives that are substantially free of co-packaged liquid, (e.g., a liquid packaging brine) have the benefits of convenience, ease of portability, reduced mess upon opening and eating, reduced weight, and permit a wider range of options for olive stuffings, flavorings and co-packaged food material that increases the appeal of the olives.

In one aspect, a brineless olive preparation in an individual sized serving is appealing because it is "snack friendly," where there is little or no mess from liquid brine that can spill from the can or jar, or drip from the olive once the olive is out of the can or jar. Olives packaged as individual, snack-size servings (intended for one person), without a messy liquid brine solution would hold great appeal for many consumers, especially for children who might include the olive single servings in lunches or on-the-go snacks.

In other beneficial aspects, brineless olive preparations also have appeal in situations where larger quantities are served, displayed or transported. This includes larger packaging options suitable for family sized servings and parties, olive arrangements on aesthetically pleasing platters or trays, and containers having volumes large enough for use in delicatessens and restaurants. Furthermore, if the olives are to be part of a food display, for example, in a delicatessen or restaurant, they can be packaged in aesthetically appealing sealable containers. Also, when the olive packaging is in large volumes, packaging without liquid brine will result in lighter weight containers and products, thereby reducing strain on food service providers and reducing shipping costs.

In other beneficial aspects, the low-acid olive preparations of the invention can contain unique stuffings, infused flavorings, and/or co-packaged food items. In one embodiment, for example, the invention provides low-pH black-ripe olives that are brineless and also stuffed.

The invention also provides methods for producing the low-acid olive preparations of the invention.

Once it was determined that olives could be prepared and packaged as a low-acid food product (pH greater than 4.6; in contrast to acidified olives such as Spanish-style olives), novel methods for heat treating and stuffing the olives were also developed. The invention provides methods for heat treating the olives, where the heat treating is a sterilizing procedure, in contrast to a pasteurization process that uses lower cooking temperatures. The invention also provides novel stuffing methods, where the methods and stuffing formulations are optimized to withstand the subsequent retort sterilization treatment. Stuffing paste formulations that had been previously developed for use in acidified olives (see U.S. patent application Ser. No. 13/885,151, entitled STUFFED, FLAVORED AND PACKAGED OLIVES, international filing date Apr. 26, 2013, herein incorporated by reference in its entirety) were sub-optimal when the higher temperatures of retort sterilization were used to heat treat the stuffed olives. When the higher temperatures of retort sterilization were used with the acidified stuffed olives, the paste texture was soft and fell apart. The present invention provides improved formulas for the paste used to stuff the low-acid olives in order to keep the paste firm after sterilization.

The invention has a number of distinguishing features, as discussed below.

I. Low-Acid Olive Preparations

The present invention provides novel preparations of brineless, ready-to-eat, low-acid olives, meaning that no other processing steps are intended prior to eating. As used herein, the term "preparation" refers to an assemblage of components that were prepared and combined. In some aspects, for example, when the embodiment of the invention is a preparation of low-acid olives, that preparation comprises the low-acid olives and the sealed container packaging in which the olives are located. That sealed container that is used to package the olives can be further subject to other limitations, such as the container having been subjected to a heat treatment, such as retort processing, or the container was packaged and sealed under vacuum, and/or with a nitrogen flush, or any other conditions that provide a low-oxygen, and/or modified atmosphere environment that improve shelf stability.

As used herein, the expression "low-acid" refers to a food product at equilibrium that has a pH of greater than 4.6, but less than about 8.5. Use of the term "low-acid" herein is consistent with the definition of "low-acid" food products as defined in the food industry, and codified at Title 21 of the Code of Federal Regulations, Sections 108, 113 and 114. Low-acid foods are defined in 21 C.F.R. § 113 as those foods having a finished equilibrium greater than 4.6, and a water activity (aw) greater than 0.85.

The low-acid olive products of the invention are characterized by the olive flesh having a pH greater than 4.6, but less than about 8.5. In other embodiments, the pH of the flesh of the olive falls within the inclusive pH range 5.0 to 7.5. In describing the invention, the pH of the olive flesh is determined within the accuracy limits of the available instrumentation, for example, ±pH 0.1.

In contrast to the present invention, olives that are acidified, e.g., having olive flesh that has pH of not greater than 4.6 (i.e., equal to or less than 4.6) are known in the art. See, for example, International Application Publication No. WO2013/163621, entitled STUFFED, FLAVORED AND PACKAGED OLIVES, herein incorporated by reference in its entirety.

Production of low-acid olives as described herein present technical challenges that are distinctly different from acidified olives, as described in Intl. Appl. Publ. No. WO2013/163621. For example, acidified olives are likely to have a longer innate shelf life potential because the lower pH of the olive flesh in the acidified olives will by itself contribute to the suppression of growth of microorganisms. Thus, acidified olives need to be exposed to heat treatment conditions during the production process that are generally not as harsh as the heat treatment conditions used on the low-acid olives in order to achieve comparable levels of commercially acceptable food safety. For example, acidified olives need only to be exposed to retort conditions that result in a pasteurized food product. In contrast, the retort conditions used to treat the low-acid olives of the present invention constitute commercial sterilization.

In some aspects, the description of an olive preparation of the invention implies that certain self-evident steps were taken to prepare the preparation. For example, if an olive preparation of the invention comprises low-acid black-ripe olives, it is assumed that a suitable process for blackening the olives was used. In another example, if a low-acid olive preparation of the invention comprises a sealed container, it is assumed that a container suitable for food storage is used, and a process suitable for sealing the olives in the container is used, as known to one of skill in the art. Some aspects of the detailed description herein are recognizable by one of skill in the art, and are known in the food packaging or food processing arts.

In some aspects, if a preparation of olives of the invention is subjected to some type of processing, that processing can impart known, quantifiable and/or ascertainable properties on the preparation of olives. For example, if an olive preparation of the invention is heat-treated, then it is understood that the olive preparation is shelf stable and has an adequately long shelf life, for example, a shelf life of at least 6 months or 8, 10, 12, 13, 14, 15, 16, 17, 18 months, or preferably longer, for example at least 19, 20, 21, 22, 23 or 24 months. The shelf stability of a preparation of olives of the invention can be expressed as a range, for example, having a shelf life between about 12 and 18 months, or between about 12 and 24 months, or between about 18 and 24 months. Similarly, if the packaging containers of the invention (containing the olives) are subjected to vacuum, nitrogen flushing, sealing, and then heat treatment, it is understood that the preparation is shelf stable and has a suitably long shelf life. In various aspects, the olive preparations of the invention can simply be sealed in a container without vacuum and without nitrogen flushing. Alternatively, the olive preparations of the invention can be sealed either under vacuum, or following a nitrogen gas flush. Alternatively still, vacuum packing and nitrogen flush can both be used to seal the container containing the olives of the invention.

In still other aspects, the olive preparations of the invention are not heat treated. In those embodiments, it is understood that the preparations may have a shorter shelf life than heat treated olives, and/or may require refrigeration following production. Olive preparations of the invention can be refrigerated at any stage during and/or post production, including continuous refrigeration during the entire production and distribution process, all the way to the point of sale.

II. Olive Preparations that are Substantially Free of Liquid

In one aspect, the invention provides preparations of low-acid olives where the preparation is substantially free of liquid. As used herein, the expression "substantially free of liquid" means that the preparation contains insufficient volume of a co-packaged liquid for the liquid to be able to pour freely from the packaged preparation of olives if the container of olives were to be opened, or alternatively, the container contains insufficient volume of a co-packaged liquid for the liquid to flow between and/or over the olives within the container. The possible liquids are any liquid that might be used in olive packaging, including brine, water or oil.

As used herein, the expression "brineless" means that the olive preparation is substantially free of flowing liquid brine solution. That is to say, there is insufficient liquid brine solution to flow from a container or flow over or between the olives in the container. The olives in a brineless preparation of olives may have been treated or soaked in a brine solution prior to packaging in a container, but that preparation is still termed "brineless" or "substantially free of liquid" if there is insufficient liquid volume present to flow or pour from the container after packaging.

In other aspects of the liquid-free olive preparations of the invention, the expression "substantially free of liquid" also means that the preparation can contain an inconsequential volume of free-flowing liquid, where an exceedingly small volume of liquid in the olive preparation does not impair the intended advantages of having a liquid-free olive preparation. For example, very small inconsequential volumes of liquid can appear at the bottom of the sealed olive container following heat treatment due to the cooking process or condensation. Olive preparations having such small volumes of liquid are encompassed within the definition of "substantially free of liquid" and do not impair the intended benefits of the invention.

III. Olives Used in the Packaged Olive Preparations

In the olive preparations of the invention, the particular type of olive that is used with the invention is not intended to be limiting in any way, unless otherwise stated. For example, the olives that are used are not limited to any particular olive production style, cultivar or varietal, size, color, quantity, volume, various organoleptic properties, nutritional value or taste sensation, and all find use with the invention. It is not intended that the invention be limited to any particular olive cultivar or varietal, or combination of cultivars or varietals, to produce the olive preparations of the invention.

For example, although the olive cultivars manzanillo and sevillano are commonly used to produce black-ripe olives in the United States, and can be used to prepare packaged, low-acid olives of the invention, it is not intended that the invention be in any way limited to the use of only these two cultivars, as other cultivars can also be used, which will be apparent to one of skill in the art. A wide array of olive cultivars can be used with the present invention. For example, FIG. 11 provides a partial list of olive cultivars and varietals that can be used to produce the low-acid packaged olive preparations of the invention. It is not intended that the scope of the invention be limited to the varietals/cultivars recited in the EXAMPLES or those listed in FIG. 11.

In some aspects, an olive preparation of the invention comprises a single cultivar or varietal of olive. Alternatively, in other aspects of the invention, a low-acid olive preparation of the invention can comprise combinations of cultivars or varietals in a single olive preparation.

In still other aspects, an olive preparation of the invention can comprise a single olive style, for example, an olive preparation of the invention can comprise only black-ripe olives or only California style green-ripe olives. In other embodiments, an olive preparation of the invention can comprise any cured olive produced in a style that results in an olive having a low-acid flesh of pH greater than 4.6 and less than about 8.5. For example, Castelvetrano-style olives (i.e., any olive cultivar produced by the Castelvetrano method, including but not limited to the Castelvetrano cultivar) have a generally neutral pH flesh after processing, and also find use in the present compositions and methods directed to low-acid, brineless olive preparations. Furthermore, combinations of olive styles that are copackaged also are included in the scope of the present invention, where such combinations can add to the appeal of a low-acid olive preparation of the invention.

In one aspect, olive preparations can include whole or substantially whole unpitted olives, i.e., where the olive flesh is intact or largely intact following the olive processing, as it would be on the drupe. In contrast, an olive preparation of the invention can comprise pitted olives, i.e., without the stone pit. It is understood that stuffed low-acid olive preparations of the invention utilize pitted olives, where the stuffing is injected into the cavity that is formed following removal of the olive stone pit.

The olive material in the low-acid preparations of the invention can be subjected to various degrees of mechanical processing of the olive flesh. For example, this includes black ripe olives or green-ripe olives that have been cut into segments in any number of ways, where the segments are smaller than the whole olive (i.e., the olives are segmented). When provided as olive segments, the degree of segmentation or processing is not limited, for example, olives can be halved, quartered, minced, mashed or pureed. Olives can also be sliced, where generally the olive flesh is sliced to produce olive pieces that are approximately uniform in thickness. It is not intended that olive preparations of the invention be limited to whole olives, pitted or unpitted, or any particular segmented or processed olive material, unless specific language indicates otherwise. Methods, devices, machinery and technology for olive mechanical processing, including pitting, slicing, halving, quartering, chopping, mashing, or forming pastes is well established in the industry, and readily available.

IV. Black-Ripe and Green-Ripe Olive Curing and Processing

In some aspects, the invention provides methods for producing low-acid black-ripe and California style green-ripe olive preparations. See for example, FIGS. 3, 4 and 5. In the methods of the present invention, the techniques that are used to produce the black-ripe or green-ripe olives that will eventually be low-acid, olives are not particularly limited. A variety of methods are known for producing black-ripe and green-ripe olives, any of which can find use with the invention.

Figure 2:
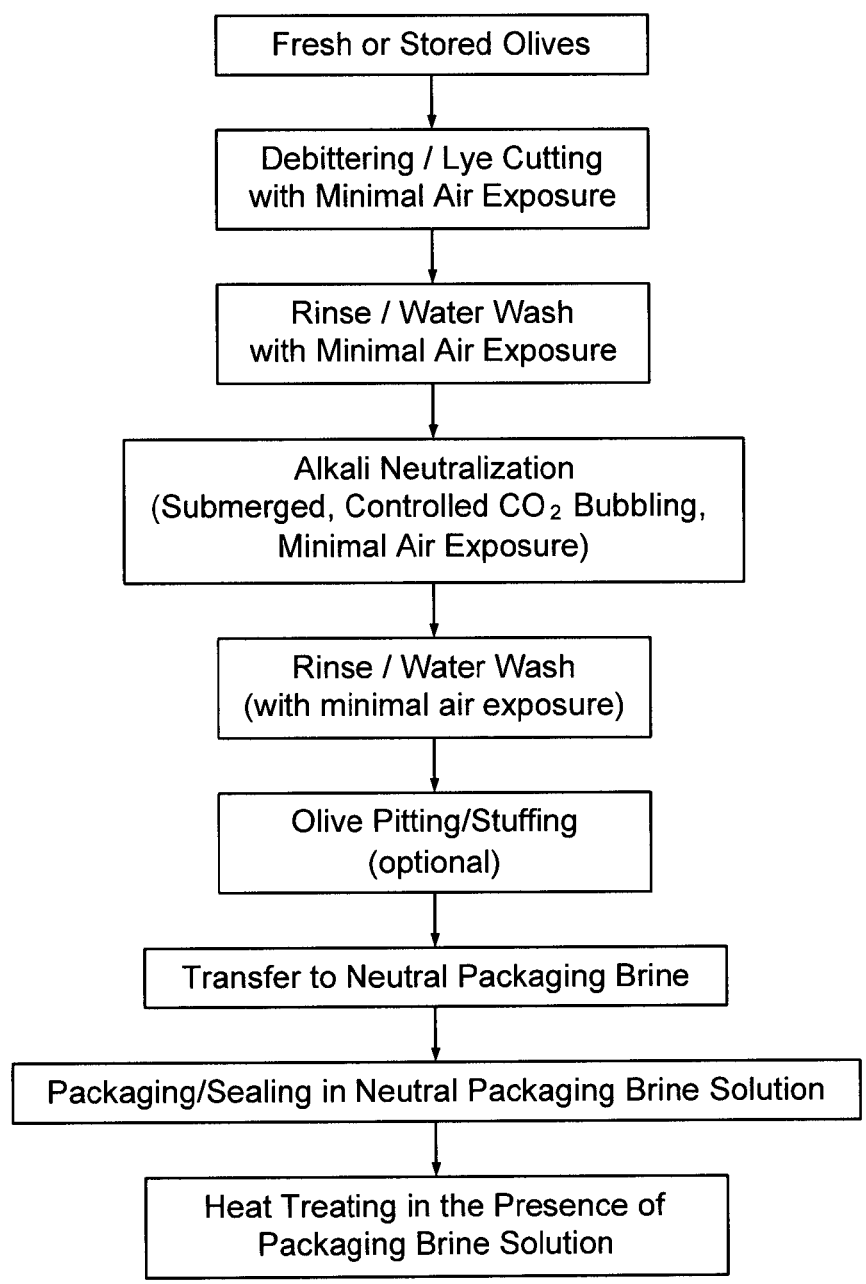
FIG. 2 provides a flow-chart schematic depicting a traditional method for producing California style green-ripe olives.

Traditional methods for producing black-ripe and green-ripe olives are depicted in FIGS. 1 and 2, respectively. These traditional methods initially cure (debitter) the olives using a "lye cut" process with sodium hydroxide solution (lye, also known as caustic soda), or a potassium hydroxide solution, for soaking the olives. The lye cutting step produces an olive that has been fully or partially debittered, but is highly alkaline (pH typically greater than 12) due to the presence of the lye. The pH of those olives is typically reduced in order for optimal oxidative blackening (i.e., alkali neutralization as shown in FIG. 1 and FIG. 2). This neutralization is traditionally accomplished using $CO_2$ bubbling, which lowers the pH of the olives ideally to within the target range of about 8.5 to 9.0, although pH as high as 9.5 can be sufficient. When preparing black-ripe olives, the deep black color of the olive is produced by treating the olives with ferrous gluconate, which is optimized at conditions where pH falls within 8.5 to 9.0.

It is not intended that the invention be limited to any particular method for producing the black-ripe olives that will be used to produce the low-acid, black-ripe olives of the invention. For example, the processes for lye cutting is well established (FIG. 1 and FIG. 2), and numerous variations of that method exist, for example, by varying the concentrations of sodium hydroxide or potassium hydroxide in the lye solution, varying the soaking times in the lye solution, making multiple lye cuts using a series of lye treatments that can differ in lye concentration or soaking times, or the addition of other components in the lye treatment, for example, by making the lye cut in the presence of a brine solution.

In the methods of the present invention, olives can be blackened to produce black-ripe style olives using the traditional ferrous gluconate process as shown in FIG. 1, but any other process or reagent for darkening the olives can also be used. For example, but not limited to, oxidation in ambient air, or blackening by the addition of any other suitable oxidizing agent such as ferrous lactate or manganese gluconate also find use with the present invention for producing low-acid, black-ripe olives.

It is not intended that the compositions or methods of the invention be limited to utilizing any particular method for olive curing or olive blackening when low-acid, black-ripe style olives of the invention are to be produced. The numerous variations for producing black-ripe olives that are known in the art also find use in the presently claimed invention for producing low-acid, black-ripe olives.

Similarly, it is not intended that the invention be limited to the use of any particular method for producing green-ripe olives that will eventually be low-acid, green-ripe olives of the invention. For example, processes for olive curing (debittering), such as lye cutting, for the production of green-ripe olives are well established, and numerous variations of that method exist. In some embodiments of the invention, olive curing is by a particular method known in the art, such as by the Castelvetrano-method to produce Castelvetrano-style green olives. The Castelvetrano method uses lye-cutting to debitter the olives, and also finds use within the scope of the methods of the invention.

Furthermore, in the methods of the invention for producing the low-acid black-ripe and low-acid green-ripe olive preparations, the technique for curing the olives is not limited to any type of method, as methods of the invention can utilize water curing, brine curing, fermentation, lye (caustic soda) curing or any suitable chemical curing method to initially produce the olives that will be transformed into the low-acid black-ripe and low-acid green-ripe olive preparations. Generally, the curing methods that find optimal use with the invention are those methods that produce olives with low-acid flesh (including pH neutral or near pH neutral), or curing methods that permit treatment of the cured olive in order to change the pH of the olive flesh either upward (alkalinization) to pH above 4.6, or downward (acidify) to arrive at an olive having a flesh of not more than about 8.5.

In the case of both low-acid black-ripe and low-acid green-ripe olive production methods of the invention, $CO_2$ bubbling is commonly used to lower the pH of the olive flesh following lye cutting. In the case of green-ripe olives, the $CO_2$ bubbling is usually kept to a minimum and without agitation in order to prevent unwanted oxidation that will turn the green olives a less-appealing brown color, as known in the art. However, it is not intended that the methods of the invention be limited to the use of $CO_2$ bubbling to lower the pH of the olive flesh following lye treatment. For example, any suitable method can be used. For example, the addition of any acidulant suitable for use in food processing, such as lactic acid, citric acid, glucono-delta-lactone (GDL), malic acid or adipic acid, can also be used to lower the pH of the lye-treated olives.

As used broadly in the art, a "neutral olive" or "neutral brine solution" can refer to any olives or brining solution that is not "acidified," i.e., where the olive or the brine has a pH greater than 4.6. As used in the art, the term "neutral" may also refer to narrower conditions where the pH is approximately 7.0, or in a range very tightly clustered near pH 7.0, for example, between 6.5 and 7.5. As used herein, it is intended that the expression "low-acid" will encompass (but not be limited by) the term "neutral," where a "low-acid" olive preparation of the invention can comprise olive flesh having a pH greater than 4.6, and will also encompass a generic definition of neutral where the olives can have a pH that falls within the range 6.5 to 7.5.

V. Methods for Producing Low-Acid Olives Free of Liquid Brine

The present invention provides methods for preparing low-acid, brineless olive preparations, i.e., olive products where the olive flesh has a pH greater than 4.6, but less than about 8.5, and where the final packaged product does not contain any liquid in the packaging container. These methods are depicted schematically in FIG. 3, FIG. 4 and FIG. 5.

In these methods, olives are first cured by any desired technique, as discussed above. The olives thus produced can be black-ripe olives, green-ripe olives, or olives produced by any other technique, for example, by the Castelvetrano method (a variation of green-ripe olive processing). These cured olives are then rinsed by any suitable method.

Rinsing of the olives, either after the curing step, or at any other step in olive processing, is typically with water, but rinsing with a brine solution or other solution can also be used. The rinsing step can be accomplished by a brief immersion in a rinse liquid such as water, or by exposing the olives to a flow of water, or by any combination of these. In some embodiments, the rinse step can be a soaking for a timed duration, for example, in water. The rinse can occur when the olives are stationary, such as when the olives are in a large tank, and the tank is filled with water, and then promptly drained of the water wash. Alternatively, the olives to be rinsed can travel on a moving conveyor or trough, and be exposed to a rinsing flow of water. A rinsing step can also comprise agitation, where the olives can be stirred, shaken or rotated while in the rinse step. Multiple rinses at any one step can also be used.

Rinsing steps in the methods of the invention can optionally be used at various points in the methods, for example, before or after lye cutting, alkali neutralization, olive blackening, olive pitting, olive stuffing, treatment in the prepackaging brine, or immediately prior to brineless packaging and sealing.

Figure 3:
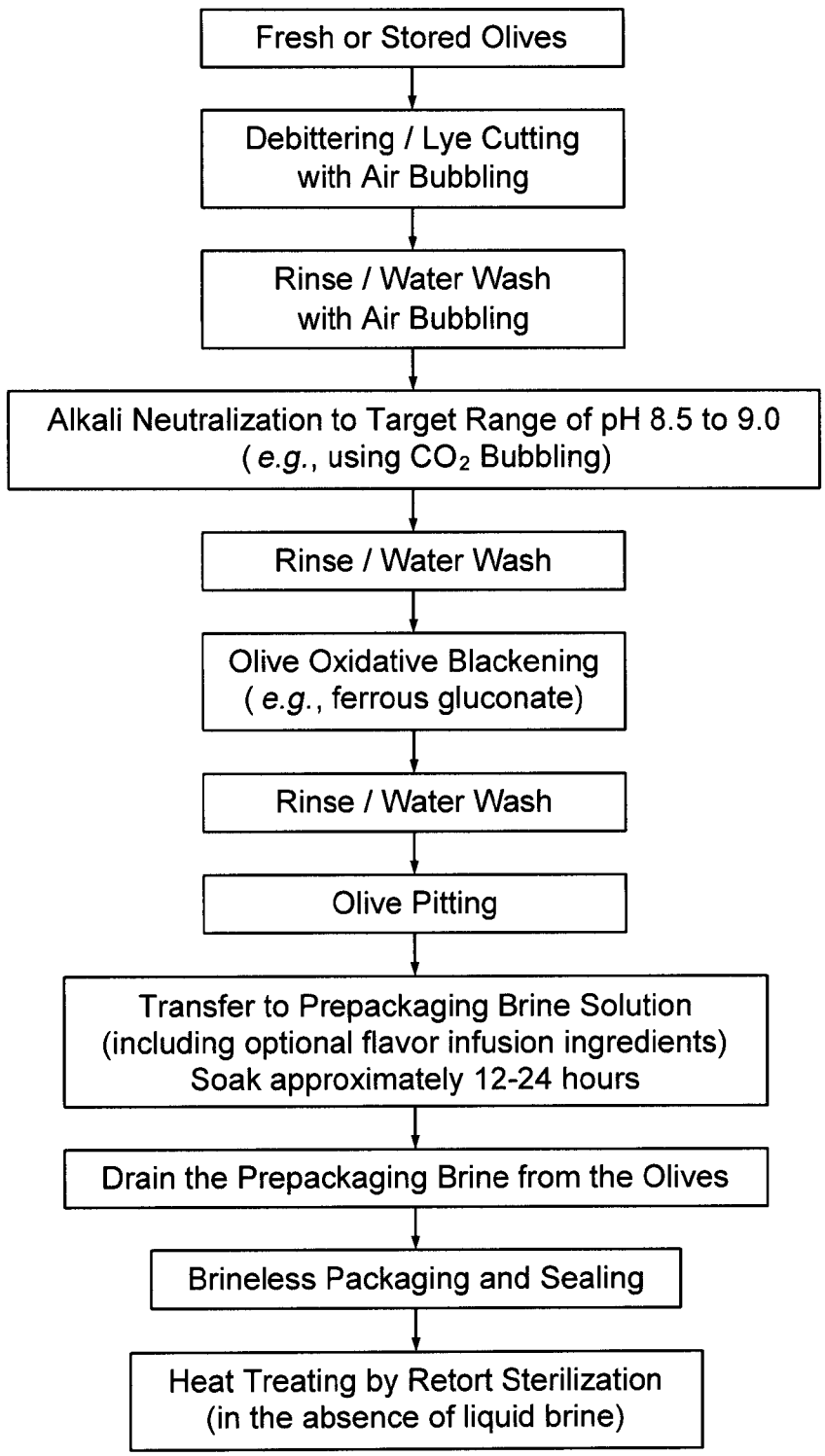
FIG. 3 provides a flow-chart schematic depicting methods for producing low-acid, pitted black ripe olives that are free of liquid brine.
Figure 4:
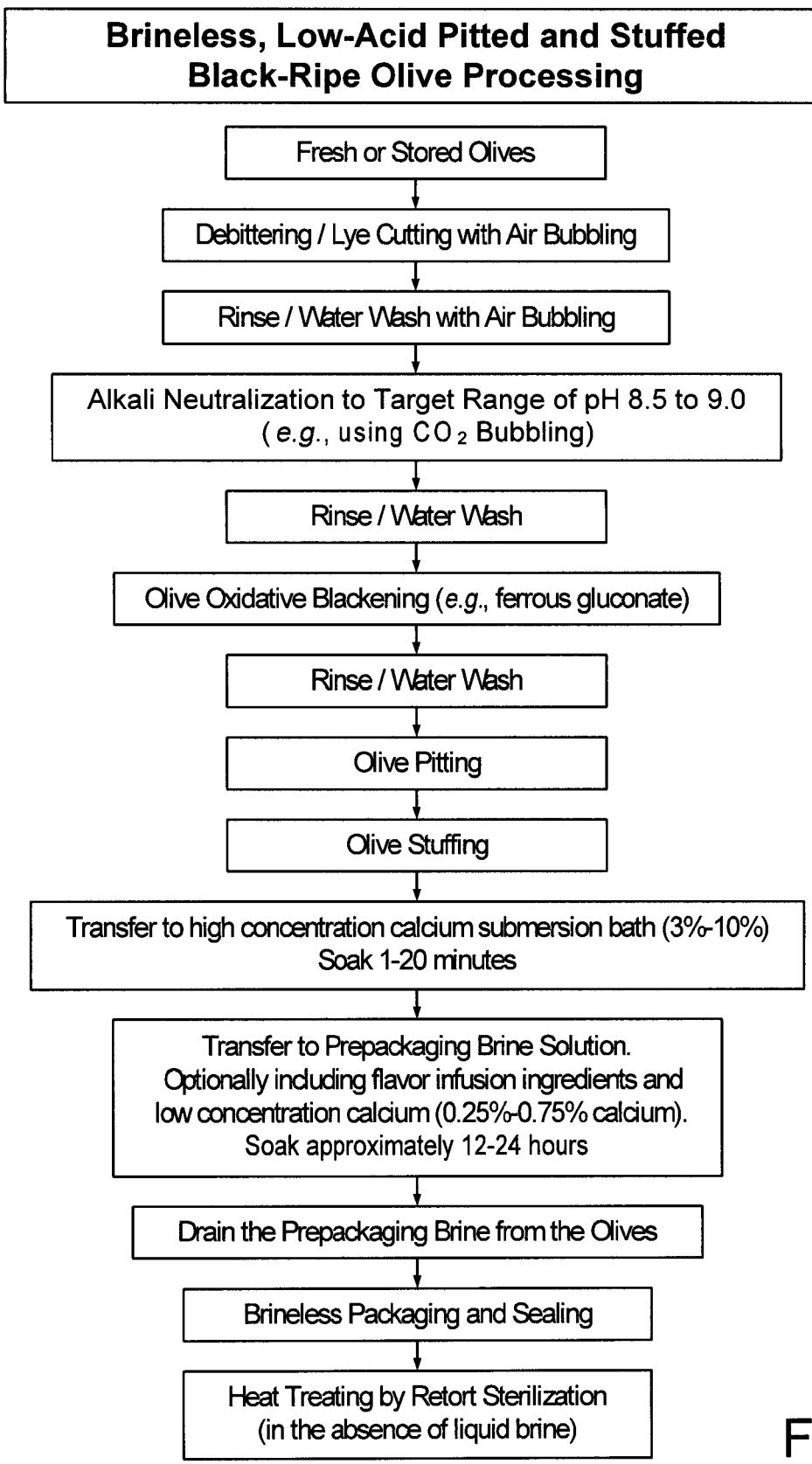
FIG. 4 provides a flow-chart schematic depicting methods for producing low-acid, pitted and stuffed black ripe olives that are free of liquid brine.
Figure 5:
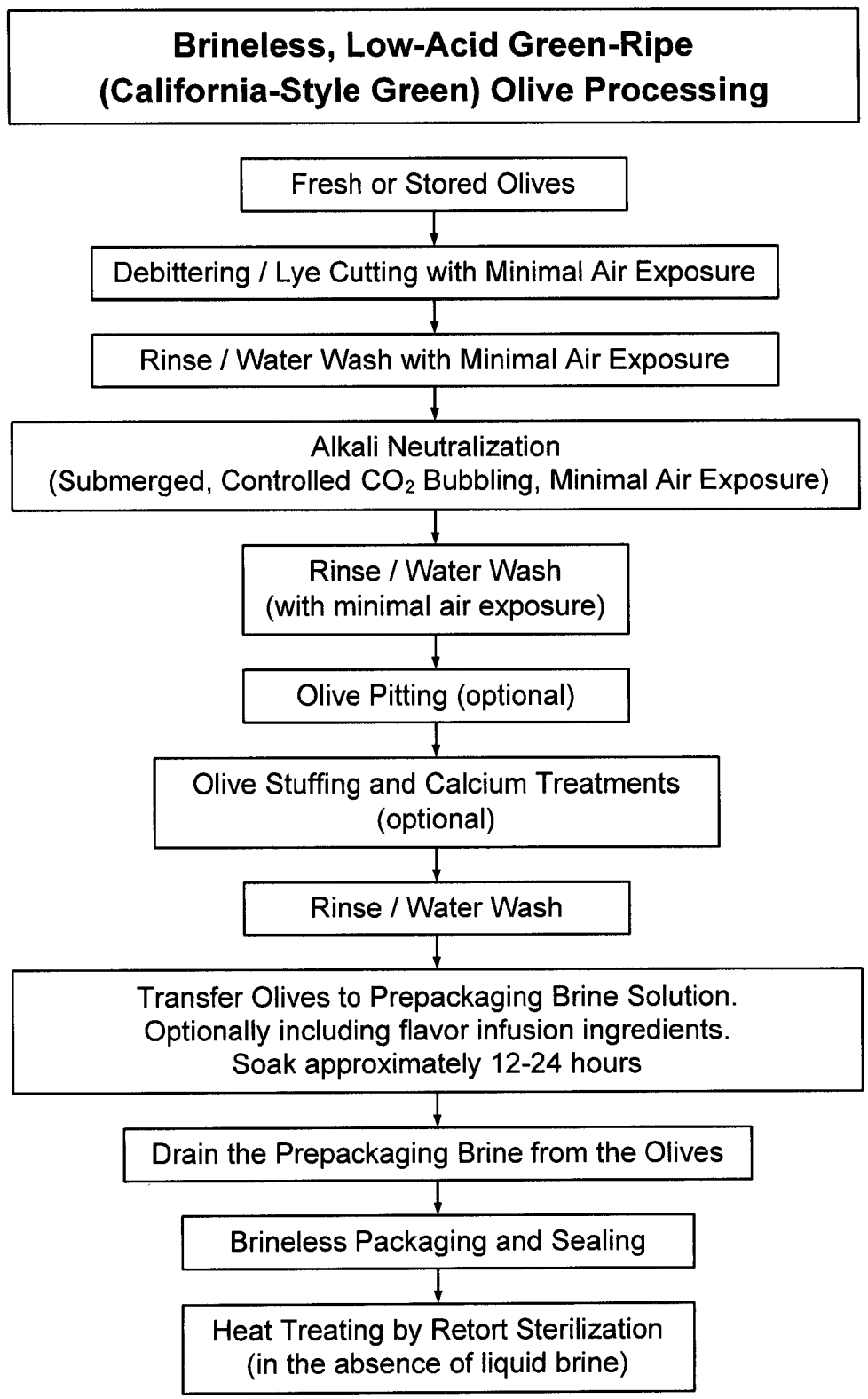
FIG. 5 provides a flow-chart schematic depicting methods for producing low-acid, California-style, green-ripe olives that are free of liquid brine.

Following the olive curing and rinsing, the olives can be subjected to any desired optional further processing, such as pitting or stuffing, then optionally rinsed. Following any optional processing and additional rinsing, the olives are transferred to a low-acid prepackaging brine solution. This prepackaging brine solution comprises minimally a salt brine, typically but not exclusively sodium chloride, at a concentration between about 3.5% and 5.5%, or more favorably, in a concentration range of about 3.88% to about 4.75%, and in some embodiments, is about 4.75%. The pH of this brine is approximately in the range of 5.0 to 7.5. Adjustment of the pH with any acidulants, alkaline agents or pH buffers is generally not required, but can be used if necessary in order to adjust the pH of the brine to within the range 5.0 to 7.5. This prepackaging brine solution is used in the methods for producing low-acid olives, as depicted in FIGS. 3, 4 and 5.

In the case where black-ripe or green-ripe processed olives are used to produce the low-acid olives of the invention, the olives remain in this prepackaging brine typically for 16-24 hours, typically at room temperature, although this range is not limiting. The times within that range for treating the olives in the prepackaging brine can vary. Optimal times within that range are empirically determined. The temperature of the brining environment can be one factor that determines optimal brining times. The brining can take place in brining tanks that are located either in an indoor facility, or can be outdoors. In either case, the operator may not be able to control the temperature within the brining tanks or the temperature of the surrounding ambient air. If that is the case, the brining times can require adjustment either up or down. In warmer temperatures, shorter brining times can be required, for example, as short as 6 hours. In colder temperatures, longer times may be necessary, for example, as long as 48 hours. The tanks in which the prepackaging brining takes place can optionally be directly heated or cooled (e.g., by refrigeration or heating) or simply by controlling the temperature of the surrounding ambient air) for the purpose of maintaining batch consistency in situations where there are extremes of warm or cold ambient air.

Empirical determination of optimal brining times will take into account the thoroughness of the brine penetration, the thoroughness and intensity of any infused flavors if flavorings are included in the prepackaging brine, and preservation of the desired organoleptic properties of the olive, such as texture, firmness and color.

The prepackaging brine treatment has at least three beneficial effects. First, the brine penetrates the olive flesh, thereby giving the flesh the distinctive brined-olive taste and other desired organoleptic properties. Second, the brine soaking will bring the pH of the olive flesh into the low-acid value range, i.e., a pH greater than 4.6, but less than about 8.5. Third, the salt in the brine has an anti-microbial effect, thereby preventing or limiting the growth of some microorganisms during and after the prepackaging brine treatment.

In addition, the treatment in prepackaging brine solution can simultaneously be modified for other beneficial purposes. First, for example, the prepackaging brine can optionally and additionally contain flavorings that can infuse into the olive flesh during the prepackaging brine soaking treatment. This flavor infusion can also penetrate into the stuffing material in the case where pitted and stuffed olives are being produced by the methods of the invention. The flavor infusion ingredients finding use with the invention are not limited to any particular ingredient or combination of ingredients, regardless of whether or not such ingredients are recited herein. Examples of flavor infusions are provided herein only to illustrate the use of flavor infusion ingredients, and are not intended in any way to limit the invention to the use of any particular flavoring ingredient or combination of ingredients.

In the case where flavor infusion ingredients are added to the prepackaging brine solution, these ingredients have a tendency to lower the pH of the brine. However, the brine remains in the pH range of 5.0 to 7.5, even in the presence of the flavoring ingredients, and the reduced pH of the brining solution has no impact in producing olives that have a low-acid flesh with equilibrium pH greater than 4.6 and less than about 8.5.

Second, and optionally, sweeteners can find use with the invention in either the stuffing or the brining solution. For example, sweeteners that can find use with the invention include, but not limited to, sucrose, beet syrup, dextrose, luo han guo (monk fruit), stevia, sucralose and honey.

Third, and optionally, the prepackaging brine solution or stuffing can also contain other beneficial taste components, such as masking agents or flavor enhancers, which, although not necessary for production of the low-acid olives of the invention, can impart improved taste qualities to the olive products. Ideally, these additives would not add their own strong flavor component that would hide or overwhelm the intended flavor of the olive or the stuffing, and will not interfere with any aspect of the process for producing low-acid, brineless packaged olives. A wide range of masking agents and flavor enhancers can find use with the invention, for example, MSG, SENSIENT® SMOOTHENOL® Natural Masking Liquid, OTTENS FLAVORS® Natural Sweetness Flavor Enhancer, OTTENS FLAVORS® "Inhibitter", "Natural Flavor Blend", and BELL FLAVORS & FRAGRANCES Natural Masking Agent. It is not intended that the present invention be limited to the use of these particular additives, as one of skill in the art will recognize that any flavor enhancer, masking agent, or any combination thereof, can be used with the present invention.

Third, in another aspect where the methods of the invention are used to prepare stuffed olives containing a sodium alginate and/or guar gum based paste-style stuffing, the prepackaging brine can optionally contain calcium chloride ($CaCl_2$) to aid in the hardening of the stuffing paste. In some embodiments, the concentration of the calcium chloride used in the prepackaging brine solution is at a lower concentration (e.g., 0.10 to 1.0%, or 0.25 to 0.75%, or 0.50% to 0.75%, or more favorably in some embodiments, about 0.75%. In contrast, the first calcium bath treatment that occurs immediately following injection of the stuffing paste is done in a concentration of about 3% to 10% calcium chloride. See EXAMPLE 5 and FIG. 4.

At the end of the prepackaging brine treatment step (see FIGS. 3 through 5), the brine solution is removed, typically by draining the prepackaging brine from the brining tank, followed by an optional wash step.

VI. Olive Shine Coatings

The invention provides low-acid olives that are packaged without any free liquid. One difficulty with that packing method is that in the absence of liquid, olives may appear dull and wrinkly. To overcome this problem, the olives contained in the olive preparations can advantageously comprise a thin coating of an oil or other shine-imparting agent to create an aesthetically pleasing sheen, shine or gloss on the surface of the olives. This oil shine can be added to the olives after removal from the brine treatment and before sealing in any type of containers.

Any suitable shine-agent (e.g., an oil) and in the proper volume and concentration can be used. Considerations include (i) what is the minimal application to give a shine to the olive, but will not stain the consumer's fingers while holding the olive; (ii) find an oil that does not impart its own taste to the olive preparation, or if the oil does have a taste, find an oil where the taste is not incompatible with the olives, or itself has a pleasing taste; (iii) find an oil that does not have a tendency to turn rancid, especially at warm temperatures; (iv) determine the optimal dilution of the oil that can be used (if any diluting is required), in order to minimize the absolute amount of oil to be added, and also to minimize the total liquid volume to be added; (v) use an oil that does not have a tendency to crystallize or solidify at cold temperatures.

Using these criteria, any number of oils and concentrations can be used. For example, any of the following, either alone or in combinations, can find use as a shine coating. These are olive oil, winterized olive oil, purified olive oil, canola oil, Duralox® Natural Antioxidant, and sunflower oil.

VII. Olive Packaging Materials

Following removal of the prepackaging brine, the treated olives are packaged and sealed in suitable containers. In some embodiments, the containers used in the olive preparations of the invention are cups that are sealed by a foil or plastic film using a suitable heat seal or adhesive seal. The container is opened by peeling away the lidding material.

In some embodiments, the olive preparations are packaged into rigid or semi-rigid plastic cups or larger plastic containers, where the plastics used can be any suitable plastic or other polymer. In some embodiments, it is preferred that the cups are manufactured in transparent or translucent materials so that the contents of the cups, i.e., the olives, are visible.

In some embodiments, the plastic containers are formed from polymers, for example, a polypropylene, or polymer blends that contain suitable concentrations of ethylene vinyl alcohol (EVOH), a copolymer of ethylene and vinyl alcohol. EVOH has advantageous properties, notably its ability to serve as an effective oxygen barrier. In some embodiments, containers used to package the olive preparations can be formed from co-extruded polymers containing EVOH, or alternatively still, the containers can be formed from layered combinations of polymers that are laminated to each other, where at least one of the laminated layers is EVOH or comprises advantageous concentrations of EVOH to provide an effective oxygen barrier.

Although some preferred embodiments utilize EVOH in order to give the plastic cups suitable oxygen barrier properties, the invention is not limited to cup structures that comprise EVOH. Other materials can be advantageously used in lieu of or in addition to EVOH to form a cup having effective oxygen barrier properties with low oxygen-exchange rates. For example, such materials include but are not limited to, aluminum oxide or silica oxide.

VIII. Lidding Materials

In some embodiments, the cups or other types of containers are sealed with a thin lidding material such as a foil-type film or a plastic film, which forms a seal by attachment with an adhesive or by heat sealing (or a combination of heat sealing and adhesive). The lidding material can be any suitable material, for example but not limited to, a metallic foil (e.g., an aluminum foil) or a polyethylene (plastic) film, as known in the industry, and are applied with an adhesive or by heat to the plastic cup or container, and are removed by peeling off of the film. The films are typically not resealable after they are removed. The lidding material for the containers or cups can also be formed from multi-layer structures containing a thin layer of EVOH laminated on or between layers of other materials such as cardboard, foil or plastics/polymers. In other embodiments, the primary lidding that forms a sealed olive preparation is simply a screw-on or snap-on type of closure such as any type of lid that creates a sealed environment.

The material used to form the lidding for the sealed cups of the invention is not particularly limited, except that in some advantageous embodiments, the lidding material provides an effective oxygen barrier.

In some embodiments, the plastic cups or other types of containers that are sealed with a metallic foil or plastic film lidding material can optionally further comprise a secondary mechanism forming an "overlid" over the primary plastic film or foil covering, ideally where this secondary lidding can be conveniently removed and reapplied to form a resealable container after the foil or plastic film has been removed. The reusable secondary lidding can be made of any material, for example, a flexible polypropylene, and for example, and can be a snap-on type lid or a screw-type lid.

In other aspects, the olive preparations of the invention can be packaged in containers formed from any suitable materials, including but not limited to traditional steel cans, which may or may not be tin-plated. In other aspects, the olive preparations of the invention can be packaged in containers formed from glass, and may have a resealable lid mechanism, such as a screw-type lid that can be made from steel, plastics, or any other suitable material or combinations of materials (including, e.g., a rubber gasket), as known in the industry.

IX. Packaging Container Geometries and Cups

It is not intended that the olive packaging containers used in conjunction with the olive preparations of the invention be limited in any way, for example, by size, materials, shape, volume of the containers, weight or volume of the packaged olives, or intended use, except where specifically recited.

In one aspect, an olive preparation of the invention is packaged in a suitably sealed individual serving. This single serving ideally has ease of portability, and allows for mess-free eating where little or no residue from the olives might get on one's fingers while eating. This single serving container can be sealed in a manner that allows easy opening without exertion nor requiring good hand strength, as is often required for traditional jars or cans.

In some embodiments, the olives that are packaged in individual serving sizes, also termed a "snack size" or "snack pack," number not more than about 5 whole olives. Alternatively, an individual serving size container can contain olives that number not more than 6, or 8, 10, 12, 15, 20 or 25 olives. Alternatively, the olives that are contained in the individual serving size olive preparations weigh about (or not more than about) 1.0 ounces, 1.4 ounces, 1.5 ounces, 1.6 ounces, 1.8 ounces, 3 ounces, 3.5 ounces, or 4.2 ounces. Alternatively still, the individual serving size packaged olives can be packaged in containers having liquid volume capacities of not greater than, for example, 2.0, 2.5, 3.0, 3.5, 4.0, 4.2, 4.5 or 5.0 fluid ounces.

Figure 6A:
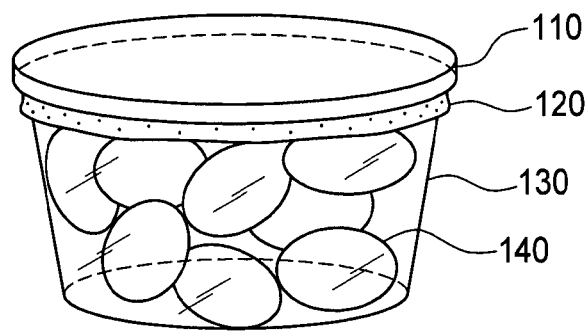
FIGS. 6A through 6C provide illustrations of embodiments of the olive preparation of the invention that are packaged in individual serving cups.
Figure 6B:
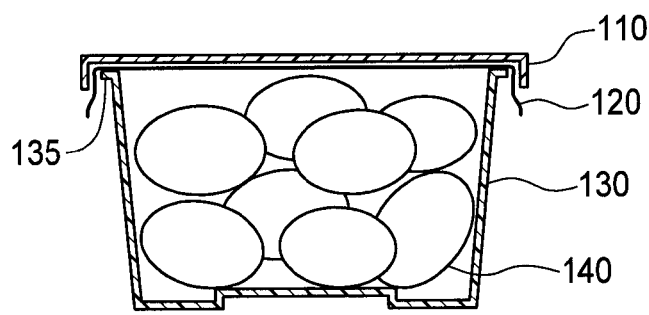
Figure 6C:
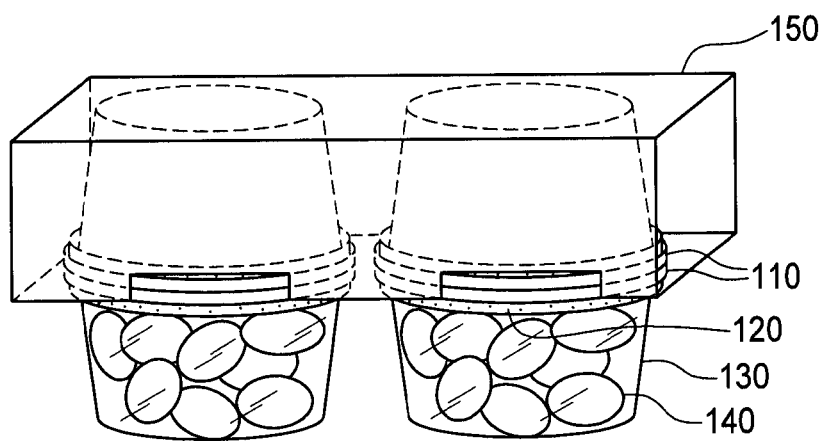

Non-limiting embodiments of the invention for snack-size individual servings of an olive preparation of the invention are shown in FIGS. 6A through 6C. In each of these figures, the olives are packaged in a plastic cup 130 where each cup is approximately 4.2 fluid ounces packaged with either stuffed or unstuffed olives. When pitted olives without stuffing are packaged, anywhere from 1.1 to 1.3 oz by weight can be packaged, with 1.2 oz (34 grams) as the typical target packaging weight. When pitted olives with stuffing are packaged, anywhere from 1.5 to 1.7 oz by weight, or as high as 1.8 oz by weight, can be packaged, with 1.6 oz (45 grams) as the typical target packaging weight.

FIG. 6A provides an illustration showing a view of a single individual serving cup. This single serving cup 130 contains olives 140, where the cup is free of any free flowing liquid, e.g., liquid brine. The cup 130 is sealed with a thin foil or plastic lidding material 120 that is attached to the lip of the cup 135 using a suitable heat seal. The embodiment shown in FIG. 6A further comprises an optional plastic overlid 110 that can be used to reseal the container 130 after the thin lidding material 120 is removed.

FIG. 6B provides a longitudinal cross section of the individual serving cup of FIG. 6A. As can be seen in this figure, but is obscured in FIG. 6A, the lidding material 120 is tightly associated with the plastic cup 130 around the circumference of the cup along the lip of the cup 135, resulting in a sealed cup after application of the lidding material 120. As shown is FIG. 6B, the overlid 110 lies on top of the lidding material 120, and is closely associated with the cup 130, and specifically the lip of the cup 135. After removal of the lidding material 120 from the cup 130, the overlid 110 can be reapplied to again seal the cup 130.

FIG. 6C provides an illustration view of a "multi-pack" comprising multiple individual cups 130 packaged as a single unit for commercial sale. Each cup 130 in the multipack is sealed with a lidding material 120, and optionally further has an overlid 110 that can be used to reseal the cup 130 after removal of the lidding material 120. In one embodiment as shown here, the multipack contains four cups held together by an exterior wrapping (packaging) 150 that can be of any material or configuration, for example but not limited to cardboard or plastic. The exterior wrapping 150 can comprise writing such as manufacturer's information, description of the cup contents, nutrition information, volume or weight. The exterior wrapping can also comprise coloring, insignia, logos, trademarks, decoration and/or any type of adornment. The lidding material 120 on its outer face or inner face can also comprise any type of writing or adornment.

It is not intended that the invention be limited to olive preparations that are packaged in cup-type geometries. Other sealed container types, shapes and configurations also find use with the invention.

In some aspects, the olive preparations of the invention can be packaged in flexible bags or pouches, as known in the industry. Re-sealable and non-resealable designs are contemplated. Such designs includes bags of any type, flat pouches, stand-up pouches, pouches with side gussets, and pouches with bottom gussets. Such packaging can be standard foil-type, or polymer (e.g., polyethylene, polypropylene, and/or cellophane), or metalized, and can optionally contain a viewing window. The pouches can be optionally resealable by, for example, a slider zip-lock type mechanism or a press-to-close mechanism.

In other embodiments, containers used in packaging the olive preparations of the invention can also advantageously be any size larger than single serving size. For example, larger olive preparations in sealed containers can be about 6 fluid ounces, 8 ounces, 12 ounces, pint size containers or quart size containers. In some embodiments, these larger olive preparations can be packaged in rigid or semi-rigid plastic containers (similar in construction and materials to the smaller snack-size containers), or any other type of containers, for example, in cans or in glass jars. These larger container sizes can also comprise a foil or plastic lidding material as well as an optional resealable overlid or cover. The container geometries are not limited, and can include, for example, squares, trays, platters, dishes, bowls or larger storage containers such as drums, jugs or buckets.

In some embodiments, the containers used for the packaged olive preparations of the invention are sealed trays or sealed platters of olives. These sealed trays are convenient for serving the olives directly from the tray containers, for example, at dinners, social events, restaurant salad bars or delicatessens. In some embodiments, the sealable containers are 9 inch×11 inch×3 inch deep trays for institutional use. The tray or platter containers used for these larger packaging sizes can comprise aesthetically pleasing design elements that make them attractive for display at dinners, social events, restaurants, or delicatessens. For example, the trays or platters can be different colors or shapes, or be decorated with holiday theme ornamentation. When large size containers of packaged olive preparations of the invention are to be displayed, for example at a supermarket olive bar or in a restaurant, those containers can also contain design elements that make them aesthetically pleasing. In some aspects, the larger size packaging options of the invention can find use in restaurant kitchens, schools, hospitals or any other places where food preparation is done.

X. Modified Atmosphere Packaging

In some aspects, the invention provides olive preparations that are shelf stable for advantageous periods of time, i.e., the olive preparations have a useful shelf life. The packaging and sealing of the olives in the containers, including the choice of packaging materials, can be done in a variety of ways to promote shelf stability.

In some preferred aspects, sealing the containers with the olives uses a minimized-oxygen (e.g., substantially oxygen-free or reduced-oxygen) modified atmosphere environment. This promotes shelf life, reduces spoilage and preserves the intended flavors and other organoleptic properties of the olives. Oxygen in the sealed containers can potentially result in oxidation of the fat component of the olive leading to rancidity and off flavors. Reducing the oxygen within the sealed containers can be accomplished using any of a variety of methods known in the art, including but not limited to packing under vacuum conditions, packing under nitrogen gas, packaging following nitrogen gas flushes, nitrogen flushes in combination with vacuum application, use of oxygen scrubbers, or use of other modified atmospheres that suppress the degradation of packaged food products.

The containers used to package the olive preparations of the invention optimally provide an oxygen barrier between the olives that are sealed in the container and the outside environment. This barrier prevents the ingress of oxygen from ambient air after packaging and sealing the containers. The containers that provide an oxygen barrier can be "substantially impervious" to oxygen, where the ingress of oxygen is negligible over a time period, for example, one month, 6 months, 12 months, or 18 months, or 24 months. Sealed containers that are substantially impervious to oxygen are able to maintain a reduced-oxygen atmosphere for a given time period, for example, the time periods stated above.

In some embodiments of the invention, the sealed container comprising the olives is characterized by an oxygen concentration not greater than about 0.50%, or more preferably, not greater than about 0.20%, or not greater than about 0.15%, or not greater than about 0.10%.

XI. Heat Treating and Retort Processing

The packaged olive preparations of invention can be heat treated. Furthermore, the methods of the invention used to produce packaged liquid-free low-acid olives can optionally employ a heat treatment step after the sealing of the container containing the olives. As used herein, the expression "heat treating," "heat treatment" or similar expressions can encompass a variety of different heat treatment processes.

For example, in some aspects, heat treating includes any type of retort processing. Retort processing generally is a method for heat treating sealed containers where there is an equilibrated environment (i.e., a minimized pressure gradient) between the sealed container interior pressure and the retort chamber pressure. The temperate and pressures are regulated in such a way that prevents an adverse impact on seal integrity and "paneling" or distortion of the cup. As the temperature in the retort increases, the internal cup temperature increases causing an internal pressure increase. The overpressure in the retort chamber is gradually increased to match the rising pressure inside the sealed container. When the heating process is completed, the retort and cup are gradually cooled requiring the overpressure to be gradually decreased as the internal cup pressure decreases with temperature. Ideally, retort processing preserves the integrity of the food container and maintains the integrity of the seal on the food container. Particular conditions for the overpressure process are optimized (sometimes empirically) for each particular food product and sealed container. Ideally, the retort process is designed to minimize any adverse effects on the organoleptic properties of the food product.

Generally, retort processing is a process for the pressurized heat treatment of food products in a manner where the container containing the food product can remain sealed and where the heating and subsequent cooling are done in a controlled manner that causes minimal damage to the organoleptic properties of the food product, as well as minimizing damage to the packaging material that is used to contain the food material. It is understood that the expression "retort processing" does not define a single set of temperature and pressure conditions. Instead, retort processes encompass a wide range of temperature and pressure conditions that are adapted according to variables such as what types of food product is involved, what type of food packaging is used, what are the relative volumes of the airspace in the product (including headspace), the actual volume of the food product, and what, if any, volume of liquid is co-packaged with the food product.

In some embodiments, the retort processing is an overpressure retort process. When an overpressure retort process is used, the retort program is a multistep process that includes application of heat, application of an optional water spray that comes in contact with the containers within the retort chamber, the introduction of pressurized air to balance the pressure inside the sealed containers with the external pressure in the retort chamber, holding the sealed container at a defined temperature and pressure for a set length of time, and the controlled reduction of the pressure and temperature, with care to maintain the integrity of the sealed container. In some embodiments of the invention, the retort processing used is not an overpressure retort process.

There is no single set of conditions that define retort processing. The process can vary depending on the desired result of the heat treatment. For example, retort processing can be used to achieve sterilization, e.g., commercial sterilization, where the retort temperatures and pressures are great enough to sterilize the olive preparation and kill all live pathogens, compliant with the definition of "commercial sterility" provided in Title 21 of the Code of Federal Regulations (C.F.R.) at Section 113. Alternatively, a retort process can be used to pasteurize a food product, where the heat treatment uses conditions that only reduce the number of live microorganisms that are in the food product (in contrast to complete eradication of live microorganisms that can be achieved with sterilization).

The sealed containers used in the olive preparations can be selected for their properties to provide an oxygen and moisture ingress barrier as well as for their ability to withstand retort temperature and pressure conditions. In preferred embodiments, a plastic cup is used that retains its structural and functional integrity during the retort process. For example, such a cup will not melt, crack, bulge, expand, barrel, buckle, dent, panel, shrink or significantly distort at a set of given retort conditions. Also, a retort tolerant plastic cup is a cup that retains its chemical or physical properties after being subjected to a particular set of given retort conditions. For example, in preferred embodiments, the plastics used to produce the packaging cups will not lose their oxygen-barrier properties after being subject to a defined retort process.

One example of a retort process finding use with the invention is provided in Example 10 and FIG. 7D. It is understood, however, that the invention is not limited to any one particular set of retort conditions, because retort programs will vary depending on variables such as the volume of olive material to be retorted, and the size, shape and composition of the packaging materials.

Although the retort processes provided in FIGS. 7D, 7E and 7F were optimized for achieving sterilization with minimal impact on the organoleptic qualities of the olives, one of skill in the art will recognize that by making minor changes in the parameters of any retort program of FIG. 7D-7F, additional effective retort programs can be derived. These derived retort programs find use with the present invention, where the programs will (i) sterilize the packaged product, (ii) preserve physical integrity of the cup, and (iii) will not have any significant detrimental impact on the organoleptic properties of the olives. The design of alternative and functionally equivalent retort programs is within the ordinary skill of one familiar with the art, and furthermore, such retort programs are within the purview of the present invention.

In still other embodiments, the packaged olives of the invention are not subjected to retort processing, and alternatively, can be subjected to any suitable sterilization process as known in the industry. Regardless of what method is chosen for heat treating or otherwise sterilizing the olives, the process is carefully selected and controlled in order to minimize the adverse impact on the organoleptic properties of the packaged olives as well as the packaging container.

In some aspects, the olive preparations on the invention are not heat treated, for example, are not subjected to retort processing or pasteurization. In some embodiments, the olives are packaged in a sealed container, with no further treatment required. Optionally, heat treated or non-heat treated olive preparations of the invention can be refrigerated after packaging. In some embodiments, refrigeration of non-heat treated olive preparations will result in a sufficient shelf life of the olive product.

XII. Shelf Stability

In some aspects, the invention provides olive preparations that are shelf stable for advantageous periods of time, i.e., the olive preparations have a useful shelf life. In some aspects, the olive preparations of the invention preferably are shelf stable for at least 6 months, 8 months, 10 months, 12 months, 13 months, 14 months, 15 months, 16 months, 17 months, 18 months, or more, for example at least 19, 20, 22 or 24 months. That is to say, the packaged olives have a shelf-life for at least that length of time. To obtain this shelf life, the olive preparations can be treated in any of a variety of ways known in the art, for example, by heat treating such as by retort processing, packaging under modified atmospheres in the sealed containers, especially reduced-oxygen atmospheres, and utilizing packaging containers that provide an oxygen barrier have low oxygen transmission characteristics.

XIII. Co-Packaged Food Items

In some embodiments, the acidified, brineless olive preparations of the invention can include additional co-packaged food items (i.e., food items other than the packaged olive or olive stuffing material). For example, vegetables (for example but not limited to celery, onion, carrot, many types of peppers), cheeses, and nuts (e.g., almonds) can all find use when packaged with the brineless olives to create appealing and more diverse products.

In some embodiments, the packaged olive preparation can be in a food "kit" where a small quantity of the packaged olive preparation of the invention is included with an assemblage of other foods that are sold together to make a snack kit or meal kit. When sold in a kit, the olives in the packaged olive preparation will typically be kept separate and will not physically contact the other food components in the kit, although the components will be assembled together as a single unit. For example, a food kit comprising packaged olives, crackers, cheese and deli meat might be assembled into a kit, where each component is sealed in a different section of a multi-compartmental tray. These types of packaging kit systems can find use, for example, in schools, hospitals and in airline food service.

XIV. Methods for Stuffing Olives

The invention provides compositions and methods for stuffing pitted olives, for example, black ripe olives, which are technically more challenging to stuff because these olives can be more fragile and softer in texture than the green-ripe or green fermented olives that are traditionally used for stuffing. The invention also provides flavored stuffings that can be used to stuff pitted olives. Although these compositions and methods find particular use with black-ripe olives, it is not intended that the materials and methods of the invention for olive stuffing be used exclusively with black ripe olives, as these materials and methods can be used equally successfully with other types of olives, e.g., green-ripe olives. In some embodiments, these stuffing compositions and methods find use with the low-acid, brine-free black ripe olives of the invention.

Novel approaches were developed for olive stuffing. These methods provide various advantages, including expanding available flavor options for stuffings, especially with regard to flavors that will complement black-ripe olives, optimizing olive stuffing methodology for low-acid olives, and development of automated, high-throughput methods for olive stuffing. These methods for stuffing olives use a viscous paste to form the stuffing material, where the viscous paste is extruded directly into the olive, then hardened. These olive stuffings can optionally include various flavor formulations.

These methods for olive stuffing provided by the invention are superior to traditional approaches of stuffing with preformed (or prehardened) ribbons or strings of stuffing material because (i) the injection of a soft paste directly into the pitted olive is less likely to result in physical damage to the olive flesh compared to stuffing methods using pre-hardened fillings, and (ii) the paste injection methods described herein are feasible for scale up to high volume production.

Figure 9:
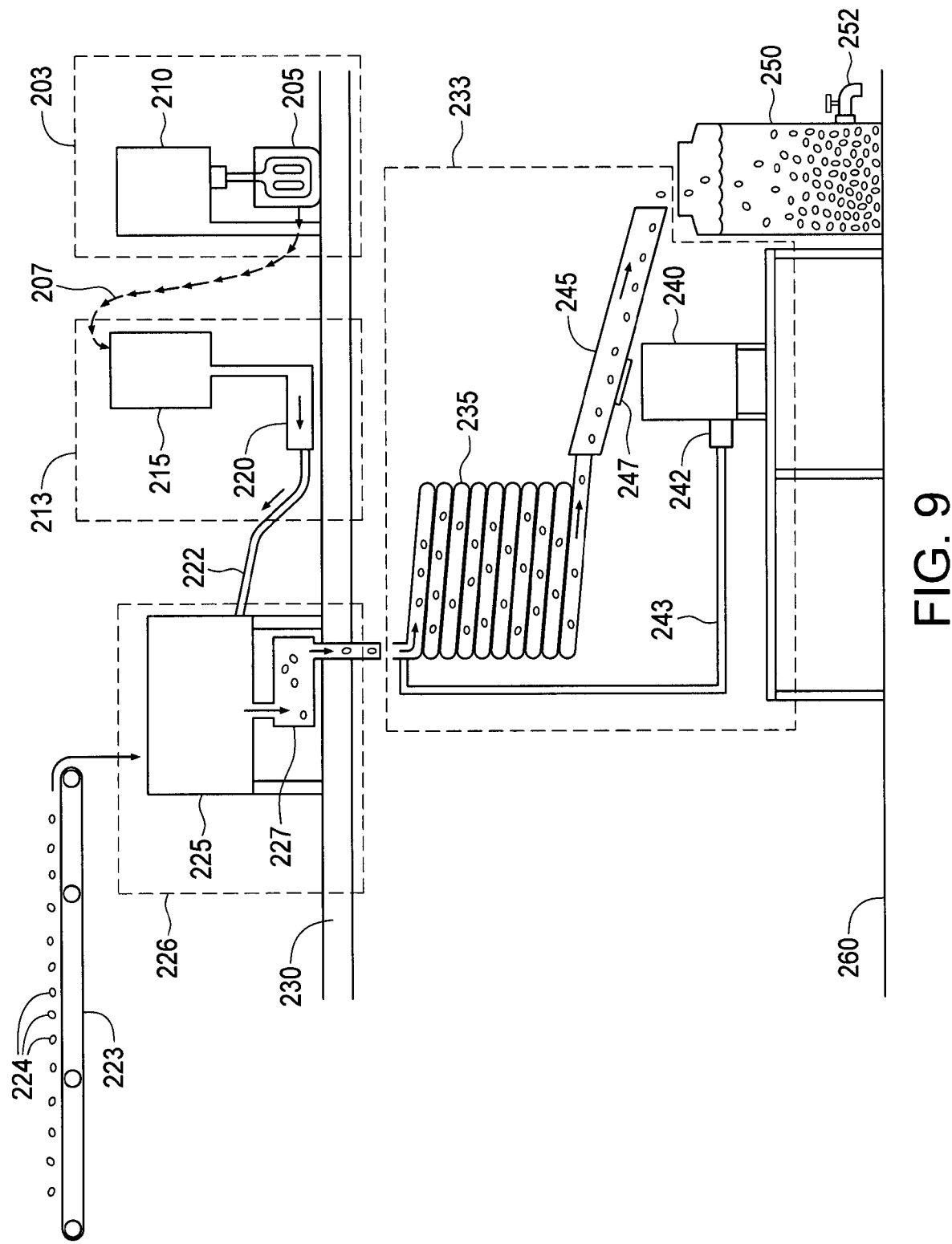
FIG. 9 provides a schematic of a large scale, high speed apparatus for high volume production of stuffed olives using a paste injection into the olive followed by post-injection solidification of the paste, and incorporating a calcium-dwell coil.
Figure 10:
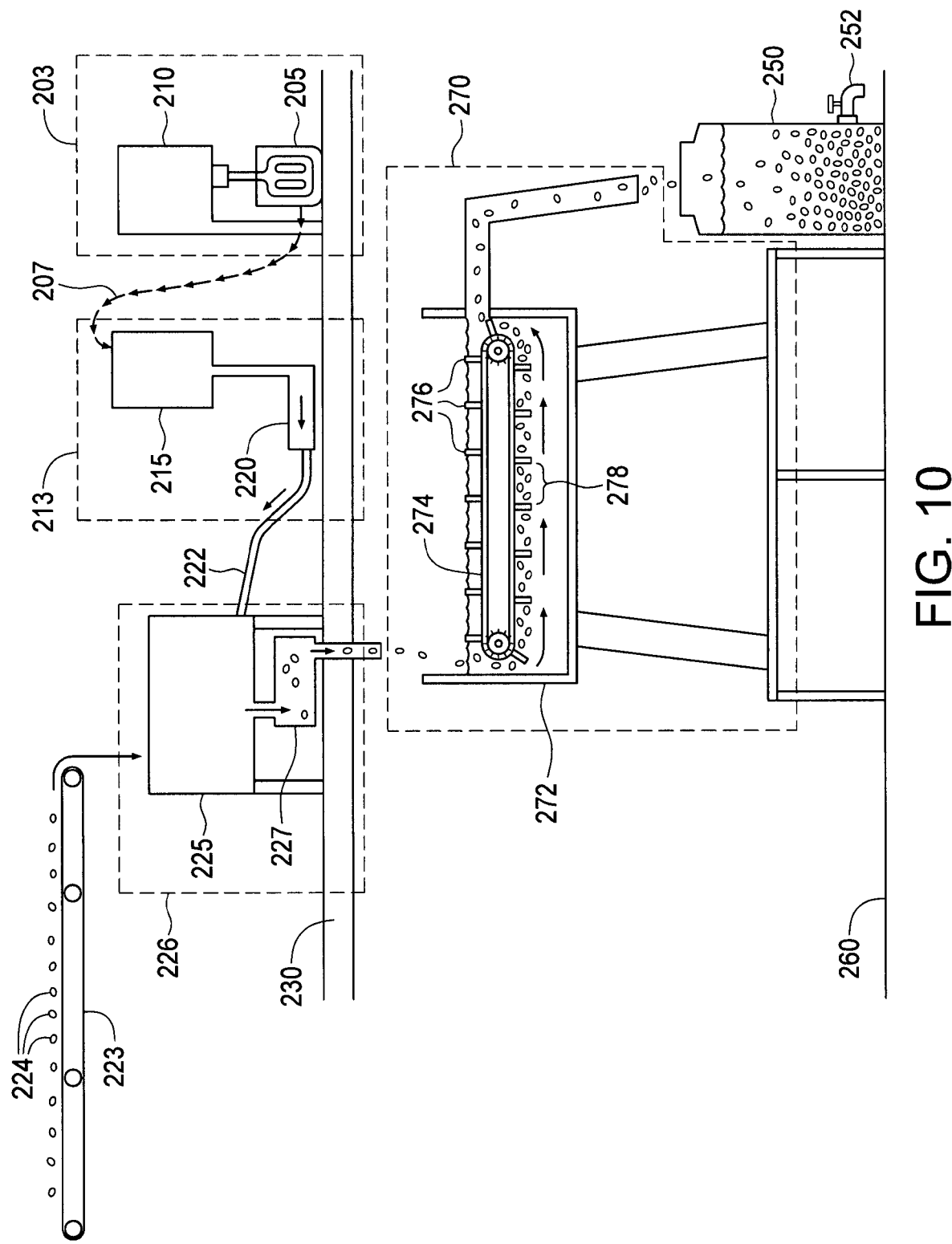
FIG. 10 provides a schematic of a large scale, high speed apparatus for high volume production of stuffed olives using a paste injection into the olive followed by post-injection solidification of the paste, and incorporating a submerging calcium bath conveyor.

Preferred methods for olive stuffing were developed and are shown schematically in FIGS. 4, 9 and 10, and described in detail in Example 5. In these protocols, a paste is injected directly into the pitted olive, and allowed to solidify in situ in the olive, that is to say, within the olive pit cavity.

The pastes that are used comprise at least one gelling agent, for example, sodium alginate. Alternatively, combinations of gelling agents can also be used, further comprising guar gum and/or xanthan gum and/or gum blends, or any other gelling agent(s). Commercial alginate formulations can also be incorporated, for example, TICA-ALGIN® HG-600F Powder (TIC Gums, Inc.). It is not intended that the invention be limited to any particular type or combination of gelling agents. In the case where sodium alginate is used alone, it can be used in a concentration range of 1 to 4%, with 3% typically preferred. When combinations of gelling agents are used, the gelling agents can have a total concentration of between 3 and 6%. These gelling agents are hardened after the stuffing process by exposure to calcium chloride.

In other aspects of the invention, novel paste formulations are provided that contain supplemental thickening agents in addition to the calcium-dependent gelling agents. These thickening agents include pureed jicama, and powdered (i.e., flour) forms of quinoa grain, teff grain, and amaranth grain.

In some embodiments, the pastes that are used are flavored pastes, where the pastes include flavoring ingredients. See FIG. 8, steps A and B. When the various flavoring ingredients are used, the types and amounts of gelling agents may also need to be adjusted to control the viscosity and solidification properties of the paste as necessary. Similar to the brining solutions of the invention, the stuffing formulations can also contain other beneficial taste components, such as sweeteners, masking agents or flavor enhancers, which, although not necessary, can impart improved taste qualities to the stuffing. Ideally, these additives would not add their own strong flavor component that would hide or overwhelm the intended flavor of the olive or the stuffing, and will not interfere with any aspect of the stuffing process.

Figure 8:
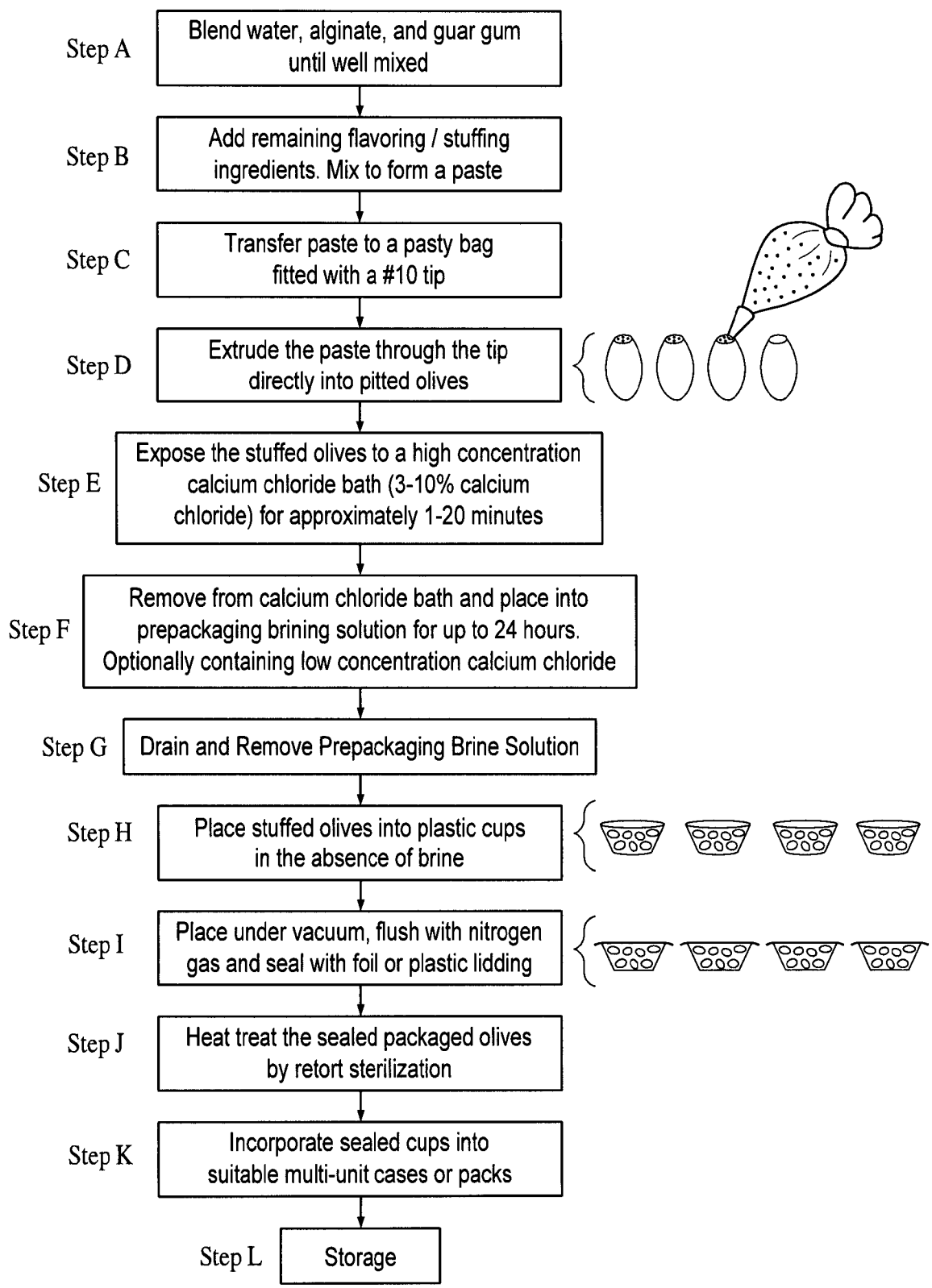
FIG. 8 provides a schematic of a small scale production method for producing stuffed olives using a paste with direct injection of the paste into the olive followed by post-injection solidification of the paste.

In bench top experiments, the paste was injected into the pitted olives using a pastry bag (FIG. 8, steps C and D). However, in larger scale development, automated apparatus was used. It is not intended that the invention be limited to any particular type of paste injection apparatus. In some embodiments, the apparatus that is used removes the pit from the olives and injects the pit cavity with the viscous paste in a nearly simultaneous mechanical action.

After the olives are injected with the stuffing, they are exposed to a high concentration calcium chloride solution (FIG. 8, step E), which initiates hardening of the paste filling. This high concentration calcium bath is in the range 3% to 10% by weight of calcium chloride, more preferably in the range 3% to 5%. A concentration of 5.0% is generally optimal. This calcium bath is generally on the order of a few minutes, e.g., one minute or two minutes, or as long as 20 minutes, or even as long as one hour. In some embodiments, the injected olives are exposed to only this one high-concentration calcium chloride bath.

After this high concentration calcium exposure, the olives are treated in a brine, termed the "prepackaging brine" prior to the brineless packaging. FIG. 8, step F. This brine contains sodium chloride at a concentration of about 3.5% to about 5.5% by weight of sodium chloride, although 4.75% is preferable in most instances. The treatment is generally for a period of 16 to 24 hours, although longer or shorter times can find use with the invention, for example, in cold or warm brining conditions.

The prepackaging brine formulation can be supplemented with various other components, such that the olives are also exposed to the supplemental ingredients for 16-24 hours (in addition to the brine solution) prior to the brineless packaging.

In some embodiments, the prepackaging brine can be supplemented with a low concentration of calcium chloride, for example, between 0.25 and 1.0%, or 0.25 to 0.75%, to aid in the stuffing solidification. A concentration of 0.75% was generally optimal, although in some embodiments, slightly lower concentrations, e.g., 0.5%, were used depending on the olive stuffing ingredients. See FIG. 8, step F. This extended calcium exposure at low calcium concentrations further aids in the hardening of the injected paste that was initiated in the high concentration calcium bath.

The initial high concentration calcium chloride bath acts to quickly form a solidified cap on the end of the olive (i.e., the end exposed to the calcium chloride bath) while the interior of the stuffing may remain viscous or only partially solidified. The rapid solidification capping in the high concentration calcium bath for one to two minutes prevents the liquid stuffing paste on the interior from running out of the olive. After the cap is formed, the lower concentration calcium chloride in the brining solution more fully penetrates the paste and fully hardens to form a firm stuffing. This two step process for calcium treatment eliminates or reduces the bitter taste that results when olives have been soaked for long periods of time in the high concentrations of calcium chloride.

XV. Large Scale, High Capacity Methods for Producing Low-Acid, Stuffed Olives

Methods and apparatus for olive stuffing were developed for large scale, high volume olive production, and are described herein at EXAMPLE 15 and FIGS. 9 and 10. In these preferred aspects, the olives are prepared in a manner that is identical in theory to the laboratory scale in situ solidification method of FIG. 8, except with modifications to permit the use of high-throughput automated machinery to produce large quantities of stuffed olives sufficient to meet the demands of commercial production.

As shown in both FIGS. 9 and 10, the high capacity apparatus consists essentially of five components or modules. These are (i) the paste mixer assembly 203, (ii) the paste feeder assembly 213, (iii) the pitting and stuffing assembly 226, (iv) the calcium dwell coil assembly 233 (in FIG. 9) or the submerging calcium bath conveyor 270 (in FIG. 10) and (v) a brining tank 250.

This large scale apparatus is not limited in any respect with regard to the size or manufacturer of the particular machine components of the apparatus, as one of skill in the art will recognize that any one component of the apparatus can be substituted with different machines that accomplish the same function and serve the same purpose. Similarly, any one component of the apparatus can be substituted with a different machine that has either larger or smaller volume or output capacity.

XVI. Olives with Novel Flavored Stuffings

The invention provides flavored stuffings that find use in methods for making stuffed olives of the invention. These stuffing methods of the invention use an injectable paste technique where a flavored viscous paste is injected directly into a pitted olive, where it is then hardened by exposure to calcium chloride.

The flavored pastes are formed by combining flavored purees and/or other flavor ingredients with one or more gelling agents, such as sodium alginate, guar gum, xanthan gum and/or any commercial or proprietary formulations of alginate-based gelling agents. These gums harden upon exposure to calcium chloride. The stuffing can also be augmented with other thickening agents in addition to the calcium-dependent gelling agents. These thickening agents can include pureed jicama, and powdered (i.e., flour) forms of quinoa grain, teff grain and/or amaranth grain.

The present invention provides novel flavored stuffings, including stuffings having the taste sensations of nacho flavor, bacon and cheese flavor, pepperoni flavor, sweet pepper flavor and cheese pizza flavor. These stuffing formulations are provided in Examples 13 and 14.

XVII. Olives with Infused Flavorings

The invention provides packaged olive preparations that can optionally be flavored by infused flavorings. Either whole olives or pitted olives or segmented olives can be infused with flavorings. In some aspects, when flavor infusions are used with pitted olives, those olives can optionally be stuffed. In some embodiments, if stuffed olives are flavor infused, the infused flavorings can be chosen to complement any flavorings that are already in the olive stuffing. See EXAMPLE 14 describing a flavor infusion formulation that is used to prepare olives that are stuffed with a cheese pizza flavored stuffing.

In some embodiments where an olive is both stuffed and infused with flavoring, the stuffing in the olive may contain little or no flavoring of its own, and all the flavor in the stuffed olive comes from the infused flavorings.

In some embodiments where an olive is stuffed, one or more infused flavorings of the same nature or type as the flavoring of the stuffing can be used in order to augment flavor of the stuffed olives. In other embodiments, the infused flavorings are of a different nature or type than any flavoring that may be in the olive stuffing. Typically, but not exclusively, multiple infused flavorings are used in combination in a flavor infusion treatment. The invention is not limited to any type of infused flavorings. A wide variety of liquid flavor infusion extracts are commercially available from various manufacturers.

When infused flavorings are used, the infusion step can take place, for example but not limited to, concurrent with the prepackaging brining step prior to packaging. That is to say, any desired flavoring can be added to the brine solution. Because the olive preparations of the invention are packaged without brine or other free liquid, the flavor infusions (typically in liquid form) must take place before the packing step. The length of soaking time to achieve a desired flavor concentration from the flavor infusions will vary according to the flavorings used, and is determined empirically. Typically, the olives are soaked for 12-24 hours with the brining solution to achieve a suitable flavor density in the olive.

In some aspects, the flavor infusions are done using liquid flavoring extracts that are commercially available. In other aspects, infused flavorings can be achieved during a soaking step by using non-liquid spice treatments. These non-liquid spices are typically dried, minced, diced, flakes or powder forms. Flavors from these non-liquid spices will diffuse during the prepackaging brine soaking step, and can impart an infused flavoring to the olives prior to the liquid-free packaging. For example, spices such as oregano, basil, chili power, black pepper, hot pepper flakes, onion powder, garlic powder and minced garlic can be used in this manner. Alternatively still, the spice can be fresh, i.e., not dried. A spice treatment soaking step can take place in an additional treatment step at any point prior to packaging, or alternatively, can be included with the prepackaging brining ingredients.

In other aspects, the packaged olive preparations of the invention can be flavored or spiced with co-packaged non-liquid spice treatments. These spices, as described above, do not add any liquid volume to the liquid-free packaged olive preparations of the invention. Any of these types of spices can be included in the packaged olive preparations of the invention.

EXAMPLES

The following examples are offered to illustrate, but not limit, the claimed invention. It is understood that various modifications of minor nature or substitutions with substantially similar reagents or components will be recognizable to persons skilled in the art, and these modifications or substitutions are intended to be included within the spirit and purview of this application and within the scope of the claimed invention.

Example 1

Traditional Protocol for Production of California Style Black-Ripe Olives

This example describes a traditional protocol for producing California style black-ripe olives. The protocol is generally outlined in FIG. 1.

Olives are harvested and shipped to a production facility. The olives can be processed fresh, where the olives are processed immediately after harvesting. Alternatively, the olives can be stored post-harvest for later processing using various methods, for example, by holding in brine solutions such as sodium chloride brines or ammonium nitrate brines, or holding in 1-2% acetic acid solution (pH 3-4). The storage can be of various durations, and the optimal method chosen to store the olives depends on the intended holding time post-harvest before processing can commence. Storage times of days, to as long as 3 years are possible.

The olive cultivars or varietals that are used can vary widely based on intended use, geographic availability and regional preferences. In the United States, the cultivars Manzanillo, Sevillano, Mission, Ascolano and Barouni account for the majority of black-ripe olive production, although other varietals or cultivars can also be used.

When olives are ready to be processed, they are transferred from storage tanks to processing tanks. The treatment process generally begins with lye-curing by adding a solution of approximately 0.8 to 2.5% by weight sodium hydroxide, known as lye or caustic soda, accompanied by air bubbling. This treatment with lye is the step that debitters the olive by neutralizing the oleuropein compounds in the olive flesh. The lye curing can require multiple stages, or soakings, each soaking lasting approximately 3-12 hours. The goal of the first lye soak or "cut" is to barely penetrate the olive. In order to see if the lye has "cut" the olive, a sample of olives can be retrieved from the tank in which they are being soaked, and the individual olives are cut in half. A solution of phenolphthalein, a colorimetic pH indicator, is applied to the cut olives. Phenolphthalein is colorless in acidic solutions and pink, red or violet in basic conditions, depending on the concentration of the phenolphthalein. If the lye has penetrated the olive flesh, the flesh will turn red when exposed to the indicator. Depending on the percentage of olives containing red and the amount and depth of red in each individual olive, the operators are able to assess if the olive is finished with the first lye cut. Based on this assessment, if the lye treatment in the first cut is successful, the lye is drained from the olives, the tanks are filled with water and bubbled with air, typically overnight.

If the first lye cut is not finished, soakings are continued and the process is repeated. This cutting process can be repeated multiple times, e.g., two, three, four or more times, using varying times for soaking and different lye concentrations, until the lye penetrates to the pit of the olive. Great care is taken by the operator to monitor this cutting process, otherwise the olive flesh can be damaged and become soft or will be "burned" by the treatments.

Following the lye curing and rinsing, the olives are treated in order to turn the olive flesh a deep black color. This treatment historically uses ferrous gluconate, which turns the olive flesh black by an oxidation process when the olives have a pH of approximately 8.6 to 8.9. The lye cutting from the previous step leaves the olives highly alkaline, so the pH of the olive flesh needs to be first lowered to an optimal range of 8.6 to 8.9 in order for the ferrous gluconate treatment to be effective. The ph is typically lowered by bubbling $CO_2$ gas through a water solution containing the olives. The $CO_2$ naturally creates carboxyl acid, thereby lowering the pH of the olives to the desired pH. After this optimal pH is reached, the olives are typically rinsed one additional time, and the ferrous gluconate is added, quickly turning the olives black.

After the coloring step, the olives are washed and transferred to a neutral brine packaging solution (e.g., a brine solution having pH in the range of 7.0 to 7.75). Traditional California style black-ripe olives are typically packed and sealed in cans or jars in a neutral brine packaging solution, with little or no headspace. Headspace is the distance from the top of the container to the top of the food product. In the case of traditional olive packaging, the packaging brine fills or nearly fills the entire container. That is to say, after the addition of the olive product and the liquid brine to the container in traditional olive packaging, there is little or no headspace volume above the olives or the level of liquid brine. Furthermore, there is no air void space volume between the olives because that space is filled with liquid brine.

After packaging and sealing according to common practices known to one of skill in the art, the containers are then subjected to a heat treatment, typically using a retort process at temperatures and pressures sufficient for commercial sterilization.

Example 2

Traditional Protocol for Production of California Style Green-Ripe Olives

Traditional California style (non-fermented) green olives, also termed "green-ripe" olives, are commonly produced using a method essentially as described above for the California style black-ripe olives, with the exception of omitting the ferrous gluconate treatment step, and further, taking steps to minimize exposure of the green olives to oxygen in the ambient air. See FIG. 2. Excessive exposure to air will oxidize the olive flesh, and will cause the olive to turn from a green to a brown or mottled appearance. Following the lye treatment, the green olives are kept submerged to minimize the darkening that will occur from exposure to air. After the lye treatment, the olives are neutralized, rinsed and transferred to a neutral brine solution for packaging in the same way as the California style black-ripe olives.

Traditional California style green-ripe olives are commonly packed and sealed in cans or jars in a neutral brine packaging solution, with little or no headspace, where the packaging brine fills or nearly fills the entire container. After packaging and sealing according to common practices used in the art, the containers are subjected to a heat treatment, typically using a retort process at temperatures and pressures sufficient for commercial sterilization.

Example 3

Protocol for the Production of Low-Acid, Brineless California Style Black-Ripe Olives This example describes the development of a method for the production of low-acid, brineless olives, applicable to both black-ripe olives and green-ripe olives. The protocol for producing low-acid, brineless black-ripe olives is depicted generally in FIG. 3.

Traditionally, olives are packaged in liquid brine. Also by tradition, Spanish style olives are most commonly used for making stuffed olives, for example, stuffed with pimiento, garlic, onion, and/or jalapeno. Spanish style olives, whether stuffed or unstuffed, are packaged in an acidic liquid brine. The acid environment has a beneficial effect of acting as a preservative, and extends the shelf life of the acidic olives that are packed in the acidic brine. Unfortunately, due to the acidic environment, these olives are very sour and/or tart, which many consumers find unappealing. What is needed are methods for producing olives that are not acidic, are not tart or sour, are shelf stable, are conveniently brineless, and can be used to prepare stuffed olive varieties.

In order to produce low acid olives, e.g., California style black-ripe olives that are a low-acid food product, and further, permit brineless packaging, novel methods were developed. During the testing phases, Manzanilla olives were first cured and blackened by traditional methods. They were then soaked in brine solutions having a wide range of concentrations of salt (sodium chloride) for varying periods of time in order to find optimal treatment conditions. Salt (NaCl) concentrations of 3.5%, 3.88%, 4.12%, 4.41%, 4.70%, 4.99%, 5.28%, and 5.5% were tested. The pH of this brine was approximately in the range of 5.0 to 7.5. The olives were soaked in the brines between 16 and 24 hours. Following the soaking, the olives were drained and packed in cups, and the olives were flavor tested.

It was observed that olives that were soaked in brine solutions having less than 3.88% salt (NaCl) did not achieve sufficient salt penetration, resulting in a bland taste with insufficient salty flavor. Olives that were soaked in brine concentrations above 4.75% salt were oversaturated with salt and excessively salty in flavor. Brines with NaCl concentrations between about 3.88% to 4.75% were acceptable, and a NaCl concentration of about 4.75% was generally used.

The length of time that was used to soak the olives was also varied and optimal conditions were empirically determined. It was observed that olives that had been soaked for less than 12 hours in brines that contained flavoring ingredients did not have sufficient flavor strength, and the flavor penetration was also dependent on variables such as temperatures on the day of the soaking treatment, and the texture and maturity of the olives. Treatment soaking times were adjusted according to empirical observations. Soaking times between 12 and 24 hours were generally found to be optimal.

Example 4

Protocol for the Production of Low-Acid, Brineless California Style Green-Ripe Olives This example describes the development of methods for the production of low-acid, brineless California style green-ripe (unfermented) olives. FIG. 5 provides a schematic of these methods.

The process for the production of low-acid, brineless California style green-ripe olives is similar to the production of the low-acid, black-ripe olives, with a couple key differences. The significant differences between the two processes are as follows.

First, the green ripe olives are only produced during olive harvest season when the olives are fresh. Olives from storage tanks cannot be used in this process. Second, oxidation of the green ripe olives is minimized as much as possible during the entire curing process, meaning that the olives and process reagents have minimal contact with air. The olives are submerged beneath the level of the liquid throughout the process. In addition to minimizing contact with air, oxygen scavenger chemicals such as ascorbic acid can be used in the low-acid, green ripe olive production process to further reduce oxidation of the olives which can cause an unwanted browning effect. Third, after the lye cutting, the olives are neutralized to slightly lower pH than the black ripe, low-acid olives, to about pH7.0 to 8.0.

The result of this green ripe, low-acid olive curing process is an olive that is low-acid, bright green color and buttery in taste.

Example 5

Methods for Stuffing Low-Acid Olives

Experiments were undertaken to develop novel olive stuffing techniques that are effective for use in stuffing low-acid olives of the invention, where the stuffing formulations are compatible with the sterilizing retort conditions used to treat the low-acid olives. This example describes the development of improved extrudable paste formulations and related methods for stuffing low-acid olives.

Generally, the methods for stuffing the low-acid olives use the scheme shown in FIG. 8. These methods use a viscous paste that is injected into the olive pit cavity, followed by hardening of the paste upon exposure to calcium. Also described herein is apparatus to facilitate high volume production of stuffed olives. See FIGS. 9 and 10, and further described in EXAMPLE 15. Although optimized for low-acid olives, these stuffing methods find use with any olive types, and are not limited in their utility to low-acid black-ripe and low acid California style green-ripe olives of the present invention.

Upon determining that olives could be prepared and packaged as a low-acid food product, it was observed that stuffing paste formulations that had been previously developed for use in acidified olives (e.g., U.S. patent application Ser. No. 13/885,151, international filing date Apr. 26, 2013, herein incorporated by reference in its entirety) were sub-optimal for stuffing the low-acid olives of the invention. When the higher temperatures of retort sterilization were used with the stuffed low-acid olives, the paste texture became soft and fell apart.

A) Stuffing Paste Formulations

Improved methods were developed for stuffing low-acid olives. These methods start with preparing the stuffing paste. Initially, the foundation of the paste contained water and sodium alginate, and optionally contained other thickening agents, including guar gum, a gum blend and/or xanthan gum. The alginate and gums are gelling agents, and solidify the paste after the stuffing process when exposed to calcium chloride. The viscous paste contained approximately 1-5% sodium aliginate, or alternatively, 1-5% in total gelling agents, such as combinations of sodium alginate and the various gums.

This paste formulation was used to inject the low-acid olives, followed by calcium hardening and retort sterilization. Unfortunately, the high temperatures used in the retort sterilization resulted in a loss of integrity of the hardened stuffing, where the stuffing became soft and did not remain in the olive pit cavity. Efforts were made to find stuffing components that would be able to survive the higher temperatures that are used in retort sterilization, in contrast to the lower temperatures of retort pasteurization.

In an attempt to find paste supplements that could act as a matrix to hold the stuffing together at a desired consistency throughout the low-acid olive production process, including the retort treatment, various components were tested as additives in the paste formulations. These additives included, alternatively, bread crumbs, cucumber puree, jicama puree, celery puree, garbanzo puree, potato flakes, food starches, corn starch, teff, amaranth, quinoa, corn puree.

(I) Food Starches and Corn Starch

Food starches and corn starch were first tested as a paste matrix supplements. ColFlo (National Starch Company), N-Zorbit (National Starch Company) and corn starch were used in various concentrations, not exceeding 5%. During the mixing of the paste, it was observed that the paste expanded, but held together. When the paste was placed in a 5% calcium bath, it did not harden as expected. The paste was stuffed into olives, and as the olives were soaked in brine overnight, the paste expanded slightly and protruded out of the olive. After retort sterilization, the paste was soft and disintegrated in flavors that contained cheese such as cheese pizza and nacho stuffing.

(II) Bread Crumbs and Potato Flakes

Bread crumbs were tried as a matrix in the paste. Progresso bread crumbs and Panko bread crumbs were added to the paste formulation. Similar results were obtained as with the food/corn starches. The paste was more like dough rather than viscous. In addition, the flavor of the olives was hindered by the flavor of the bread crumbs, as the stuffing had a bread taste. The same process occurred with the potato flakes when used as a matrix. The flavor of the paste tasted more like potato than the actual intended flavor. The texture of the paste was brittle and soft.

(III) Cellulose Matrices

Food starches described above were not making the paste firmer after heat treatment, but it was noted that the starches were aiding the paste hold together during mixing. Cellulose matrices were then tested a paste supplements. Celery was the first to be tested. The celery was able to aid the paste to uniformly hold together during mixing of the dry and wet ingredients and resulted in less clumping that sometimes occurs upon addition of sodium alginate and the guar gum.

Unfortunately, the flavor of the celery was too intense and overpowered the flavor of the paste.

(IV) Vegetable Purees

Various vegetables in puree form were tested as paste supplements. These were garbanzo beans, corn, cucumber and jicama. The corn, cucumber and jicama purees aided in the mixing of ingredients and improved cohesiveness of the paste. The garbanzo bean puree resulted in a paste that was brittle, soft, and dry.

The garbanzo bean, corn and cucumber purees had a flavor in the stuffing that was intense and overshadowed the flavor of the paste. This was not the case for the jicama puree. Jicama is a mild flavor root with a high water content. It lends itself to easily producing a pureed form, and is an excellent matrix for the flavored paste. The jicama puree worked well at holding the ingredients together during mixing, and maintained the integrity of the paste. It did not hinder or overshadow the flavor of the paste, and did not discolor the paste to a large degree in the way that celery and cucumber purees discolored the paste.

Different levels of jicama were tested in the pastes, which ranged from 0% to 37.5% depending of the consistency of the paste. The bacon-and-cheese paste and nacho paste had slightly improved firmness and held together well with a jicama content of 25%. In the pepperoni paste formulation, the jicama was used in a range of 25% to 37.5%. It was noted that with the pepperoni paste, the jicama was able to keep the paste firmer after sterilization, likely because that paste formulation did not have a dairy product such as cheese. Cheese naturally contains salt and calcium, which hinder the binding of the ingredients to the sodium alginate and guar gum. This causes the paste to be brittle and soft during the calcium bath and sterilization. The only drawback to using jicama as a matrix in the paste is the lack of availability of jicama throughout the year. In addition, the jicama is not commercially available in a pureed form, and thus, would require the purchase of additional machinery to produce a jicama puree, which would raise production costs.

(V) Whole Grains and Grain Flours

Alternatives to using jicama as a matrix were considered, where the alternatives would preferably be available year-round. Quinoa grain was tested as a matrix. The quinoa grain was cooked (boiled) for about 20 minutes before mixing with the other paste ingredients. The mixed paste containing the quinoa was initially firm and held together after the injection and calcium exposure, but lost this texture after the retort sterilization, where the filling became significantly softer. Different levels of quinoa were tested in the paste, including 5%, 10%, 15%, 20%, and 25% quinoa. With the higher levels of quinoa, the paste was firmer, but the paste became darker in color, and the taste of the grain began to become prominent in the stuffing.

Other grains similar to quinoa were also tested, including teff and amaranth. The teff grain held the paste together with a firm consistency when compared to the quinoa and amaranth when used at comparable levels similar to the quinoa, including through the retort sterilization procedure. However, the concern with the teff grain was that it darkens the color of the paste and its flavor interfered with the flavor of the paste, most notably at concentrations of 15% and above.

All three grains caused the paste to be more doughy than viscous when used at levels of 15% or more. One concern with using a cooked grain in the paste was that the cooking process would add complexity and expense to the manufacture process. An experiment was carried out in which the grain was added to the paste without cooking the grain prior to adding to the paste mix. The resulting paste was excessively grainy and brittle. This option was not considered further.

Because the grains were yielding good results with respect to firmness and integrity of the paste, grain powders (flours) were also considered as paste additives. Teff, amaranth, and quinoa powders were used in the paste in order to replicate the actual grains. The concentrations of powder used in the paste ranged from 0.67%, 2.67%, and 5.33%. As with the actual grains, the higher the amount of grain powder, the firmer and doughy the paste became. It was also noted that the flavor of the grain powder was also intense and overshadowed the other flavor(s) that were also in the paste. This is true most notably for teff powder, followed to a lesser extent by quinoa and amaranth powders.

At the conclusion of this phase of testing, amaranth grain powder was selected for further development as a preferred paste additive. At a concentration of only 0.67%, it mixed well with the other paste components, and resulted in a homogenized paste. Of further benefit, the amaranth did not discolor the paste and did not significantly add its own flavor to any other desired flavors that may already be in the paste.

The results of this testing described above is summarized in the table below. This table shows the additives that were tested in order to improve the stuffing consistency in the low-acid olives, and particularly to find additives that will maintain paste cohesion following retort processing.

| Matrix Supplement | Result | |
|---|---|---|
| Corn Starch | Soft and paste protrudes out of olive. | Not preferred. |
| ColFlo food starch | Soft and paste protrudes out of olive. | Not preferred. |
| N-Zorbit food starch | Soft and paste protrudes out of olive. | Not preferred. |
| Progresso Bread Crumbs | Soft, dough like paste, bread flavor | Not preferred. |
| Panko Bread Crumbs | Soft, dough like paste, bread flavor | Not preferred. |
| Potato Flakes | Soft, brittle paste, potato flavor | Not preferred. |
| Celery Puree | Firm paste, but had celery flavor | Not preferred. |
| Corn Puree | Soft paste and had corn flavor | Not preferred. |
| Garbanzo Bean Puree | Soft, Brittle, Garbanzo Flavor | Not preferred. |
| Cucumber Puree | Firm paste, but had cucumber flavor | Not preferred. |
| Jicama Puree | Firm paste, no flavor added to paste. But issues regarding availabilty and cost discouraged further development. | Preferred. |
| Quinoa Whole Grain | Firm paste, but had quinoa flavor | Not preferred. |
| Teff Whole Grain | Firm paste, discolored paste, but had teff flavor | Not preferred. |
| Amaranth Whole Grain | Firm paste, slight amaranth flavor | Not preferred. |
| Quinoa Powder | Firm paste, but had quinoa flavor | Preferred. |
| Teff Powder | Firm paste, but had teff flavor and paste discoloration | Preferred. |
| Amaranth Powder | Firm paste, no paste discoloration or added flavor. Selected for further product development. Used at a concentration of 0.67% in the paste formulation. | Most preferred. |

B) Paste Injection and Paste Hardening

The black-ripe, low-acid olives of the invention were used for testing, however, the olives that are stuffed can be any pitted olives. These low-acid, black-ripe olives had been debittered, blackened and washed. Olive pitting and stuffing was done in a single step by automated apparatus See FIGS. 4, 9 and 10. A viscous paste was first produced as described above, and was extruded directly into the cavity of low-acid, black-ripe pitted olives. Initial trial experiments used pastry bags to inject the stuffing paste (FIG. 8), but in later embodiments, automated injector systems were used (FIGS. 9 and 10).

The injected paste was hardened in situ by exposure to a calcium chloride solution. Various methods were tested to optimize the paste hardening following the paste injection. In particular, the use of calcium chloride in the hardening step needed to be optimized. These methods for paste solidification included the following features. These methodologies can be used alone, or in combinations.

(I) Calcium Bath Soaking

In one method, the olives containing the viscous paste were soaked in a high concentration calcium chloride bath immediately after stuffing, the bath ranging from 3% to 10% calcium chloride, and the treatment times ranging from 1 to 2 minutes to as long as 60 minutes, although a treatment time of a few minutes, generally not more than 20 minutes, was generally used. A concentration of calcium chloride of 5.0% was determined to be optimal, and was generally used. Longer or shorter exposure times were tested, and could be adjusted depending on the particular paste formulation. This single-stage soaking method often resulted in a bitter taste in the olive due to excessive calcium permeation into the olive and stuffing.

(II) Two-Step Calcium Bath Treatments

In order to minimize any bitter taste in the olive due to the high concentration of calcium, a two step soak process was developed. This two step graded soaking process also had the benefit of effectuating a more thorough hardening of the paste.

The first soaking step was in a 5% calcium chloride solution as described above, but for only a short time, typically for only 1 to 2 minutes in the concentrated calcium solution, although longer times were also tested, for example, as long as 20 minutes. This first soaking formed a solidified cap at the tip of the viscous paste so that the stuffing material in the interior that was still viscous did not fall off or run out of the olive.

A second calcium soak step is then employed after the first soaking, where the second soaking has a reduced calcium concentration. Calcium concentrations between 0.25 and 1.00% were tested. Within this range, calcium concentrations ranging from 0.25% to 0.75% were found to be effective. A concentration of 0.5% was generally preferred, and was used in most subsequent methods. This soak time with the low concentration of calcium was typically between 12-24 hours. This low-calcium soak treatment was in the presence of the final stage prepackaging brine. This low concentration treatment allows the remaining unsolidified paste in the pitted olive to slowly solidify without accruing the bitter calcium aftertaste that can occur when higher concentrations of calcium chloride are used.

The optimal concentrations and treatment times to use for the high and low concentration calcium chloride treatments can depend on the particular stuffing recipe, and may have to be determined empirically. For example, it was observed that the optimum concentration in the low-concentration calcium bath to solidify the sweet pepper stuffing was 0.50%, while the optimal concentration to solidify the pizza stuffing was 0.75%.

(III) Calcium Bath Automation

Methods and apparatus for olive stuffing were developed for large scale, high volume olive production. Apparatus for use in large scale production of stuffed acidified olives are shown in FIGS. 10 and 11. Using this apparatus, olives were stuffed and treated in a manner that is identical in theory to the laboratory scale method of FIG. 8 and the flow chart of FIG. 4, except with modifications of scale to permit the use of high-throughput machinery that can produce large quantities of stuffed olives. This high throughput machinery was adapted to incorporate the two-step calcium chloride treatment of the stuffed olives.

FIGS. 9 and 10 show apparatus for the large scale production of low-acid, black-ripe olives. These apparatus are discussed in detail in EXAMPLE 15. The apparatus consists essentially of five components. These are (i) the paste mixer assembly 203, (ii) the paste feeder assembly 213, (iii) the pitting and stuffing assembly 226, (iv) the calcium dwell coil assembly 233 (FIG. 9) or the submerging calcium bath conveyor 270 (FIG. 10) and (v) a brining tank 250.

Using this large-scale apparatus, the calcium treatment of the stuffed olives takes place in two steps. First, a high concentration calcium treatment can take place in either the calcium dwell coil assembly 233 (shown in FIG. 9) or using the submerging calcium bath conveyor 270 (shown in FIG. 10). Using the submerging calcium bath conveyor 270 as shown in FIG. 10 has certain advantages over the dwell coil method shown in FIG. 9, including ease of cleaning and sanitizing, and elimination of uneven olive soaking times. Second, the low-concentration calcium treatment can take place simultaneously with the brining step using the prepackaging brine in the brining tank 250, where the brine additionally contains the low concentration of calcium.

C) Stuffing Flavorings

Optionally, the stuffing pastes can also contain any of a variety of flavorings or other types of ingredients to add desirable flavors and/or textures to the stuffing, either as individual flavors or combinations of ingredients for more complex flavors. See EXAMPLES 13 and 14. In addition, the stuffing paste can optionally include any other ingredients that enhance the taste of the olives, such as sweetening agents, masking agents and/or flavor enhancers, as known in the art.

Example 6

Low-Acid Olive Brining

After the initial olive treatment(s) of debittering, blackening, pitting and/or stuffing, and washing, the olives are treated in a brine, termed the "prepackaging brine" prior to the brineless packaging. This brining step minimally contained a sodium chloride salt brine at a concentration of about 4.75%. The pH of this brine was approximately in the range of 5.0 to 7.5. Adjustment of the pH with any acidulants, alkaline agents or pH buffers was not required. Below is a description of one preferred prepackaging brine formulation.

| Low-Acid Prepackaging Brine Solution | Concentration |
|---|---|
| Water | 94.75% by weight |
| sodium chloride (NaCl) | 4.75% by weight |
| calcium chloride (CaCl$_2$) | 0.5%; to aid in the paste hardening |

In addition to the core ingredients listed above, other components were also optionally added to the prepackaging brine to improve upon taste properties of the olives, e.g., flavor infusion ingredients.

Example 7

Olive Packaging Containers

After the olive treatment(s) of debittering, blackening, pitting, stuffing, and treatment in the prepackaging brine, the olives were prepared for packaging. The prepackaging brine was drained from the treatment tank containing black-ripe, low-acid olives, and the olives were washed one time.

The olives were distributed to 4.2 fluid ounce polypropylene cups manufactured by Printpack, Inc. These cups are a high-clarity, polypropylene-ethylene vinyl alcohol (EVOH) structure having an EVOH content of 8% by weight and a thickness ranging from 0.017 to 0.022 inches in various parts of the cup. These cups are a "polypro-Tie-EVOH-Tie-polypro" laminate structure. This material has a calculated oxygen transmission rate of 0.0002 cubic centimeters per pack, per 24 hours at 20° C. in 65% relative humidity in air. Similar sized polypropylene cups manufactured by WINPAK PORTION PACKAGING, INC. were not selected for testing because they contained a lower proportion of EVOH (5% EVOH), and presumably, would not have had as strong an oxygen-barrier as the Printpack, Inc. cups.

The lidding film that was applied to seal the cups is a laminate polymer structure manufactured by Printpack, Inc., comprising three layers: (i) barrier-coated polyethylene terephthalate (PET, 12 micro thickness), (ii) retort-grade nylon film (25 microns), and (iii) a peelable polypropylene film (70 microns). This lidding material has an oxygen transmission rate of 0.028 cubic centimeters per square meter, per 24 hours at 23° C. in 55% relative humidity.

This particular packaging container for the olives, comprising the cup and the lidding film, were selected due to their properties that provide a high oxygen barrier and ability to withstand retort temperatures. Ideally, these sealed cups would have a desired target oxygen concentration of less than approximately 0.5%, and more preferably less than 0.1%. Oxygen can potentially result in oxidation of the fat component of the olive leading to rancidity and off flavors. Sealed, low-oxygen packaging environments, and further where the packaging materials have low oxygen transmission rates, are preferred for many types of food products.

Example 8

Optimization of Olive Packaging and Sealing

It is the intention of the present invention to create a packaging system that provides a high oxygen barrier, uses packaging methods that result in a low oxygen environment within the sealed containers, and where the sealed containers have the ability to withstand retort temperatures and pressures, especially retort conditions that result in sterilization. To that end, extensive experimentation was undertaken to find optimal olive packaging conditions.

As described above, packaging materials and packaging geometries were selected with the goal of providing conveniently sized, packaged brineless, low-acid olives. Further, methods were developed that would give this packaged food product good shelf stability.

Generally, the olive products are packaged by transferring approximately 1.6 ounces by weight of pitted olive into each 4.2 fluid ounce cup, which approximately filled the cups. The filled cups were inserted into a lidding and sealing apparatus, where they were exposed to vacuum in conjunction with a nitrogen gas flush. Under those conditions, the apparatus then applied the lidding film material to the top of the polypropylene cup with an adhesive, resulting in a sealed, low-oxygen environment inside the cup.

Developing these methods for packaging this brineless, low-acid product in the plastic cups presented challenges. One issue that arose was the appearance of dented, paneled, expanded or burst plastic cups following the retort sterilization, due to non-optimal overpressure conditions in the retort program. This problem is unique to this product because unlike other products in cups in the marketplace, in these sealed packaged olive in the cups have significant space voids, including a significant amount of space between each adjacent olive, the void created by the pit cavity where the pit was formerly located, and the entire space between the top of the olives and the lidding material. In this packaged product of the invention, these spaces are all filled with air, or a modified atmosphere such as a reduced-oxygen atmosphere, a nitrogen-rich atmosphere and/or partial vacuum. In contrast, other olive products are packaged in liquid brine, with almost no void spaces not filled by liquid brine, and with very small headspace volumes.

Upon heat treatment, air expands significantly, in contrast to solids and liquids. This creates problems during the heat treatments post-packaging. This problem of denting or puffing was caused not only by elasticity of the air inside the cups, but also due to the nature of the semi-rigid, plastic cups, in contrast to cans containing brine solution, as commonly used in the industry.

Optimal settings for the cup sealing and subsequent retort processing were researched in order to find conditions that were minimally detrimental on the packaged olive product, and also to find the least harsh conditions that could result in sterilization of the product and where the cups did not display any physical distortion such as puffiness or dents after retort sterilization. Following the initial experimentation, it was found that a vacuum setting for the cups sealer of 2.5 seconds and/or 55 mBar, and a gas flush setting of 1.1 seconds and/or 940 mBar produced acceptable results when using the retort program shown in FIG. 7A.

A) Waldner Cup Sealer Testing

Initial experiments were conducted using a WALDNER cup sealer (WALDNER Process Systems, a unit of the Hermann WALDNER GmbH & Co. KG, Wangen, Germany). The parameters for cup sealing are shown. The oxygen content in the cups after sealing was measured using a handheld MOCON PAC-CHECK® Model 302 headspace oxygen analyzer. Below is a set of representative test results using the WALDNER cup sealer. Three sets of sealed cups were tested. These were (i) cups with olives (pitted, low-acid, black-ripe olives, and not subjected to any retort treatment), (ii) empty cups (air only) and (iii) cups with water.

| WALDNER Cup Sealer Parameters and Settings | |
| --- | --- |
| Vacuum | 12 seconds |
| Nitrogen Gas | 6 seconds |
| Seal | 2 seconds |
| Delay | 3 seconds |
| Extra Vacuum | 5 seconds |
| Temperature | 175° C. |
| Initial Pressure | −0.96 bar |
| Final Pressure | 0 bar |

| Sample | Oxygen (O₂) Reading (%) | | |
|---|---|---|---|
| | empty (air only) | with olives | with water only |
| 1 | 1.74 | 0.51 | 0.65 |
| 2 | 1.9 | 0.72 | 0.6 |
| 3 | 0.64 | 0.92 | 0.62 |
| 4 | 0.49 | 0.44 | 0.5 |
| 5 | 1.35 | 0.72 | 0.52 |
| 6 | 1.48 | 0.83 | 0.66 |
| 7 | 0.35 | 0.44 | 0.52 |
| 8 | 0.81 | 0.64 | 0.56 |
| 9 | 1.05 | 0.81 | 0.65 |
| 10 | 3.35 | 0.61 | 0.49 |
| 11 | 0.68 | 0.57 | 0.65 |
| 12 | 8.2 | 0.64 | 0.85 |
| 13 | 0.32 | 0.39 | 0.92 |
| 14 | 0.56 | 0.57 | 0.66 |
| 15 | 0.68 | 0.65 | 0.77 |
| 16 | 0.26 | 0.43 | 0.67 |
| 17 | 0.5 | 0.67 | 0.67 |
| 18 | 0.57 | 0.81 | 0.56 |
| 19 | 0.24 | 0.41 | 0.67 |
| 20 | 0.47 | 0.55 | 0.59 |
| 21 | 0.58 | 0.63 | 0.63 |
| 22 | 0.24 | 0.43 | 0.65 |
| 23 | 0.41 | 0.67 | 0.54 |
| 24 | 0.48 | 0.77 | 0.64 |
| 25 | 0.24 | 0.42 | 0.67 |
| 26 | 0.4 | 0.64 | 0.78 |
| 27 | 0.48 | 0.72 | 0.98 |
| 28 | 0.22 | 0.38 | 0.61 |
| 29 | 0.45 | 0.53 | 0.78 |
| 30 | 0.45 | 2.42 | 0.63 |
| | Average: 0.99 | Average: 0.67 | Average: 0.66 |

As seen in the table, the empty cups (air only) had the highest oxygen reading, cups with only olives gave the next highest reading, and the cups containing water gave the lowest oxygen reading which has the lowest head space. The majority of these oxygen measurements were higher than the target oxygen concentration of 0.50%, and all of the measurements were higher than the preferred target oxygen concentration of 0.10%. Using this Waldner equipment, the target minimum oxygen concentration could not be achieved, presumably because the machine could not provide sufficient vacuum.

Because the WALDNER cup sealer machine was unable to achieve the target reduced oxygen concentration, two other cup sealing machines were acquired and tested. These were from MULTIVAC (MULTIVAC Sepp Haggenmüller GmbH & Co. KG, Wolfertschwenden, Germany) and ORICS Industries Inc. (Farmingdale, N.Y.).

B) Multivac Cup Sealer Testing

A cup sealing machine was acquired from MULTIVAC. Below is a set of representative test results using the MULTIVAC machine. In this testing, oxygen concentration was determined following sealing of the cups under various vacuum and nitrogen gas flush conditions. All samples used a sealing time setting of 2.7 seconds and a sealing temperature of 200° C.

| Vacuum | Gas Flush | Oxygen | Note |
|---|---|---|---|
| 400 mBar | 950 mBar | 0.40% | |
| 300 mBar | 950 mBar | 0.33% | |
| 200 mBar | 950 mBar | 0.06% | |
| 100 mBar | 950 mBar | 0.08% | |
| 55 mBar | 940 mBar | 0.01% | Optimal |
| 55 mBar | 925 mBar | 0.04% | |
| 55 mBar | 915 mBar | 0.09% | |
| 300 mBar | 850 mBar | 0.59% | |
| 200 mBar | 850 mBar | 0.06% | |
| 100 mBar | 850 mBar | 0.05% | |
| 100 mBar | 860 mBar | 0.06% | |
| 100 mBar | 895 mBar | 0.02% | |
| 100 mBar | 915 mBar | 0.02% | |

Using this apparatus, a vacuum setting of 55 mBar and nitrogen flush of 940 mBar are optimal because these settings yielded 0.01% (i.e., the lowest) oxygen measurements in the cup headspace after the sealing process.

C) ORICS Cup Sealer Testing

A cup sealing machine was acquired from ORICS Industries. Below is a set of representative test results using the ORICS machine. In this testing, oxygen concentration was measured in the cups following sealing of the cups under various vacuum and gas flush conditions. All samples used a sealing time setting of 2.5 seconds and a sealing temperature of 340° F. It is noted the MULTIVAC and ORICS machines use different parameters to set the vacuum and nitrogen flush conditions. The MULTIVAC machine expresses these variables as pressures, whereas the ORICS machine expresses these variables in seconds. Direct comparisons are not possible.

| Vacuum (seconds) | Nitrogen Gas Flush (seconds) | Oxygen | Note |
|---|---|---|---|
| 2.0 | 1.2 | 0.04% | |
| 2.0 | 1.1 | 0.08% | |
| 2.2 | 1.1 | 0.07% | |
| 2.3 | 1.1 | 0.06% | |
| 2.4 | 1.0 | 0.09% | |
| 2.5 | 1.0 | 0.08% | |
| 2.6 | 1.0 | 0.09% | Optimal. No cup puffing. |

Using this apparatus, a vacuum setting of 2.6 seconds and nitrogen flush of 1.0 seconds are optimal because these settings yielded the lowest oxygen measurements in the cup headspace after the sealing process.

Example 9

Impact of Olive Quantity and Sealing Conditions on Cup Integrity

It is the intention of the present invention to create a packaging system that has the ability to withstand retort temperatures and pressures, especially retort conditions that result in sterilization. To that end, extensive experimentation was undertaken to find optimal sealing and retort program conditions.

It was observed that cup paneling or bursting are problematic following the cup filling, sealing and following the retort treatment. Experiments were undertaken to determine if the amount of olives in the cup was the cause of the cups collapsing or inflating during the cooking process.

A series of 4.2 fluid ounce cups were filled with a range from one to 14 individual pitted low-acid, black-ripe olives, and the weight of each cup was recorded. The cups were sealed under vacuum and nitrogen flush using the ORICS Industries cup sealer with a vacuum of 2.6 seconds and a nitrogen flush of one second. Following the sealing, the cups were processed by a retort sterilization. Following the sterilization, the cups were examined. A representative set of data is provided below.

| Number of Olives | Weight (oz.) | Cup Description |
| --- | --- | --- |
| 1 | 0.13 | Paneled |
| 2 | 0.24 | Paneled |
| 3 | 0.38 | Paneled |
| 4 | 0.49 | Paneled |
| 5 | 0.61 | Paneled |
| 6 | 0.76 | Paneled |
| 7 | 0.90 | Paneled |
| 8 | 1.01 | Paneled |
| 9 | 1.11 | Normal |
| 10 | 1.18 | Normal |
| 11 | 1.39 | Normal |
| 12 | 1.46 | Slightly inflated |
| 13 | 1.61 | Inflated |
| 14 | 1.70 | Very inflated |

Cups filled with less than 8 olives paneled after cooking. Cups filled with 12 or more olives were at least slightly inflated. It was decided that for these pitted black-ripe olives, the optimal target weight for each cup would be approximately 1.2 oz., corresponding to about 9 to 11 olives.

Further testing was done to optimize the cup sealing conditions by varying the vacuum and the nitrogen flush settings on the cup sealing machines, in a effort to find settings that would result in a residual oxygen level in the cup below 0.10%, and also permit retort sterilization of the cups without any paneling, puffing, expansion or other distortions of the cup. Both the ORICS and MULTIVAC machines were used in the testing.

A) ORICS Cup Sealer Optimization

The ORICS cup sealer settings were modified in order to find optimal setting for the vacuum and the nitrogen flush so that the cups do not lose integrity during the retort treatment. All samples used a sealing time setting of 2.5 seconds and a sealing temperature of 340° F. The sealed cups were subjected to a retort sterilization program similar to the program conditions shown in FIG. 7D. The oxygen concentration readings following the retort treatment in a representative experiment are described below.

| Vacuum (seconds) | Nitrogen Gas Flush (seconds) | Oxygen | Cup Description |
| --- | --- | --- | --- |
| 5 | 1.0 | <0.10% | Paneled |
| 5 | 1.5 | <0.10% | Normal |
| 5 | 2.0 | <0.10% | Puffy |
| 6 | 1.0 | <0.10% | Paneled |
| 6 | 1.5 | <0.10% | Normal |
| 6 | 1.5 | <0.10% | Puffy |

Since all of the settings combinations used above yielded less than 0.10% in oxygen residual in the sealed cups following retort treatment, the vacuum setting was reduced, and the gas flush varied again order to minimize any puffing that was observed in the cups following the retort treatment. The data from a representative experiment is provided below.

| Vacuum (seconds) | Nitrogen Gas Flush (seconds) | Oxygen | Cup Description |
| --- | --- | --- | --- |
| 3.0 | 1.5 | <0.10% | Slightly Paneled |
| 3.0 | 1.0 | <0.10% | Slightly Paneled |
| 2.6 | 1.5 | <0.10% | Slightly Paneled |
| 2.6 | 1.0 | <0.10% | Normal |
| 2.0 | 1.5 | <0.10% | Slightly Puffy |
| 2.0 | 1.0 | <0.10% | Slightly Puffy |

After the retort sterilization, it was determined that each of the samples had less than 0.10% oxygen residual. The cup filling settings that use 2.6 seconds of vacuum with 1.0 second of gas flush produced optimal results, with no visible paneling or expansion of the plastic cup following retort sterilization.

B) MULTIVAC Cup Sealer Optimization

The MULTIVAC cup sealer settings were modified in order to find optimal settings for the vacuum and the nitrogen flush so that the cups do not lose integrity during the retort treatment. All samples used a sealing time setting of 2.7 seconds and a sealing temperature of 200° C. The sealed cups were subjected to a retort sterilization program similar to the program conditions shown in FIG. 7D. The oxygen concentration readings following the retort treatment in a representative experiment are provided below.

Unlike the ORICS cup sealer which uses time (seconds), the MULTIVAC machine uses pressure to measure the amount of vacuum and the nitrogen gas flash level. The table below shows the settings that were tested, the oxygen residual in the cup, and the impact of the retort process on cup integrity.

| Vacuum | Nitrogen Gas Flush | Oxygen Conc. | Cup Description |
| --- | --- | --- | --- |
| 100 mBar | 850 mBar | >0.10% | Paneled |
| 100 mBar | 895 mBar | <0.10% | Paneled |
| 100 mBar | 915 mBar | <0.10% | Paneled |
| 100 mBar | 940 mBar | <0.10% | Paneled |
| 55 mBar | 915 mBar | <0.10% | Paneled |
| 55 mBar | 940 mBar | <0.10% | No distortions. Optimal. |

From the table above, 5 of the 6 settings combinations for vacuum and gas flush produced less than 0.10% oxygen residual. After the samples were retort sterilized, it was observed that all but one of the samples were paneled (dented), which compromised the integrity of the cup. After reducing the vacuum pressure almost by half and increasing the gas flush pressure, it was observed that the cups had fewer dents. At 55 mBar vacuum and 940 mBar gas flush, it was observed that the cups were not paneled and the oxygen residual is less than 0.10%.

Based on the results of this testing, the packaged and sealed olive preparations of the invention are presently produced by exposure to vacuum followed by backflushing with nitrogen gas to produce a reduced-oxygen sealed cup environment. The present process uses the MULTIVAC brand cup sealer, however, other brands of sealing equipment can also be used. Sealed cups are then subjected to retort sterilization.

Example 10

Retort Processing

The low-acid, brineless olive product described in the previous example was subjected to a heat treatment in order to produce a suitably shelf-stable food product. The heat treatment used was retort processing. The heating process is an "overpressure process" utilized to create an equilibrated environment between the cup interior pressure and the retort internal pressure in order to prevent an adverse impact on seal integrity and "paneling" or other distortion of the cup. As the temperature in the retort chamber increases, the internal cup temperature increases causing an internal pressure increase. The overpressure in the retort is gradually increased to match the increasing internal cup pressure. When the heating process is completed, the retort chamber and cup are gradually cooled requiring the overpressure to be gradually decreased as the internal cup pressure decreases with temperature.

In order to identify suitable conditions for the sterilizing retort processing program, a wide range of packaging apparatus, cups and lidding materials, cups sealing equipment, and the actual retort program steps were considered, and various candidate equipment and conditions were tested. Finding proper combinations of these variables in order make the packaged product of the invention took into account the balance between (i) finding conditions there were stringent enough to produce a sterilized product, (ii) finding conditions that were not excessively harsh so that the preferred organoleptic properties of the olives would be preserved (or any loss of quality would be minimized), and (iii) finding conditions where the plastic cups would be able to withstand the temperatures, pressures and times that are involved in both sealing the cups and retort sterilizing the cups.

The retort program testing used 4.2 fluid ounce volume high-clarity plastic cups manufactured by Printpack, Inc. These cups are a polypropylene-ethylene vinyl alcohol (EVOH) structure having an EVOH content of 8% by weight. The lidding film that was applied to seal the cups was a laminate polymer structure manufactured by Printpack, Inc., comprising layers of (i) a barrier-coated polyethylene terephthalate, (ii) retort-grade nylon film, and (iii) a peelable polypropylene film.

Given the shape, volume and materials of the plastic containers and lidding material, and taking into consideration the nature of the low-acid olive food product and the brineless packaging, three suitable retort processes were designed for testing using the brineless, low-acid black-ripe olives produced by the methods described herein, and packaged as described above. These three retort programs each generates a level of heat treatment to achieve commercial sterilization of the food product. This is in contrast to other types of retort program conditions that result in merely pasteurized food product.

For the retort testing, approximately 1.2 ounces by weight of black-ripe, pitted and unstuffed olives were distributed to 4.2 fluid ounce polypropylene cups, and sealed according to the low-oxygen modified atmosphere as described above. The sealed preparations were then subjected to a retort process.

Initially, three hypothetical overpressure retort programs were designed in order to achieve sterilization of the sealed cups, taking into account the volume of the cups, the general nature of the olive flesh, and the significant fact that the packaged olives are brineless. Each of the three programs that were initially considered used the following general retort conditions:

| Parameter | Value |
| --- | --- |
| Apparatus | Surdry/JBT 1400 mm Static Steam Water Spray Retort oven |
| Maximum Allowable pH | not applicable |
| Target Fill Weight | 1.2 ounces |
| Maximum Fill Weight | 1.55 ounces |
| Minimum Product Initial Temperature | 40° F. |
| Mimimum Come Up Time to the Minimum Cook Temperature | 36.0 minutes |
| Minimum Cook Time | 69 minutes |
| Minimum Cook Temperature | varied |
| F(0) (minutes required to achieve sterility at 250° F.). | greater than or equal to 19.0 minutes |
| Water Spray | Yes |
| Minimum Water Flow Rate During Come Up and Sterilizing Cycles | 420 gpm |
| Pressure | 3.0 to 35 psi |

The three hypothetical overpressure retort programs as originally designed were as follows, and are provided in stepwise detail in FIGS. 7A through 7C.

| Retort Program | Minimum Cook Temperature | Shown in: |
| --- | --- | --- |
| A | 245° F. | FIG. 7A |
| B | 250° F. | FIG. 7B |
| C | 255° F. | FIG. 7C |

The retort conditions provided in FIGS. 7B and 7C were not tested with the packaged and sealed olive preparations because it was predicted that the polymer cups would lose physical integrity when subjected to the higher temperatures of those retort programs.

The retort program provided in FIG. 7A was tested with the packaged and sealed olive preparations. After applying that retort program, it was observed that the plastic cups were distorted, and for that reason, that particular program as shown in FIG. 7A was deemed sub-optimal.

Because none of these three programs were optimal, a fourth program was designed based on the parameters of Program A, and further, used different pressures and temperatures that were better tolerated by the polymer in the plastic cups. This new program, termed Program D, is provided in FIG. 7D. This program has a minimum cook temperature of 245° F. similar to Program A shown in FIG. 7A, but makes significant changes in the set point temperatures and pressures that are used in the program steps.

After subjecting the sealed cups to the retort conditions of Program D, it was observed that the cups retained their shape and physical integrity, and the olives did not suffer any significant degradation of desired organoleptic properties, such as texture, firmness, taste or color.

Further optimization of retort conditions led to the development of still other effective retort programs. For example, the retort programs provided in FIGS. 7E and 7F were also successfully tested, and can be used with the compositions and methods of the invention.

Example 11

Storage Stability Studies

Studies were undertaken using the sealed, packaged, pitted, unstuffed, brineless low-acid olives in order to assess the storage stability of the product, as packaged under the low oxygen conditions described herein, and following the retort processing conditions of Program A (FIG. 7A).

In these studies, the packaged olives were stored under various controlled conditions for various lengths of time. At the end of those time intervals, the olive packages were opened and organoleptic properties of the olives were quantitatively assessed. This analysis scored a total of 24 organoleptic properties, in the five categories of appearance, aroma, flavor, texture and aftertaste.

| APPEARANCE | AROMA | FLAVOR | TEXTURE | AFTERTASTE |
|---|---|---|---|---|
| Black Color<br>Size<br>Smoothness<br>Brokens | Total Aroma<br>Total Olive<br>Briney<br>Phenolic<br>Total Off Note<br>Earthy/Musty<br>Rubbery/Sulfurous<br>Oxidized Oil | Total Flavor<br>Total Olive<br>Phenolic<br>Total Off Note<br>Rubbery/Sulfurous<br>Oxidized Oil<br>Salty<br>Bitter<br>Metal-like | Firmness<br>Toughness | Total Aftertaste |

These characteristics are scored at the completion of various time intervals, and the rates of change in those scores (compared to a refrigerated control sample that had been stored for the same length of time) are also noted. Changes in the attributes listed above relative to the refrigerated control olives were scored as "slightly higher/lower" (indicating very slight change), or "higher/lower" (indicating moderate change), and "much higher/lower" (indicating significant change).

Two different storage conditions were used. These were (A) 71° F. in 55% relative humidity (RH), and (B) 104° F. in 75% RH. Parallel control samples were maintained in 40° F. refrigeration.

A) Ambient Temperature Storage

In one experiment, brineless black olives of the invention were packaged and subjected to retort treatment according to the methods described herein. These packaged olives were alternatively stored in either refrigeration (control samples) or held at 71° F. in 55% RH. At regular intervals over the course of 20 months, sealed packaged olives were opened, tested and scored for their organoleptic properties as described above. The results of the testing are summarized below.

As can be seen from this data, the olives produced and packaged as described herein maintain acceptable quality (i.e., are shelf stable) through at least 18 months of storage in ambient conditions (at 71° F. in 55% RH).

B) Elevated Temperature Storage

Mathematical models can be used to determine the rate of change in the olive over time at a given temperature, and predict the quality of the olives at future time points. As known in the industry, the quality of a food product held at an elevated temperature of 104° F. at 75% relative humidity for a fixed time interval is considered to be equivalent to a time interval that is four times as long when the storage is at ambient (room temperature) conditions. For example, if a food product stored at 104° F. in 75% RH for six (6) months is scored with an "acceptable" overall product quality rating after 6 months of storage, it would be expected that the same food product stored at room temperature for 24 months would also score as "acceptable" with regard to overall product quality.

In one experiment, brineless black olives of the invention were packaged and subjected to retort treatment according to the methods described herein. These packaged olives were stored at 104° F. in 75% RH for three (3) months. A parallel

| Months of Storage | Result | Overall Product Quality Conclusion |
|---|---|---|
| 3 months | The sample did not differ significantly from the refrigerated control samples in any attribute evaluated. Overall quality change was rated at 5-10% compared to the refrigerated reference standard. | Subjectively rated as acceptable. |
| 6 months | Samples were rated slightly higher in total off note flavor and oxidized oil flavor. Overall quality change was rated at 10% compared to the refrigerated reference standard. | Subjectively rated as acceptable. |
| 12 months | Samples did not differ significantly from the refrigerated control samples in any attribute evaluated. Overall quality change was rated at 15% compared to the refrigerated reference standard. | Subjectively rated as acceptable. |
| 14 months | Samples did not differ significantly from the refrigerated control samples in any attribute evaluated. Overall quality change was rated at 20% compared to the refrigerated reference standard. | Subjectively rated as acceptable. |
| 16 months | Samples were rated slightly lower in olive aroma and flavor, and slightly higher in phenolic aroma and flavor. Higher in total off flavor and rubbery/sulfurous flavor, and slightly metal-like. The softness/firmness of the olives was variable. Overall quality change was rated at 25% compared to the refrigerated reference standard. | Subjectively rated as acceptable. |
| 17 months | Samples were rated higher in phenolic aroma, total off flavor and rubbery/sulfurous flavor; lower in total olive flavor. The softness/firmness of the olives was variable. Overall quality change was rated at 25-30% compared to the refrigerated reference standard. | Subjectively rated as acceptable or borderline acceptable. |
| 18 months | Samples were rated much higher in total off flavor and higher in phenolic flavor, earthy/musty aroma and flavor, and rubbery/sulfurous aroma and flavor. Samples were also lower in total olive flavor. The olives scored slightly lower in firmness. Overall quality change was rated at 30% compared to the refrigerated reference standard. | Subjectively rated as borderline acceptable. | set of control reference standards were stored for the same length of time in refrigeration (40° F.). At the end of the three month interval, the sealed samples were opened and qualitatively tested as described above.

This assessment showed slight changes in product quality compared to the refrigerated reference sample. The sample stored at the elevated temperature was rated higher in total off flavor, and slightly higher in oxidized oil aroma/flavor and earthy/musty aromas. The samples were rated as slightly lower in total olive aroma, briney aroma and total olive flavor compared refrigerated control samples. Overall product quality was subjectively rated as acceptable.

This observation after 3 months of storage at 104° F. can be extrapolated to predict an acceptable overall product quality at 12 months when the product is stored at ambient, room temperature conditions. Therefore, as packaged, this data predicts that the olive products of the invention will be shelf stable for at least 12 months at ambient temperatures following production.

Example 12

Oxygen Permeability Studies

Studies were undertaken to address the oxygen permeability of the sealed containers containing the packaged olives of the invention as described herein. Oxygen concentrations inside the sealed cups were measured after sealing (but before retort treatment) and again one week after the retort treatment. The oxygen concentrations were also tracked over extended periods of time up to 20 months following retort treatment.

These studies used an OXYSENSE® system from OXYSENSE® Incorporated to measure the oxygen levels in the sealed sups. The system measures oxygen non-invasively, and measures oxygen in the headspace of the cups. It is an optical system that can measure oxygen concentration within packages that are at least translucent as long as the packaging material can transmit blue and red light at approximately 470 nm and 610 nm, respectively. The system uses a non-invasive, light sensitive, oxygen sensor called an OxyDot ($O_2$XYDOT®). The OxyDot is illuminated with a pulsed blue light from an LED. The blue light is absorbed by the OxyDot and red light is emitted. The red light is detected by a photo-detector and the characteristics of the fluorescence lifetime are measured. Different lifetime characteristics indicate different levels of oxygen within the package. The software program is calibrated using a reference Dot before the experimental readings. Once calibrated, the LED light is pointed at the OxyDot and the oxygen level percentage is displayed after five seconds.

In these studies, OxyDots were applied to the inside of the plastic cups with a silicone based glue. The cups were then filled with olives and sealed, consistent with the procedures described herein. After the cups were sealed, but before retort treatment, the blue LED light was flashed directly at the OxyDot, and the levels of oxygen inside the cup were measured. The cups were then subjected to retort sterilization and the oxygen concentration was measured again one week following the retort treatment. A set of representative data is provided below.

| | Oxygen Residual (%) | |
|---|---|---|
| Trial # | Before-Retort | One Week After-Retort |
| 1 | 0.06 | 0.18 |
| 2 | 0.10 | 0.11 |
| 3 | 0.15 | 0.13 |
| 4 | 0.16 | 0.17 |
| 5 | 0.11 | 0.13 |
| 6 | 0.04 | 0.10 |
| 7 | 0.12 | 0.07 |
| 8 | 0.04 | 0.03 |

As can be seen in these results, the residual oxygen concentrations in the cups after the sealing process (and before retort) did not change significantly over the course of one week following the retort treatment. This oxygen concentration stability indicates that the integrity of the plastic used to construct the cups and the sealed environment inside the cups are preserved during the retort process, and are not adversely affected by the retort conditions.

In another experiment using the OxyDots, one set of cups was packaged with olives, sealed, and then subjected to retort, as described herein. The oxygen concentrations in those cups was measured immediately following the retort treatment, then tested again following extended storage times at a controlled temperature of 71° F. and 55% relative humidity (RH). A set of representative data is provided below.

| Months of storage | Oxygen measurements (percent oxygen) from representative sealed sample cups | | | |
|---|---|---|---|---|
| 0 months | 0.00%** | 0.00 | | |
| 3 | 0.00 | 0.00 | 0.00 | 0.01 |
| 6 | 0.00 | 0.00 | 0.00 | 0.00 |
| 8 | 0.01 | 0.04 | | |
| 10 | 0.15 | 0.58 | | |
| 12 | 0.04 | 0.08 | 0.11 | 0.48 |
| 14 | 0.09 | 0.10 | | |
| 15 | 0.17 | 0.18 | | |
| 16 | 0.08 | 0.09 | | |
| 17 | 0.04 | 0.06 | | |
| 18 | 0.12 | 0.17 | | |
| 20 | 0.09 | 0.12 | | |

**note: 0.00% = none detectable

As can be seen in these results, the oxygen concentrations in the cups did not change significantly over the course of 20 months at 71° F. (room temperature) following retort treatment. This stability of the reduced-oxygen environment inside the sealed cups indicates that the oxygen impermeability of the sealed containers remained intact for at least 20 months following the retort treatment. It is predicted that further monitoring of this experiment will continue to show an effective oxygen barrier and an unbroken sealed environment inside the cups, perhaps for as long as 24 months or longer.

Example 13

Flavored Stuffings for Low-Acid Olives

As discussed in EXAMPLE 5, the stuffing pastes can optionally be supplemented with any of a variety of flavorings or other types of ingredients to add desirable flavors and/or textures to the stuffing, either as individual flavors or combinations of ingredients for more complex flavors. Flavors and flavor combinations were selected for development based on their potential to add appeal to packaged olives, and to complement the taste and texture of olives generally, including low-acid black-ripe and green-ripe olives of the invention, and also for their potential adaptability to commercial scale high volume production.

Each of the flavored paste formulations provided below were successfully used to prepare stuffed, low-acid, black-ripe olives of the invention, according to the protocols illustrated in FIGS. 4 and 8.

| NACHO FLAVORED STUFFING | |
|---|---|
| Ingredients | Percentage (% by weight) |
| Parmesan Cheese Powder (QIC ®; Quality Ingredients Corporation) | various |
| BLU-ZING ® Cheese Powder (KRAFT ® Foods) | various |
| Garlic Powder (Elite Spice) | various |
| Onion Powder (Elite Spice) | various |
| Sundried Tomato Powder (Culinary) | various |
| Citric Acid (VWR International, LLC) | various |
| Sodium Alginate (TIC Gums, Inc.) | 4.00 |
| TICA-ALGIN ® HG-600F Powder (TIC Gums, Inc.) | 3.33 |
| Guar Gum (TIC Gums, Inc.) | 0.93 |
| Red Color FD&C 40 Alum Lake (SENSIENT ®) | various |
| Amaranth (Bob's Red Mill) (amaranth flour) | 0.67 |
| Black Ground Pepper Extract (AMORETTI ®) | various |
| Tabasco Extract (AMORETTI ®) | various |
| Capsicum Extract (Kalsec) | various |
| Cholula Sauce | various |
| Cheddar Cheese Extract (AMORETTI ®) | various |
| Beta Carotene Emulsion (SENSIENT ®) | various |
| Water | various |
| Total: | 100 |

| BACON AND CHEESE FLAVORED STUFFING | |
|---|---|
| Ingredients | Percentage (% by weight) |
| White Cheddar & Bacon (Iles) | 20.00 |
| Bluzing Cheese Powder (KRAFT ® Foods) | various |
| Bacon (Benton's Smoky Mountain Country Hams) | various |
| Citric Acid (VWR International, LLC) | various |
| Sodium Alginate (TIC Gums, Inc.) | 4.00 |
| TICA-ALGIN ® HG-600F Powder (TIC Gums, Inc.) | 3.33 |
| Guar Gum (TIC Gums, Inc.) | 0.93 |
| Amaranth (Bob's Red Mill) | 0.67 |
| Natural Bacon Extract (AMORETTI ®) | various |
| Cheddar Cheese Extract (AMORETTI ®) | various |
| Hickory Smoke (Wright's) | various |
| Water | various |
| Total: | 100 |

| PEPPERONI FLAVORED STUFFING | |
|---|---|
| Ingredients | Percentage (% by weight) |
| Tomato Powder (Con-Tran, APK) | various |
| Pizza Sauce Nat. Type Flv (Fontana) | various |
| Ground Black Pepper (Elite Spice) | various |
| Pepperoni Powder (KRAFT ® Foods) | various |
| Citric Acid (VWR International, LLC) | various |
| Sodium Alginate (TIC Gums, Inc.) | 4.00 |
| TICA-ALGIN ® HG-600F Powder (TIC Gums, Inc.) | 3.33 |
| Guar Gum (TIC Gums, Inc.) | 0.93 |
| Sugar (C&H ® Sugar Company, Inc.) | various |
| Amaranth (Bob's Red Mill) (amaranth flour) | 0.67 |

| PEPPERONI FLAVORED STUFFING -continued | |
|---|---|
| Ingredients | Percentage (% by weight) |
| Hickory Smoke (Wright's) | various |
| Garlic Extract (AMORETTI ®) | various |
| Onion Extract (AMORETTI ®) | various |
| Tabasco Extract (AMORETTI ®) | various |
| Roasted Beef Extract (AMORETTI ®) | various |
| Paprika Oil Extract (AMORETTI ®) | various |
| Water | various |
| Total: | 100 |

| SWEET PEPPER FLAVORED STUFFING | |
|---|---|
| Ingredients | Percentage (% by weight) |
| Water | various |
| Roasted Red Bell Pepper Puree (George Chiala) | various |
| Red Bell Pepper Powder (APK) | various |
| Natural Red Color (Exberry) | various |
| Sweet Red Bell Pepper Flavor, Nat. DB (Ungerer) | various |
| Fresh Sweet Red Bell Pepper Flavor, Nat (Fontana) | various |
| Sugar (C&H ® Sugar Company, Inc.) | various |
| Sodium Alginate | 3.00 |
| TICA-ALGIN ® HG-600F Powder (TIC Gums, Inc.) | 2.50 |
| Guar Gum | 0.70 |
| Total | 100 |

After the stuffing, the olives were treated in a high concentration calcium chloride bath, then soaked in the following prepackaging brine, without any supplemental flavor infusion ingredients. Olives stuffed with one of the three paste formulations listed above were treated with the following prepackaging brine:

| Prepackaging Brine Ingredients | Percentage (% by weight) |
|---|---|
| calcium chloride ($CaCl_2$) | 0.5 |
| water | 94.75 |
| sodium chloride (NaCl) | 4.75 |
| Total: | 100 |

Following the soaking in the prepackaging brine, the brine was removed from the olives, and the treated olives were packaged brineless and subject to a sterilizing retort process, according to the methods described herein.

Example 14

Simultaneously Flavored Stuffings and Flavor Infusions for Low-Acid Olives

As discussed in EXAMPLE 5, stuffing pastes can optionally be supplemented with any of a variety of flavorings to add to the appeal the olive. Alternatively, or in addition to the flavored stuffings, the olive can also be infused with flavorings by allowing the flavorings to permeate and penetrate the olive flesh by soaking in a flavor infusion solution. As shown in FIGS. 3, 4 and 5, this flavor infusion can be accomplished at the same time as the olive brining step, where the flavor infusion ingredients are included in the prepackaging brine treatment following the olive stuffing.

The cheese pizza flavored paste formulation provided below was successfully used to prepare stuffed, low-acid, black-ripe olives of the invention, according to the protocols illustrated in FIGS. 4 and 8.

| CHEESE PIZZA FLAVORED STUFFING | |
|---|---|
| Ingredients | Percentage (% by weight) |
| Water | various |
| Tomato Paste (Ingomar) | various |
| Sugar (C&H ® Sugar Company, Inc.) | various |
| Tomato Powder (Con-Tran, APK) | various |
| Sodium Alginate | 2.00 |
| TICA-ALGIN ® HG-600F Powder (TIC Gums, Inc.) | 2.00 |
| Guar Gum | 0.70 |
| Garlic Powder (Elite Spice) | various |
| Onion Powder (Elite Spice) | various |
| Citric Acid | various |
| Ground Basil Powder (Elite Spice) | various |
| Ground Mediterranean Oregano (Elite Spice) | various |
| Parmesan Cheese Powder (QIC) | various |
| Cheese Pizza Type Flv. Nat. (Fontana) | various |
| Cheese Pizza Seasoning Flv. Nat. (Givaudan) | various |
| Pizza Sauce Nat. Type Flv. (Fontana) | various |
| Crust Type Flv. Nat. (Givaudan) | various |
| Red Color FD&C Red 40 Alum Lake (SENSIENT ® Color) | various |
| Total: | 100 |

After the stuffing, the olives were treated in a high concentration calcium chloride bath, then soaked in the following prepackaging brine that contained supplemental flavor infusion ingredients as shown.

| Prepackaging Brine Ingredients | Percentage (% by weight) |
|---|---|
| Calcium Chloride (CaCl$_2$) | 0.75 |
| Water | 94.42 |
| Sodium Chloride | 4.75 |
| Natural Tomato Type Flavor | various |
| Aquaresin Onion Extract | various |
| Aquaresin Garlic Extract | various |
| Aquaresin Basil Extract | various |
| Aquaresin Oregano Extract | various |
| Total: | 100 |

Following the soaking in the prepackaging brine solution containing the flavor infusion ingredients, the brine was removed from the olives, and the treated olives were packaged brineless and subject to a sterilizing retort process, according to the methods described herein.

Example 15

Large-Scale Olive Production

Methods and apparatus for olive stuffing were developed for large scale, high volume olive production. Apparatus for use in large scale production of stuffed acidified olives were constructed and are shown schematically in FIGS. 9 and 10. Using this apparatus, olives were stuffed and treated in a manner that is identical in theory to the laboratory scale method of FIG. 8. The olives were stuffed and treated using a method consistent with the method shown in the flow chart of FIG. 4, except with modifications of scale to permit the use of high-throughput machinery that can produce large quantities of stuffed olives.

FIGS. 9 and 10 show schematics of apparatus for the large scale production of low-acid, black-ripe stuffed olives. The apparatus consists essentially of five components. These are (i) the paste mixer assembly 203, (ii) the paste feeder assembly 213, (iii) the pitting and stuffing assembly 226, (iv) the calcium dwell coil assembly 233 (FIG. 9) or the submerging calcium bath conveyor 270 (FIG. 10) and (v) a brining tank 250.

A) Paste Mixer

The first step in the process of olive stuffing is preparing the stuffing paste, which takes place in the paste mixer assembly 203. The formulation of the paste used for high volume olive stuffing is as described in EXAMPLE 5. In one embodiment, a large paste mixer 210 is used, where all of the ingredients for preparing the viscous stuffing paste are combined in a mixing vessel 205, and further where mixing blades are attached to and controlled by the mixer 210, and where the blades can be raised and lowered into the mixing vessel 205. The paste mixer 210 and vessel 205 can be of any size and design, for example, as might be used for commercial food preparation. In one embodiment, a HOBART Model M802 80-Quart All Purpose Mixer and matching mixing vessel are used to prepare the stuffing. In some embodiments, the pastes are optimally prepared in apparatus that are designed to prepare bread dough, as those types of machinery are better suited to mix the stuffing dough than apparatus that are designed to blend liquids.

As shown in FIGS. 9 and 10, the mixer assembly 203 comprises the mixer 210 and the vessel 205. However, it is not intended that the invention be limited to any particular mixing devices, nor limited to any particular size or capacity of the device. For example, when the scale of the apparatus is increased to generate larger output, it is expected that components such as the HOBART Model M802 Mixer will be replaced with higher volume machines having greater output capacity. The mixer assembly can be any device or combination of devices that serves the purpose of combining the paste ingredients to produce the stuffing paste. Collectively, in this one embodiment, the paste mixer 210 and paste vessel 205 make up the paste mixer assembly 203. In other designs, the mixing of ingredients took place in a large hopper (not shown), which then feeds the ingredient mixture into the next step for olive stuffing.

The arrows 207 indicate the means by which the paste was transferred from the paste mixer assembly 203 (more specifically here, the mixing vessel 205) to the paste feeder assembly 213. In some embodiments, the transfer was manual, that is to say, the contents of the vessel 205 are carried or poured into the paste feeder 215. In other embodiments, the paste can be transferred from the vessel 205 to the paste feeder 215 by any automated route, for example, by flexible tubing or rigid piping, by a conveyor belt type of mechanism or fed directly from an ingredients hopper. The feeder 215 controlled the delivery of the paste into the paste injection pump 220. In some embodiments, the paste feeder 215 was the kind of device designed to grind meat or fill sausage links, for example, the Vemag Robot HP-15S. Collectively, in this one embodiment, the paste feeder 215 and paste injection pump 220 were the components of the paste feeder assembly 213. However, it is not intended that the apparatus be limited to any particular design, model or size of the feeder 215 or pump 220, and other designs and equipment can be used.

B) Olive Pitting and Stuffing

The next step in production takes place at the pitting and stuffing assembly 226. Central to this assembly is the pitter and stuffer 225. This pitter and stuffer received unpitted olives 224 that are delivered by an olive feed conveyor system 223. The pitter and stuffer also received paste that was delivered by the paste injection pump 220 through the paste transfer conduit 222. In this one embodiment, the pitter and stuffer was an OFM Food Machinery pitter and stuffer Model DR146. After pitting and stuffing, the stuffed olives passed through a water spray wash station 227 in order to remove any broken olives, scraps of olive meat, and excess or stray stuffing that is sticking to the olive or protruding from the olive pit cavity.

C) Calcium Treatment

After the olives emerged from the spray wash station 227, they were delivered by gravity flow to the calcium dwell assembly 233 (FIG. 9). This step in the protocol exposes the stuffed olives to a calcium chloride solution, which is required to harden the paste what was injected into the olives. Using this large-scale apparatus, the calcium treatment of the stuffed olives takes place in two steps, where the spiral dwell assembly is the first step and uses a high concentration calcium chloride solution, typically 5% calcium chloride. This assembly 233 comprises the calcium dwell coil 235, olive flume 245, solution removal sieve 247, calcium solution reservoir 240, calcium solution circulation pump 242, and calcium solution conduit 243. From the spray wash station 227, the olives fall into a spiral coiled tubing, the calcium dwell coil 235, that contains a gravity flow of a calcium chloride solution, typically a high concentration calcium solution (3-10% calcium chloride). This calcium solution serves to initiate the paste hardening in the pitted olive. The calcium solution is delivered to the top of the tubing coil by the calcium solution circulation pump 242 through the calcium solution conduit 243. The length of time that the olives are exposed to the high concentration calcium solution in the dwell coil can be regulated by the geometry of the coil 235. The dwell time of the olives in the coil can be regulated by changing the steepness of the coil, the length of the coil, the diameter of the coil, and the volume of calcium solution flowing through the coil. In one embodiment, a coil with a four inch diameter is used, although other diameter coils can alternatively be used. In one embodiment, the dwell time of the stuffed olive in the dwell coil 235 was approximately one minute before emerging from the bottom of the coil.

When the olives exit the dwell coil 235, they travel down a flume 245 by gravity flow, and ultimately are channeled into a brining tank 250 holding prepackaging brining solution. When part way down the flume, the olive and calcium solution stream passes over a solution removal sieve 247, consisting essentially of a course mesh that permits the olives to move past and continue down the flume to reach the brining tank 250, but where the mesh of the sieve 247 diverts the flow of the calcium solution downward out of the flume and into the calcium solution reservoir 240. From the reservoir 240, the calcium solution is recycled back up to the top of the dwell coil 235 by the calcium solution pump 242 and conduit 243.

Controlling the exposure of the olives to a calcium chloride solution need not require a calcium, dwell coil 235 as shown in FIG. 9. As an alternative to using a calcium dwell coil, an apparatus was constructed that incorporated a submerging calcium bath conveyor assembly 270, as shown in FIG. 10. Using this apparatus, the olives emerged from the spray wash station 227 and were fed into a calcium tank 272 containing 5% calcium chloride solution. The tank 272 contains an integrated conveyor belt 274 having protruding fins 276. These fins 276 created multiple compartments, termed flights 278 along the conveyor belt 274. The olives initially float in the calcium solution, and are then captured by the flights 278 created by the fins 276 on the revolving conveyor 274 and are forced beneath the level of the calcium solution, and fully submerged in the calcium solution. The conveyor (with the trapped olives in the flights) travels in the direction shown by the arrows. The olives progress along the underside of the conveyor 274 within each flight 278 while traversing the length of the calcium tank 272, moving in the direction of the arrows shown within the calcium tank 272 in FIG. 10. The total time that the olives are exposed to the calcium solution is easily regulated by controlling the speed of the conveyor belt, thereby controlling how long each flight remains submerged in the calcium solution. In some embodiments, the olives were submerged in the calcium solution in the conveyor belt flights tank for a minimum of one minute, although longer expose times are also contemplated. On the far end of the conveyor 274, the olives emerge from the flights.

D) Olive Brining

After the olives are pitted, stuffed and exposed to the high concentration calcium bath, the olives were then delivered to a brining tank 250 containing a prepackaging brine. The olives were allowed to soak for a suitable time, for example, between 12-24 hours at room temperate. Although the brining took place at room temperature, the tank 250 can be heated or cooled as necessary during the treatment in order to compensate for excessively cold or excessively warm ambient air, as might be expected periodically during winter and summer seasons. A relatively constant temperature from batch to batch of olives helps to maintain product consistency across the multiple batches.

This prepackaging brine solution also contained a 0.5% (low) concentration of calcium chloride, to continue the hardening of the injected paste. In some embodiments, the brining solution also contained flavorings (typically liquid flavorings) for flavor infusions into the olives.

At the end of the prepackaging brining step, the brine was drained from the tank 250 through a drain valve 252, which is designed to permit the passage of the liquid brine, but does not permit the olives to pass through the drain valve 252. From the tank 150, the drained brine-free olives are then packaged and sealed into suitable containers.

Use of this high capacity apparatus was successful to produce brineless, low-acid, black-ripe olives stuffed alternatively with sweet pepper flavored stuffing and cheese pizza flavored stuffing.

While the foregoing invention has been described in some detail for purposes of clarity and understanding, it will be clear to one skilled in the art from a reading of this disclosure that various changes in form and detail can be made without departing from the true scope of the invention. It is to be understood that the invention is not limited to any of the specifically recited methodologies or materials such as reagents, plant varietals, cultivars, species, subspecies, strains or genetic hybrids or biological systems recited herein. Similar or equivalent methodologies, reagents or biological materials can be used in the construction and practice of the present invention, and remain within the scope of the invention. It is also to be understood that the description and terminology used herein is for the purpose of describing particular embodiments of the invention only, and is not intended that the invention be limited solely to the embodiments described herein.

As used in this specification and the appended claims, singular forms such as "a", "an" and "the" include plural referents unless the content clearly dictates otherwise. For example, reference to "an olive" or "a container" also includes a plurality of olives or containers. All industry and technical terms used herein have the same meaning as commonly understood by one of ordinary skill in the art or industry to which the invention pertains, unless defined otherwise.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method for producing a commercially sterile substantially liquid-free olive preparation having preferred organoleptic properties, the method comprising:
    (a) providing:
        (i) a plurality of olives or olive segments,
        (ii) a semi-rigid retort tolerant plastic container substantially impervious to oxygen when sealed, and
        (iii) a lidding material;
    (b) treating said olives or olive segments with an alkali, thereby producing olives or olive segments whose flesh is alkaline;
    (c) reducing the alkalinity of said olive flesh, thereby producing low-acid olives or olive segments having a pH greater than pH 4.6 and less than about pH 8.5;
    (d) packaging said low-acid olives or olive segments in the absence of any free liquid, where the packaging step comprises:
        (i) distributing said low-acid olives or olive segments into said semi-rigid retort tolerant plastic container, and
        (ii) attaching the lidding material to the semi-rigid retort tolerant plastic container, thereby sealing said semi-rigid retort tolerant plastic container; and
    (e) retort treating the sealed semi-rigid retort tolerant plastic container by a sterilizing overpressure retort process to produce a commercially sterile liquid-free olive preparation having a shelf-life of at least 12 months, wherein the overpressure retort process achieves an elevated temperature of at least 245° F. which is maintained for at least 69 minutes at a pressure within the range of 28.6 psi to 30.8 psi.

2. The method of claim 1, wherein treating said olives or olive segments with an alkali in step (b) is followed by (i) adjusting the pH of said alkaline olives or olive segments to within a range of about pH 8.6 to 8.9; and (ii) blackening said olives or olive segments by treating with an oxidizing agent.

3. The method of claim 1, wherein sealing said semi-rigid retort tolerant plastic container comprises sealing in a reduced oxygen environment.

4. The method of claim 1, wherein sealing said semi-rigid retort tolerant plastic container comprises sealing under vacuum and flushing with nitrogen.

5. A method for producing a packaged commercially sterile preparation of stuffed olives having preferred organoleptic properties, the method comprising:
    (a) providing:
        (i) olives with a pit cavity formed by removal of a pit;
        (ii) a flavored paste comprising (A) sodium-alginate; and (B) at least one component selected from the group consisting of jicama puree, quinoa flour, teff flour, amaranth flour, and any combinations thereof;
    (b) injecting the olive pit cavity with a quantity of the flavored stuffing paste to produce an injected olive,
    (c) exposing the injected olive to a solution comprising calcium chloride in a concentration of about 3% to 10%;
    (d) exposing the injected olive to a brine solution having a pH of between about 5.0 and 7.5, the brine solution further comprising calcium chloride in a concentration of about 0.25% to 0.75%, thereby producing stuffed olives having a pH greater than pH 5.0 and less than pH 7.5;
    (e) distributing said stuffed olives into a semi-rigid retort tolerant plastic container in the absence of any free liquid;
    (f) sealing said semi-rigid retort tolerant plastic container, where said sealing comprises attaching a lidding material to the semi-rigid retort tolerant plastic container, thereby creating a sealed environment within the sealed retort tolerant semi-rigid plastic container; and
    (g) retort treating the sealed semi-rigid retort tolerant plastic container by a sterilizing overpressure retort process that achieves an elevated temperature of at least 245° F. which is maintained for at least 69 minutes at a pressure within the inclusive range of 28.6 psi to 30.8 psi, thereby producing a packaged commercially sterile preparation of stuffed olives having a shelf life of at least 12 months.

* * * * *